United States Patent [19]
Sumiyashiki

[11] Patent Number: 5,938,138
[45] Date of Patent: Aug. 17, 1999

[54] WEBBING RETRACTOR

[75] Inventor: Akira Sumiyashiki, Aichi-ken, Japan

[73] Assignee: Kabushiki Kaisha Tokai-Rika-Denki-Seisakusho, Aichi, Japan

[21] Appl. No.: 08/868,897

[22] Filed: Jun. 4, 1997

[30] Foreign Application Priority Data

Jun. 6, 1996 [JP] Japan ................................ 8-144088
Mar. 4, 1997 [JP] Japan ................................ 9-049350

[51] Int. Cl.$^6$ .................................................. B60R 22/415
[52] U.S. Cl. ................................................... 242/382.2
[58] Field of Search ........................... 242/382.2, 382.1, 242/384.2, 384.6; 280/806, 807; 297/475–478

[56] References Cited

U.S. PATENT DOCUMENTS

| | | | |
|---|---|---|---|
| 2,881,630 | 4/1959 | Opocensky . | |
| 3,667,698 | 6/1972 | Fisher | 242/382.1 |
| 3,806,678 | 4/1974 | Quinting et al. . | |
| 3,830,444 | 8/1974 | Sargeant . | |
| 3,853,284 | 12/1974 | Hasegawa et al. . | |
| 3,884,088 | 5/1975 | Bertozzi et al. . | |
| 4,566,649 | 1/1986 | Petersen | 242/382.2 |
| 4,948,066 | 8/1990 | Matsumoto et al. | 242/382.2 |
| 5,257,754 | 11/1993 | Hishon | 242/382.2 |
| 5,507,447 | 4/1996 | Corrion et al. | 242/382.2 |
| 5,692,697 | 12/1997 | Eaton et al. | 242/382.2 |

FOREIGN PATENT DOCUMENTS

| | | |
|---|---|---|
| 1063315 | 12/1953 | France . |
| 3121059 | 11/1991 | Japan . |
| 747239 | 11/1995 | Japan . |
| 1461675 | 6/1977 | Switzerland . |

OTHER PUBLICATIONS

European Search Report, Jun. 17, 1996.

*Primary Examiner*—John M. Jillions
*Attorney, Agent, or Firm*—Sixbey Friedman Leedom & Ferguson; Thomas W. Cole

[57] ABSTRACT

A webbing retractor is provided that includes a winding shaft onto which a webbing used for restraining a vehicle occupant is wound; a locking pawl which is actuated to stop rotation of the winding shaft in a webbing unwinding direction; an automatic locking retractor (ALR) lever which can be moved at an operating position when the locking pawl is actuated and at a non-operating position when the locking pawl is not actuated, and which is usually biased toward the operating position; a cam member for holding the ALR lever at the non-operating position from a first state in which the webbing is wound onto the winding shaft substantially to its full length to a second state immediately before the webbing is pulled out substantially to its full length, and a stopping mechanism for holding the ALR lever at the non-operating position to the end of the second state and allowing movement of the ALR lever to the operating position when the winding shaft rotates, in a third state, in a direction in which the webbing is rewound. The retractor allows the webbing to be pulled out to its full length without actuation of the ALR lever.

15 Claims, 42 Drawing Sheets

WEBBING RETRACTOR

BACKGROUND OF THE INVENTION

1. Field of the Invention

The present invention relates to a webbing retractor which is used by a seat belt device, and which, after a webbing is pulled out by a predetermined amount, can be constantly brought into a state in which a pullout operation of the webbing is prevented.

2. Description of the Related Art

A webbing retractor provided in a vehicle includes a built-in locking mechanism which, when necessary, prevents the rotation of a winding shaft in the direction in which the webbing is pulled out.

As the webbing retractor equipped with this type of locking mechanism, there are known a so-called emergency locking retractor (ELR) and a so-called automatic locking retractor (ALR): The ELR is constructed so that winding and pullout of the webbing is ordinarily allowed, and when sudden deceleration of a vehicle is detected by an acceleration sensor, the rotation of a winding shaft in the direction in which the webbing is pulled out is stopped instantaneously; the ALR is constructed so that, if the webbing is retracted slightly after having been pulled out to an arbitrary length, further pullout of the webbing is automatically prevented, and the pullout prevention state of the webbing is released by the webbing being substantially retracted to its full length, so that pullout of the webbing is allowed again.

A webbing retractor in which the ELR and ALR are used together has already been proposed by the assignee of the present application (as an example, see Japanese Utility Model Application Laid-Open (JP-U) No. 3-121059).

The webbing retractor disclosed in the above-described publication (JP-U No. 3-121059) comprises: a lock wheel which rotates in such a manner as to follow a winding shaft and which, when rotation of the lock wheel is prevented, operates locking means to prevent the winding shaft from rotating in the direction in which the webbing is pulled out; an ELR lever which is usually located at a position apart from the lock wheel and which, at a time when a vehicle suddenly decelerates, engages with the lock wheel so as to prevent rotation of the lock wheel; and an ALR lever which is selectively held at the position where the ALR lever engages with the lock wheel (i.e., engaged position) and at the position where the ALR lever is separated from the lock wheel (i.e., disengaged position). Further, a release gear for switching the position of the ALR lever is disposed coaxially with the winding shaft.

The release gear is provided to decelerate by the rotation of the winding shaft so as to rotate in the direction opposite to that of the rotation of the winding shaft, and when the webbing is brought into a state of being pulled out to its full length, the ALR lever is changed from the disengaged position to the engaged position, and when the webbing is brought into a state of being wound by its substantially full amount, the ALR lever is changed from the engaged position to the disengaged position.

On the other hand, the above-described webbing retractor, in which switching between the ELR and ALR is allowed as occasion demands, is not constructed so that the ELR is switched to the ALR in a state in which the webbing is completely pulled out to its full length, and in this webbing retractor, a structure is used in which switching from the ELR to the ALR is effected with somewhat sufficient time. Namely, the relationship of the engagement between the release gear and the ALR lever is set so that switching from the ELR to the ALR is effected in a state immediately before the webbing is pulled out to its full length (i.e., a state in which an end portion of the webbing having a length of 20 to 100 mm from a position where the webbing is engaged with the winding shaft is wound onto the winding shaft immediately before the state in which the webbing is pulled out to its full length). Accordingly, the usable length of the webbing becomes uneven and a usually unused portion of the webbing (the portion of the webbing from the switching position to the end of the webbing engaged with the winding shaft) remains as a dead turn portion on the winding shaft. For this reason, it is necessary to set the cut length of the webbing by taking account of the portion which remains as a dead turn portion, and therefore, the cut length of the webbing becomes longer, thereby resulting in an increase in cost.

SUMMARY OF THE INVENTION

In view of the above-described circumstances, an object of the present invention is to provide a webbing retractor in which, although the ALR function is provided, a webbing can be pulled out to its full length and a portion of the webbing remaining as a dead turn portion can be eliminated.

Further, another object of the present invention is to provide a webbing retractor with a structure that, although the ALR function is provided, the webbing can be pulled out to its full length, and a portion of the webbing remaining as a dead turn portion can be eliminated, is simplified and can easily be manufactured.

A first aspect of the present invention is a webbing retractor comprising: a winding shaft onto which a webbing used for restraining a vehicle occupant is wound; locking means which is actuated to stop rotation of the winding shaft in a direction in which the webbing is pulled out; an ALR lever which can be moved at an operating position where the locking means is actuated and at a non-operating position where the locking means is not actuated, and which is usually urged toward the operating position by urging force; a cam member to which rotation of the winding shaft is transmitted via a gear mechanism so as to hold the ALR lever at the non-operating position from a first state in which the webbing is wound onto the winding shaft substantially to its full length to a second state immediately before the webbing is pulled out substantially to its full length and also set the ALR lever in a state of being movable to the operating position; and stopping means to which rotation of the winding shaft is transmitted via the gear mechanism, the stopping means holding the ALR lever at the non-operating position from the second state to the third state and allowing movement of the ALR lever at the operating position by the urging force when the winding shaft is rotated, from the third state, in a direction in which the webbing is wound, the direction being opposite to the direction in which the webbing is pulled out.

In accordance with the first aspect of the present invention, the rotation of the winding shaft in the direction in which the webbing is pulled out and the rotation of the winding shaft in the direction in which the webbing is wound are transmitted to the cam member and to the stopping means via the gear mechanism. From the first state to the second state, the ALR lever is held at the non-operating position by the cam member. From the second state to the third state, the ALR lever is held at the non-operating position by the stopping means. When the winding shaft is rotated from the third state in the direction in which the webbing is pulled out, the stopping means is rotated via the gear mechanism to allow the movement of the ALR lever at the operating position. Accordingly, the ALR lever is held at the non-operating position by the stopping means from the second state to the third state, and therefore, the rotation of the winding shaft in the direction in which the webbing is pulled out is not prevented and the webbing can accordingly be pulled out to its full length.

A second aspect of the present invention is provided, in the webbing retractor of the first aspect, in which the gear mechanism includes a pinion gear which rotates with the winding shaft, and a reduction gear which engages with the pinion gear and is rotated at a reduced speed in accordance with rotation of the pinion gear, and the stopping means is a stopper portion provided in the reduction gear.

A third aspect of the present invention is provided, in the webbing retractor of the second aspect, in which the reduction gear includes a first intermediate gear portion and a second intermediate gear portion; the cam member is a cam plate member rotatably supported by the winding shaft, the cam plate member including a first driven gear portion which meshes with the first intermediate gear portion in a range of a predetermined central angle around the winding shaft so as to rotate the cam plate member, a first region in which when the ALR lever corresponds to the cam plate member, the ALR lever is held at the non-operating position against the urging force, and a second region in which when the ALR lever corresponds to the cam plate member, the ALR lever can be moved at the operating position by the urging force; and the cam plate member includes a second driven tooth portion, in which during a time from the second state to the third state the second driven tooth portion engages with a portion of the second intermediate gear portion to rotate the cam plate member so that the second region corresponds to the ALR lever, and after the winding shaft is rotated from the third state by a predetermined amount in the direction in which the webbing is wound and is further rotated in the same direction, the second driven tooth portion engages with an other portion of the second intermediate gear portion to rotate the rotate the cam plate member so that the first intermediate gear portion and the first driven gear portion are restored to a meshed state.

In accordance with the third aspect of the present invention, from the first state to the second state, the ALR lever is maintained in a state corresponding to the first region of the cam plate member, and the reduction gear is rotated due to the rotation of the pinion gear so that the stopper portion is moved at a position where the ALR lever is held at the non-operating position. From the second state to the third state, the cam plate member is rotated by the portion of the second intermediate gear portion so that the ALR lever corresponds to the second region of the cam plate member. When the winding shaft is rotated from the third state in the direction in which the webbing is wound, the reduction gear is rotated so that the stopper portion reaches a position at which the ALR lever can be moved at the operating position, and the ALR lever is moved at the operating position by the urging force. Further, when the winding shaft is rotated by a predetermined amount from the third state in the direction in which the webbing is wound, the second driven gear portion engages with the other portion of the second intermediate gear portion to rotate the cam plate member, and the first intermediate gear portion and the first driven gear portion are restored to an engaged state.

A fourth aspect of the present invention is a webbing retractor comprising: a winding shaft onto which a webbing used for restraining a vehicle occupant is wound; locking means which is actuated to stop rotation of the winding shaft in a direction in which the webbing is pulled out; an ALR pawl which can be moved at an operating position where the locking means is actuated and at a non-operating position where the locking means is not actuated, and which is usually urged toward the operating position by urging force; a reduction gear mechanism which slows down rotation of the winding shaft; a cam member rotated in such a manner as to interlock with the reduction gear mechanism, the cam member including a first region which allows movement of the ALR pawl at the operating portion by the urging force when the ALR pawl corresponds to the cam member, and a second region which allows the ALR pawl to be held at the non-operating position when the ALR pawl corresponds to the cam member; and a disk control member rotated by the cam member and including a third region which allows movement of the ALR pawl at the operating position by the urging force when the ALR pawl corresponds to the disk control member, and a fourth region which allows the ALR pawl to be held at the non-operating position when the ALR pawl corresponds to the disk control member, wherein when the winding shaft is rotated in the direction in which the webbing is pulled out from a first state in which the webbing is wound onto the winding shaft substantially to its full length to a second state immediately before the webbing is pulled out substantially to its full length, the ALR pawl is held at the non-operating position by the fourth region, when the winding shaft is rotated in the direction in which the webbing is pulled out from the second state to a third state in which the webbing is pulled out from the winding shaft substantially to its full length, the disk control member is rotated by the cam member so that the ALR pawl is changed from a state of being held at the non-operating position by the fourth region to a state of being held at the non-operating position by the second region, and further when the winding shaft is rotated from the third state, by a first predetermined amount, in a direction in which the webbing is wound, which is opposite to the direction in which the webbing is pulled out, the cam member is rotated so that the ALR pawl corresponds to the third region, and the ALR pawl is thereafter moved at the operating position by the urging force, and subsequently, when the winding shaft is rotated by a second predetermined amount in the direction in which the webbing is wound, the disk control member is rotated by the cam member, and the ALR pawl corresponds to the fourth region so as to be moved at the non-operating position.

In accordance with the fourth aspect of the present invention, the ALR pawl is maintained at the non-operating position by an interlock stopping portion of the cam member from the second state immediately before the webbing is pulled out to its full length to the third state in which the webbing is pulled out substantially to its full length. For this reason, the rotation of the winding shaft in the direction in which the webbing is pulled out is not stopped and the webbing can accordingly be pulled out to its full length.

A fifth aspect of the present invention is provided, in the webbing retractor of the fourth aspect, which further comprises: a sensor pawl for an acceleration sensor, which can be moved at a first position where the locking means is actuated and at a second position where the locking means is not actuated, and is provided to be moved from the second position to the first position when a vehicle on which the webbing retractor is installed suddenly decelerates, wherein the cam member includes a third region for holding the sensor pawl at the second position when the winding shaft is rotated, by a third predetermined amount, from the first state in the direction in which the webbing is pulled out.

In accordance with the fifth aspect of the present invention, while the webbing is being pulled out from the first state by the third predetermined amount, the sensor pawl is held at the second position by the third region of the cam member, and therefore, it is possible to prevent occurrence of an end locking state in which the locking means cannot be released with the webbing being pulled out.

DESCRIPTION OF THE PREFERRED EMBODIMENTS

Figure 1:
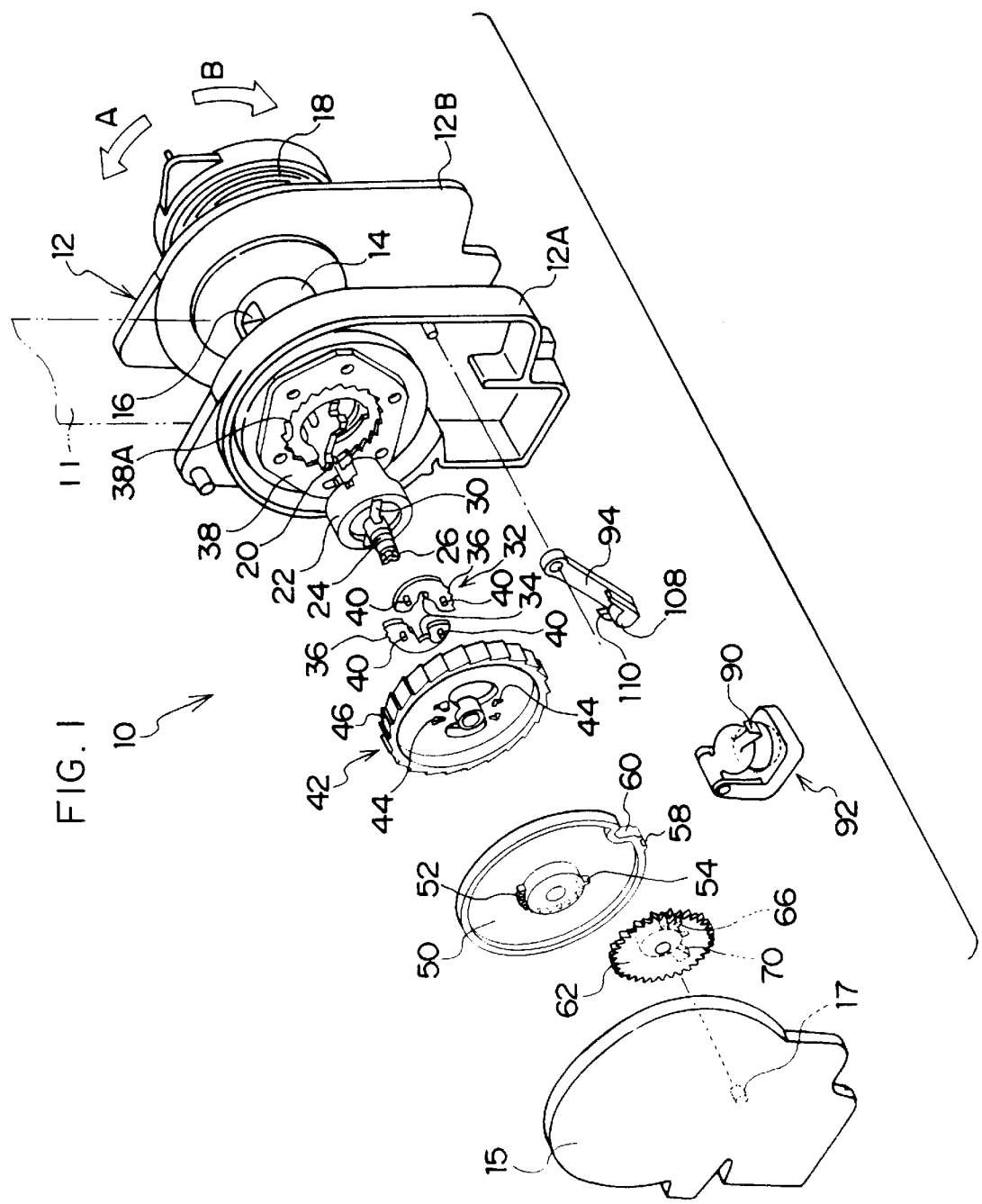
FIG. 1 is an exploded perspective view of a webbing retractor according to a first embodiment of the present invention.
Figure 2:
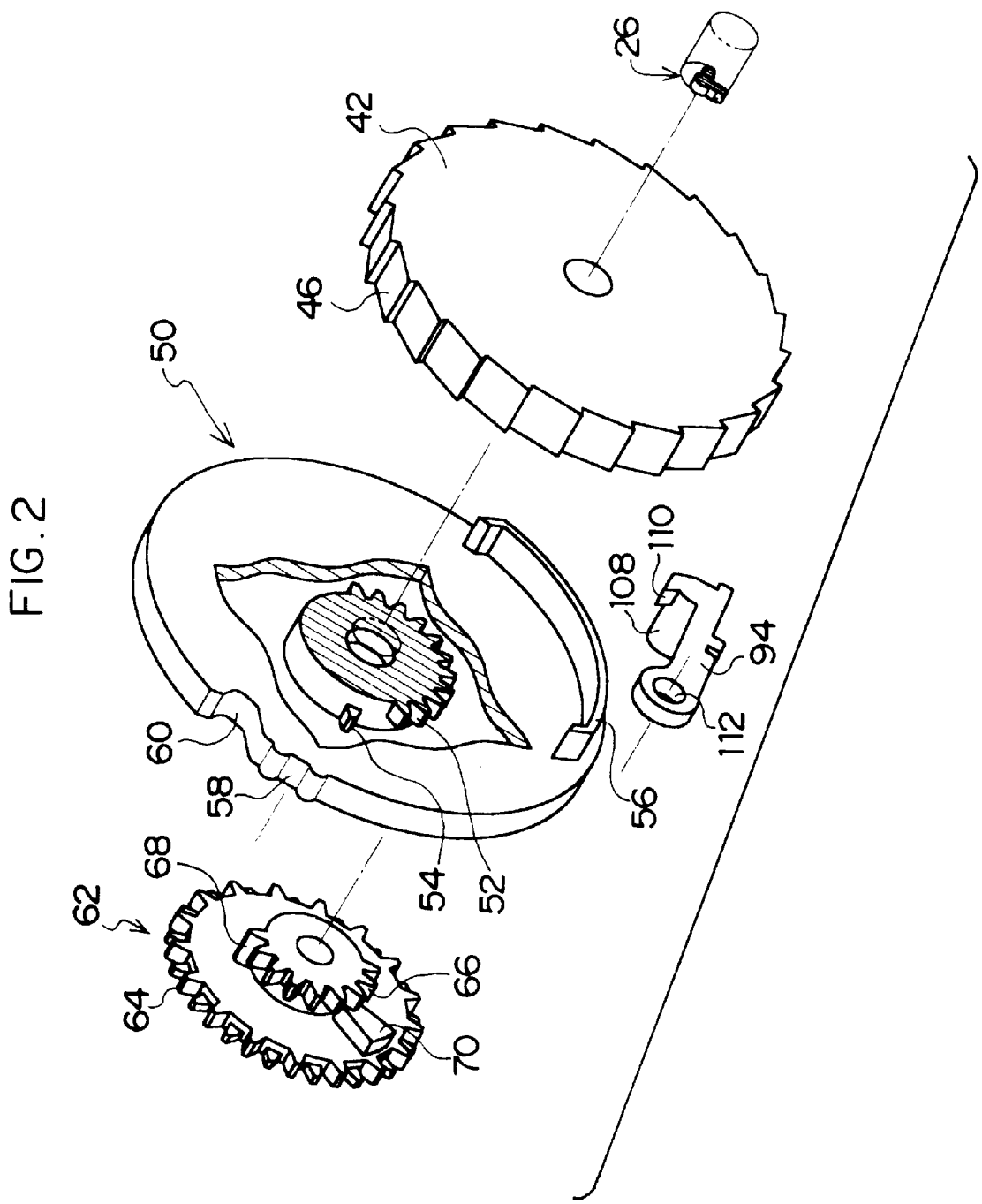
FIG. 2 is an exploded perspective view showing a principal portion of an ALR gear mechanism of the webbing retractor according to the first embodiment of the present invention.
Figure 3:
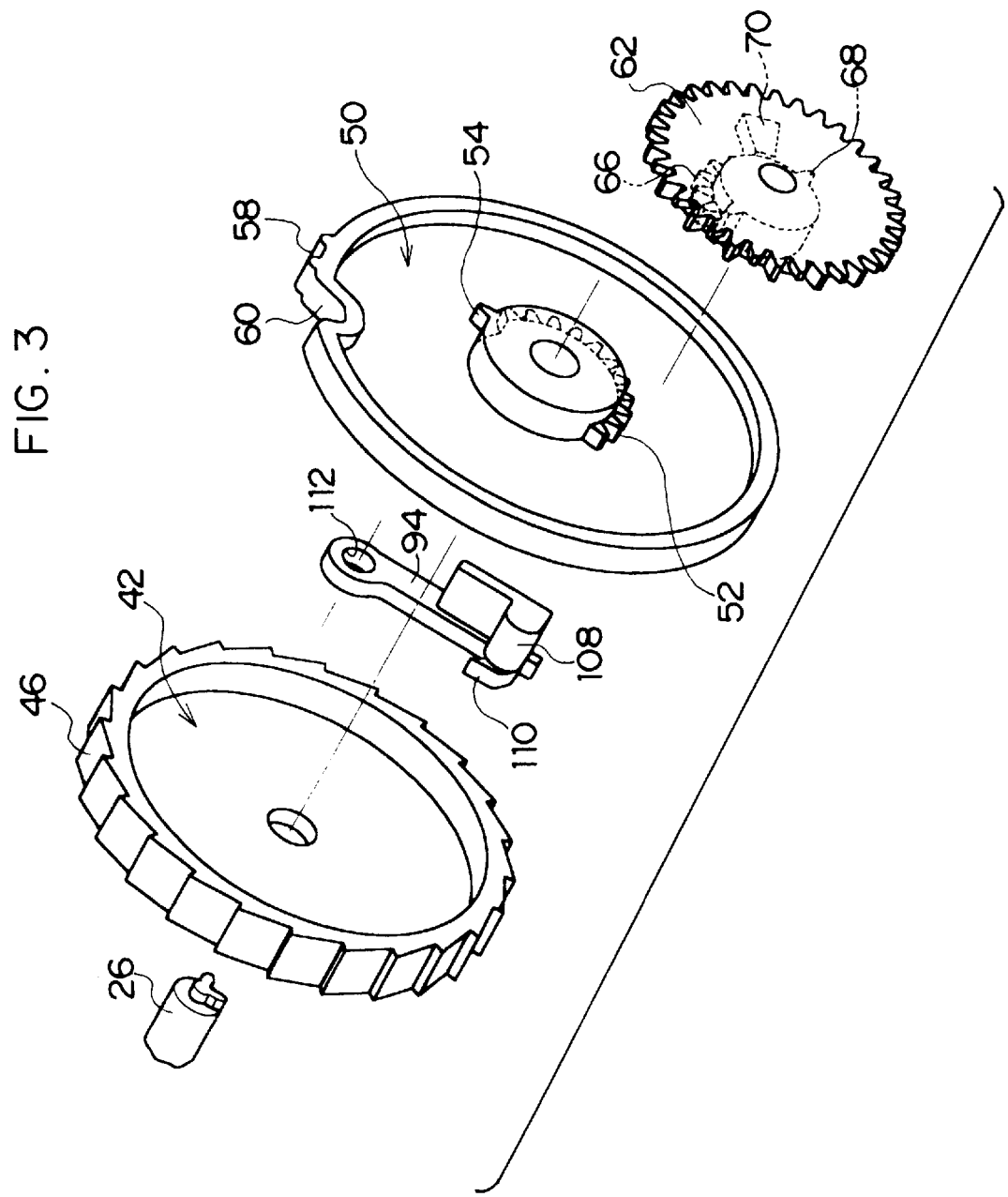
FIG. 3 is an exploded perspective view showing the principal portion of the ALR gear mechanism of the webbing retractor, seen from the other side surface, according to the first embodiment of the present invention.

FIG. 1 shows an exploded perspective view of a webbing retractor according to a first embodiment of the present invention.

A webbing retractor main body 10 is constructed such that a frame 12 is fixed to a vehicle body by mounting bolts (not shown). The frame 12 includes a pair of leg portions 12A, 12B which extends from side portions thereof parallel to each other. A cover side plate 15 is installed at the leg portion 12A as shown toward the front in FIG. 1.

A winding shaft 14 is supported by these leg portions 12A, 12B. A through hole 16 is formed in the central portion of the winding shaft 14 so as to pass through the winding shaft 14 in a radial direction. One end of a webbing for restraining a vehicle occupant is inserted in the through hole 16 so as to be fastened onto the winding shaft 14. Further, one end (the inner end) of a spiral spring 18 is fastened to a rear end (at the side of the leg portion 12B) of the winding shaft 14 so as to constantly urge the winding shaft 14 in a direction in which the webbing is wound around the winding shaft 14 (i.e., the direction indicated by arrow A in FIG. 1). For this reason, the webbing 11 is usually wound around the winding shaft 14. By pulling out the webbing 11 and by causing a tongue plate (not shown) installed at the other end of the webbing to be engaged with a buckle device (not shown) installed on a vehicle body, the vehicle occupant can be brought into a state in which the webbing is applied thereto.

A bifurcated protrusion 20 which forms a part of locking means is provided at an end of the winding shaft 14 (at the side of the leg portion 12A) and a transmitting member 22 is further fixed to the end of the winding shaft 14. A projecting portion 24 is formed to project from the center of the transmitting member 22 and a pinion gear 26 is formed at the end of the projecting portion 24. A through hole 30 is formed near a base portion of the projecting portion 24. After the transmitting member 22 is fitted into the end of the winding shaft 14 and the protrusion 20 passes through the through hole 30, the protrusion 20 is disposed so as to project from the transmitting member 22.

A pair of lock plates 32 which forms another part of the locking means is disposed around the projecting portion 24. These lock plates 32 are each formed to have a substantially C-shaped configuration in which a substantially U-shaped cutout concave portion 34 is formed in the central portion thereof. These lock plates 32 are provided to rotate together with the winding shaft 14 in such a manner that the protrusion 20 of the winding shaft 14 corresponds to the cutout concave portions 34. The total dimension of the cutout concave portions 34 in the transverse direction (i.e., a distance between respective positions on the concave portions 34 which are disposed to be furthermost from each other) is made slightly larger than the transverse dimension of the protrusion 20 and the lock plates 32 are provided to be relatively rotatable with respect to the winding shaft 14 only at a predetermined angle.

A claw portion 36 is formed at one end of each of the lock plates 32. The claw portions 36 are each provided to correspond to a lock tooth 38A of an internal gear ratchet wheel 38 fixed to the leg portion 12A so as to form the locking means together with the lock plates 32.

Further, a pair of pins 40 is formed to project from each of the lock plates 32 and is inserted into each of elongated holes 44 formed in a lock wheel 42. The lock wheel 42 is formed as an external gear ratchet wheel having a large diameter so as to be supported by the projecting portion 24 of the transmitting member 22 and is further provided to be relatively rotatable with respect to the winding shaft 14. A ratchet gear 46 is formed on an outer periphery of the lock wheel 42. The lock wheel 42 is constantly urged by urging force of a helical coil spring (not shown) in a direction in which the winding shaft 14 rotates to pull out the webbing (i.e., the direction indicated by arrow B in FIG. 1). Accordingly, each of the pins 40 of the lock plates 32 is usually positioned at the side of one end of the corresponding elongated hole 44 and the claw portions 36 of the lock plates 32 are each separated from the lock tooth 38A. However, when relative rotation is generated between the lock wheel 42 and the winding shaft 14 which rotates in the direction in which the webbing is pulled out, rotational lag occurs in the lock wheel 42 against the urging force of the helical coil spring. When rotational lag occurs in the lock wheel 42, the pins 40 of the lock plates 32 are each guided to the side of the other end of the corresponding elongated hole 44 and the claw portions 36 accordingly mesh with the lock tooth 38A.

As illustrated in FIGS. 1 through 4, and 11, a cam plate member 50 having the shape of a substantially circular plate and forming a cam member is supported by the projecting portion 24 in such a manner as to be positioned between the lock wheel 42 and the pinion gear 26. A first driven gear portion 52 and a second driven tooth portion 54 are respectively formed integrally with the central portion on the surface of the cam plate member 50 at the side of the pinion gear 26. The first driven gear portion 52 is formed as a partially toothed gear in which teeth are formed substantially in a half circle and the second driven tooth portion 54 is formed with only one tooth being disposed at a predetermined position at a level different from the first driven gear portion 52.

Further, a circular arc-shaped restriction wall 56 is formed to project from a predetermined position on the surface of the cam plate member 50 at the side of the lock wheel 42 in such a manner as to correspond to an outer periphery or its vicinity of the ratchet gear 46. A retaining portion 58 and an engaging/stopping operation portion 60 are formed in an outer peripheral portion of the circular plate-shaped cam plate member 50. The retaining portion 58 is formed in such a manner that two protruding portions each having a half-columnar shape are disposed at a predetermined interval and the engaging/stopping operation portion 60 is disposed adjacent to the retaining portion 58. The engaging/stopping operation portion 60 is formed as a substantially U-shaped concave portion and the side surface thereof at the side of the retaining portion 58 is formed as a gently sloping surface.

An intermediate gear 62 is supported by a shaft portion 17 formed upright on the cover side plate 15 in such a manner as to be positioned between the first driven gear portion 52 and the second driven tooth portion 54 of the cam plate member 50, and the pinion gear 26. The intermediate gear 62 includes a large-diameter reduction gear 64 engaged with the pinion gear 26, and a first intermediate gear portion 66 and a second intermediate gear portion 68 which are formed to project coaxially from the center of the surface of the intermediate gear 62 at the side of the cam plate member 50, and further includes a fan-shaped trapezoidal stopper portion 70 which forms stopping means at a predetermined position on the surface of the intermediate gear 62 at the side of the reduction gear 64.

The pinion gear 26 and the reduction gear 64 form a reduction gear mechanism based on the intermittent movement thereof. During one rotation of the pinion gear 26, the reduction gear 64 continuously rotates the space of two teeth and intermits one rotation (namely, during one rotation of the pinion gear 26, the reduction gear 64 effects one rotation and intermits one rotation).

Figure 12:
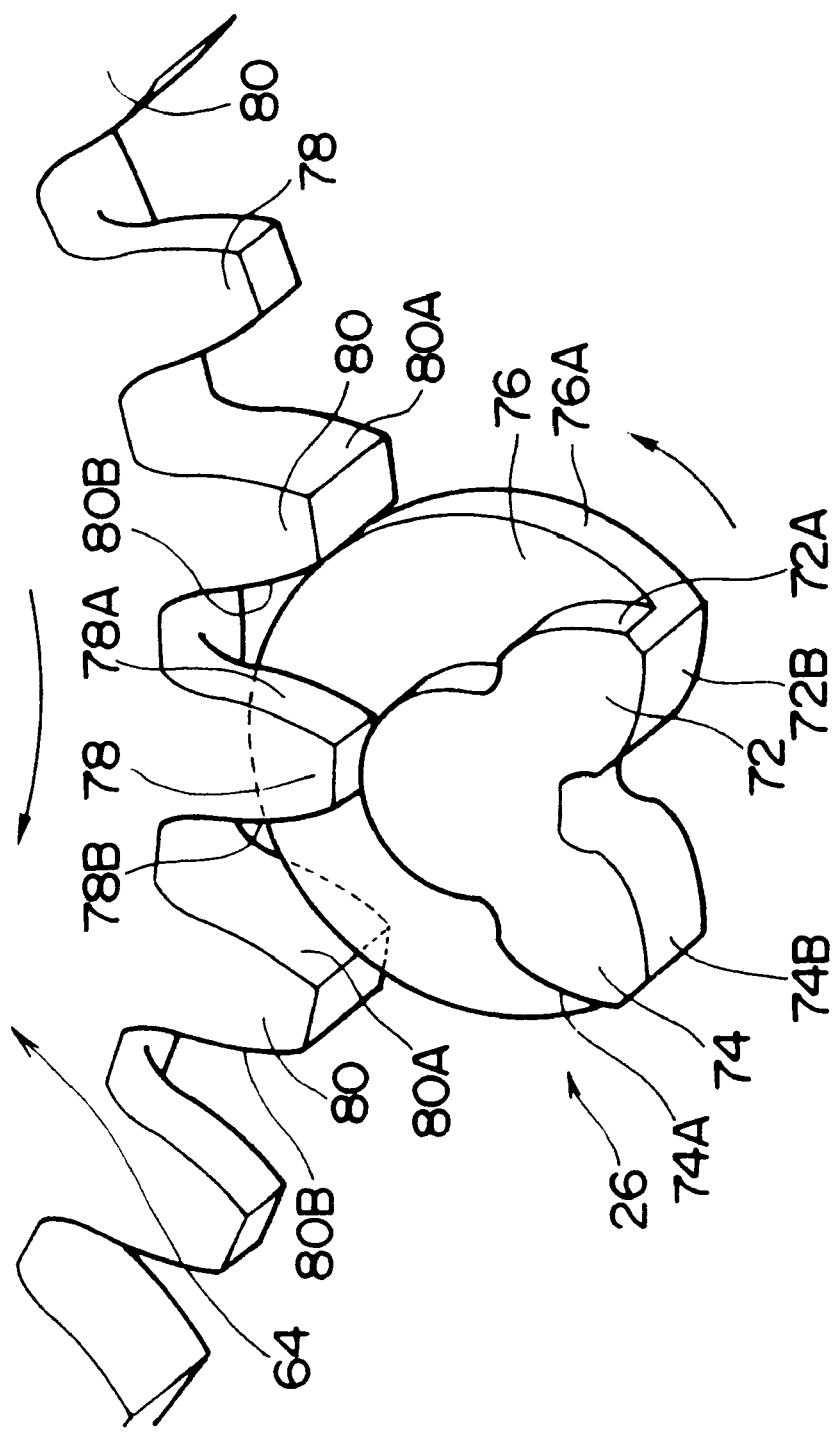
FIG. 12 is a perspective view of the principal portion, which shows a state in which a pinion gear and a reduction gear are engaged with each other in the webbing retractor according to the first embodiment of the present invention.
Figure 13:
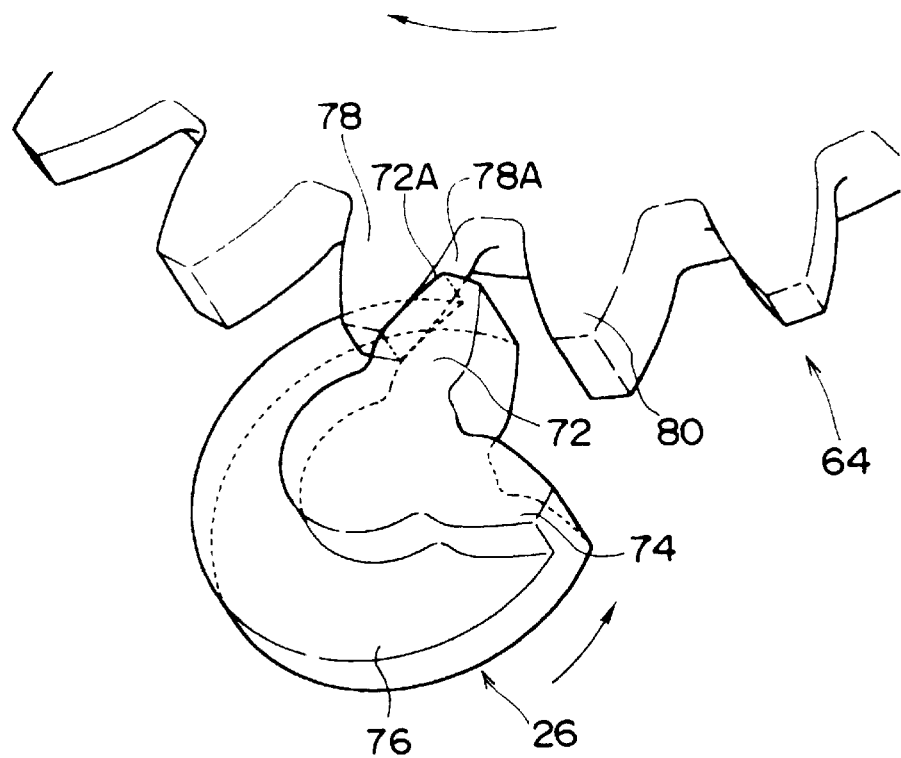
FIG. 13 is a perspective view of the principal portion, which shows a state in which the pinion gear and the reduction gear are engaged with each other in the webbing retractor according to the first embodiment of the present invention.
Figure 14:
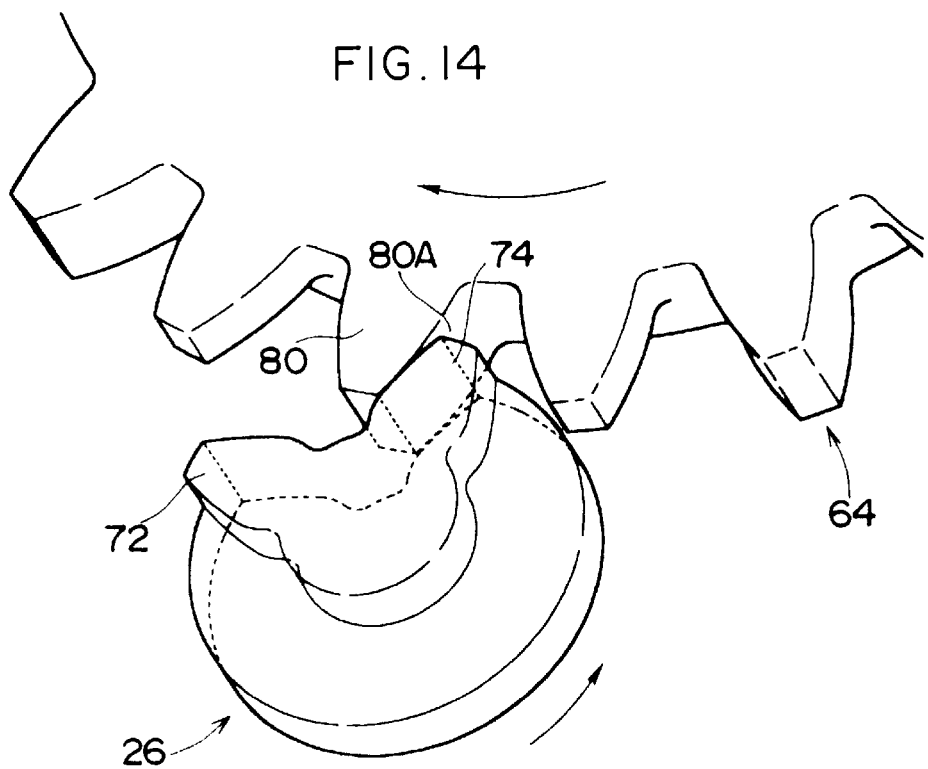
FIG. 14 is a perspective view of the principal portion, which shows a state in which the pinion gear and the reduction gear are engaged with each other in the webbing retractor according to the first embodiment of the present invention.

As illustrated in FIGS. 12 through 14, the number of gear teeth of the pinion gear 26 serving as a drive gear is determined in such a manner as described below. Assuming that the number of teeth determined by a module, i.e., an arbitrary number smaller than a value obtained by division of the diameter of a pitch circle by the module, for example, the number of teeth obtained by the value given by division of the diameter of the pitch circle, is four, the number of gear tooth of the pinion gear 26 is set to be two, which is smaller than the above-described number of teeth determined by the module. Then, among the four teeth, two teeth are omitted and the remaining two adjacent teeth are formed as continuous gear teeth 72, 74.

The pinion gear 26 is constructed such that gear teeth 72, 74 and a stopper 76 are formed integrally and coaxially with each other. The gear teeth 72, 74 have half-width tooth surfaces 72A, 74A and large-width tooth surfaces 72B, 74B, respectively. The stopper 76 includes a stopper surface 76A whose center is the same as that of an addendum circle of the gear teeth 72, 74. Namely, the stopper surface 76A is formed on the rear surface of the gear teeth 72, 74 (i.e., the surface thereof toward the rear in FIG. 13) in such a manner as to be formed to have a stepped portion, i.e., disposed to be offset in the axial direction. The stopper 76 is provided to prevent rotation of the reduction gear 64 with the stopper surface 76A being interposed between the two adjacent gear teeth 80 of the reduction gear 64, which will be described later.

The reduction gear 64 includes a plurality of teeth 78 each having the same tooth face as that of each of the tooth faces 72A, 74A of the gear teeth 72, 74 of the pinion gear 26, and also includes a plurality of teeth 80, each having a tooth face whose width is the same as that of each of the tooth faces 72B, 74B. The pluralities of teeth 78 and 80 are arranged alternately. Namely, the teeth 78 of the reduction gear 64 are disposed at an upper side of the reduction gear 64 (i.e., toward the front in FIG. 13) and respectively abut against the tooth faces 72A, 74A of the gear teeth 72, 74 of the pinion gear 26. Further, the stopper surface 76A comes into the rear side of the tooth face of each of the teeth 78 of the reduction gear 64. With the stopper surface 76A of the pinion gear 26 and the two teeth 80 of the reduction gear 64 meshing with or corresponding to each other, the rear surface of each of the teeth 78 of the reduction gear 64 and the front surface of the stopper 76 (i.e., the surface of the stopper toward the front in FIG. 13) face each other.

In the reduction gear mechanism based on intermittent movement of the pinion gear 26 and the reduction gear 64, the pinion gear 26 rotates in a counterclockwise direction from the state shown in FIG. 12 so that the stopper 76 comes out from between the two teeth 80 of the reduction gear 64. Then, as shown in FIG. 13, the tooth face 72A of the gear tooth 72 meshes with the tooth face 78A of the tooth 78 of the reduction gear 64, and the tooth 78 of the reduction gear 64 is rotated in a clockwise direction. Namely, the reduction gear 64 rotates the space of one tooth. When the pinion gear 26 further rotates, as shown in FIG. 14, the tooth face 74B of the gear tooth 74 meshes with the tooth face 80A of the tooth 80 of the reduction gear 64 and the reduction gear 64 further rotates the space of one tooth. When meshing between the gear teeth 72, 74 and the reduction gear 64 is released, as shown in FIG. 12, the stopper surface 76A of the stopper 76 meshes with the tooth faces 80A, 80B of the two teeth 80 of the reduction gear 64 and the rotation of the reduction gear 64 is thereby limited. Namely, when the stopper 76 meshes with the teeth 80 of the reduction gear 64, the reduction gear 64 cannot rotate freely.

For this reason, when the pinion gear 26 makes one rotation, one intermittent movement with the reduction gear 64 rotating the space of two teeth is effected, and the reduction gear ratio can be improved. Meanwhile, the gear teeth 72, 74 and the pinion gear 26 are formed integrally by taking account of the strength of the gear teeth 72, 74 of the pinion gear 26, and therefore, even when the number of the gear teeth is made smaller than the value obtained by dividing the diameter of the pitch circle of the pinion gear 26 by the module, no impediment occurs in the strength of the gear teeth 72, 74.

The first intermediate gear portion 66 of the intermediate gear 62 meshes and interlocks with the first driven gear portion 52 of the cam plate member 50 so as to rotate the cam plate member 50 in the range of a predetermined angle. For this reason, the first intermediate gear portion 66 is formed as a partially toothed gear having only teeth corresponding to the teeth formed substantially in the half circle of the first driven gear portion 52.

Meanwhile, any one of the first intermediate gear portion 66 and the first driven gear portion 52 may be formed as the partially toothed gear. In this case, in the gear in which tooth portions are provided over the entire circumference thereof, some tooth portions are not used. Further, when meshing between the first intermediate gear portion 66 and the first driven gear portion 52 is released, these gear portions 66, 52 are brought into a state of free rotation.

A second intermediate tooth portion 68 of the intermediate gear 62 is formed in such a manner that tooth portions at both ends of the first intermediate gear portion 66 are respectively provided to extend to the surface of the intermediate gear 62. The second intermediate gear portion 68 is engaged with the second driven tooth portion 54 of the cam plate member 50. The second driven tooth portion 54 is disposed at the same pitch as that of the first driven gear portion 52 and is formed by one tooth which is disposed at a position apart from the end of the first driven gear portion 52 by one tooth. For this reason, the second driven tooth portion 54 meshes with the second intermediate tooth portion 68 the space of one pitch by tooth surfaces, at the side where no tooth portion is formed, of the two teeth of the second intermediate tooth portion 68.

Figure 4:
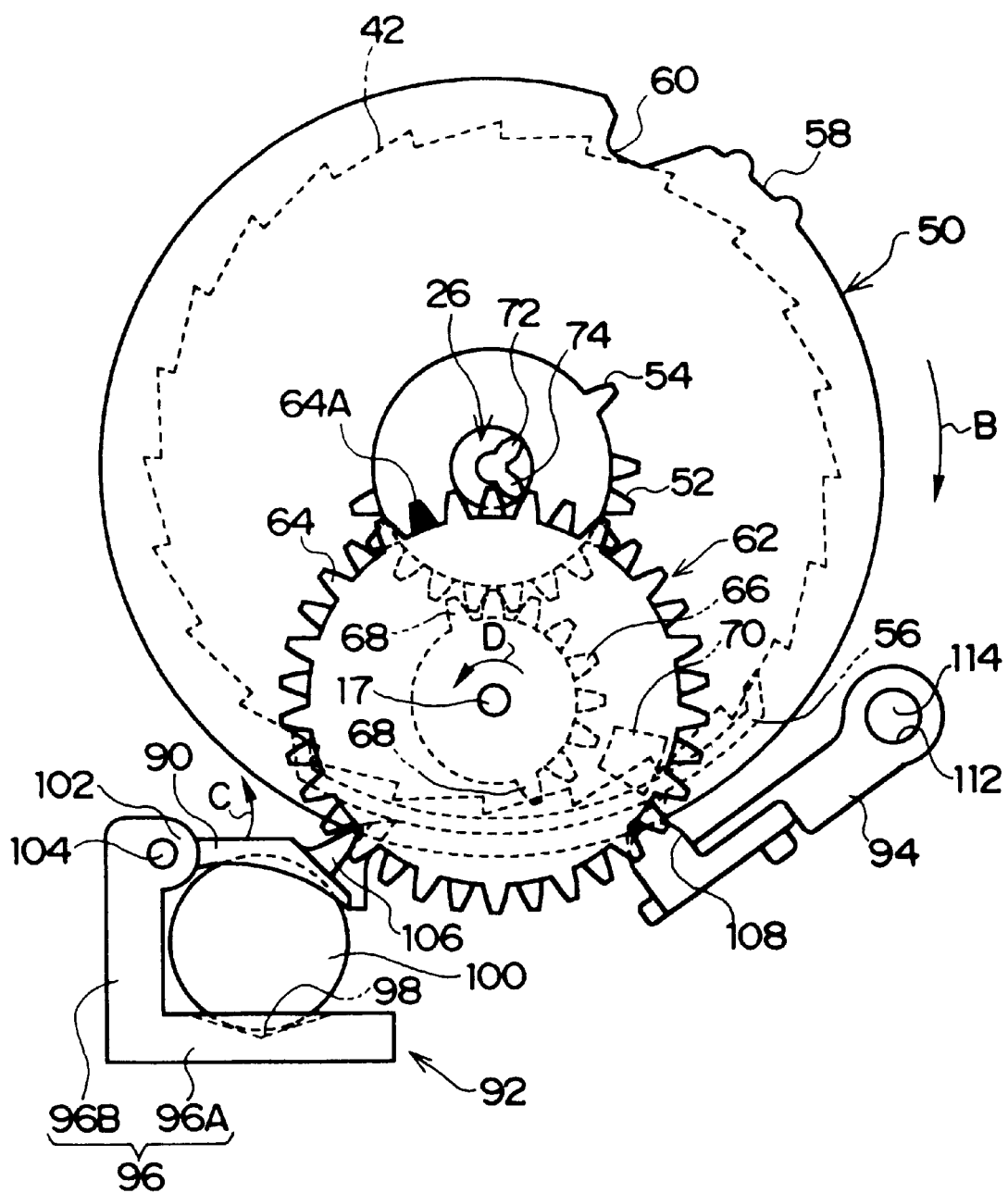
FIG. 4 is a front view showing an initial state of the ALR gear mechanism of the webbing retractor, in which the webbing is accommodated to its full length, according to the first embodiment of the present invention.

As shown in FIGS. 1 and 4, an acceleration sensor 92 having an ELR lever 90 and an ALR lever 94 are installed at the leg portion 12A immediately below the lock wheel 42 in the webbing retractor main body 10.

As shown in FIG. 4, in the acceleration sensor 92, a receiving portion 98 having a cone-shaped recessed surface is formed at an upper surface portion of a bottom plate 96A of a case 96 having an L-shaped configuration in side view and a ball 100 is mounted in a rollable manner within the receiving portion 98. A bearing portion 102 is formed at the free end portion of a side plate 96B of the case 96 and an axial pin 104 provided at the base end portion of the ELR lever 90 is supported and received by the bearing portion 102. A recessed surface portion which forms a part of a spherical surface is formed on the lower central surface of the ELR lever 90 and the ELR lever 90 is disposed such that the upper portion of the ball 100 is covered by the recessed surface portion. Further, an engaging/stopping projection 106 is formed on the free-end upper surface of the ELR lever 90, and when the ELR lever 90 rotates in the direction indicated by arrow C in FIG. 4, the engaging/stopping projection 106 meshes with the ratchet gear 46 of the lock wheel 42 to stop the rotation of the lock wheel 42.

In the acceleration sensor 92 having the above-described structure, when acceleration having a predetermined value or more is activated, the ball 100 rolls up on the cone-shaped slope surface of the receiving portion 98 so as to push up the ELR lever 90 covering the ball 100 in the direction indicated by arrow C in FIG. 4. Subsequently, the engaging/stopping projection 106 engages with the ratchet gear 46 to stop the rotation of the lock wheel 42 in the direction of arrow B in FIG. 4.

As shown in FIGS. 1 through 4, the ALR lever 94 is formed, as a whole, as a substantially rod-shaped member and a sliding contact portion 108 formed as a half-columnar curved surface and a hook claw 110 are formed integrally at the free end portion of the ALR lever 94. A shaft hole 112 is formed at the base end portion of the ALR lever 94 and is supported by causing a shaft rod 114 provided upright from a predetermined position on the leg portion 12A to pass through the shaft hole 112. When the ALR lever 94 rotates around the shaft rod 114 so that the hook claw 110 engages with the ratchet gear 46, the rotation of the lock wheel 42 in the direction indicated by arrow B in FIG. 4 can be stopped. Meanwhile, the ALR lever 94 is urged by a spring (not shown) so as to cause the sliding contact portion 108 to abut by pressure against an outer peripheral portion of the cam plate member 50.

Next, a description will be given of interlocking movement of the pinion gear 26, the intermediate gear 62, the cam plate member 50, and the ALR lever 94 of the webbing retractor according to the first embodiment.

The state in which the webbing is wound to its full length onto the winding shaft 14 of the webbing retractor is shown in FIG. 4. Namely, the pinion gear 26 and the reduction gear 64 engage with each other and the first driven gear portion 52 and the first intermediate gear portion 66 are made to mesh with each other. Further, the sliding contact portion 108 of the ALR lever 94 is brought into contact with the outer peripheral portion of the cam plate member 50.

When a pullout operation of the webbing 11 starts in the above-described initial state, the pinion gear 26 rotates in the direction indicated by arrow B in FIG. 4 together with the rotation of the winding shaft 14. As a result, the reduction gear 64 meshing with the pinion gear 26 rotates in the direction indicated by arrow D in FIG. 4 and the first intermediate gear portion 66 integrated with the reduction gear 64 also rotates in the direction indicated by arrow D. The first driven gear portion 52 meshing with the first intermediate gear portion 66 rotates in the direction indicated by arrow B in FIG. 4. Accordingly, the cam plate member 50 integrated with the first driven gear portion 52 also rotates in the direction indicated by arrow B. In FIGS. 4 through 10, to make the rotational movement of the reduction gear 64 easier to understand, one tooth of reduction gear 64 is indicated as a marking tooth 64A denoted in black in each drawing.

Figure 5:
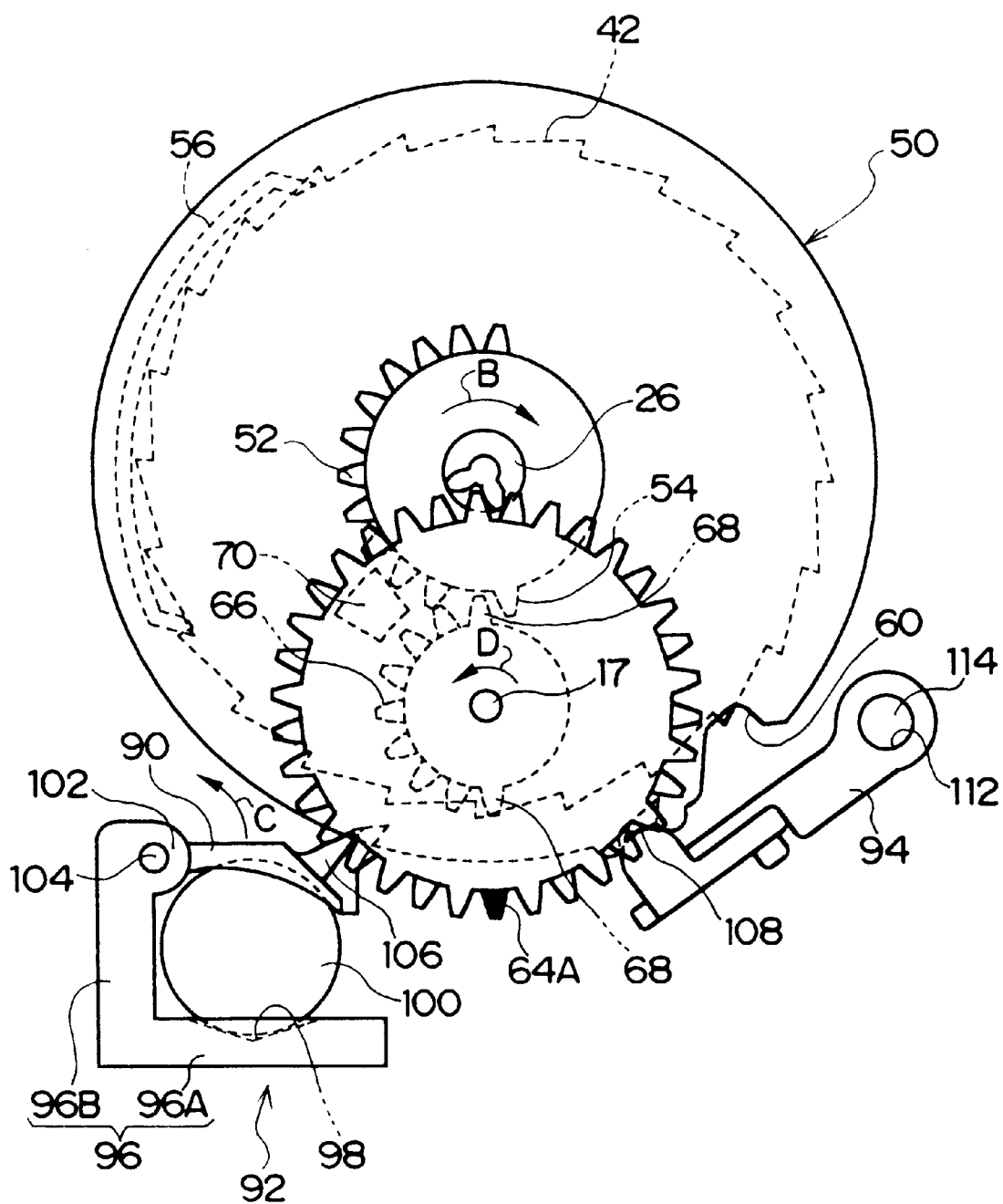
FIG. 5 is a front view showing a first switching standby position in the ALR gear mechanism of the webbing retractor according to the first embodiment of the present invention.

When the webbing is pulled out as described above and the reduction gear 64 makes about one half rotation, the webbing retractor is brought into a first switching standby position shown in FIG. 5. When the webbing retractor is set at the first switching standby position, meshing between the first driven gear portion 52 and the first intermediate gear portion 66 is released. Further, the sliding contact portion 108 of the ALR lever 94 is retained in the retaining portion 58 of the cam plate member 50.

Figure 6:
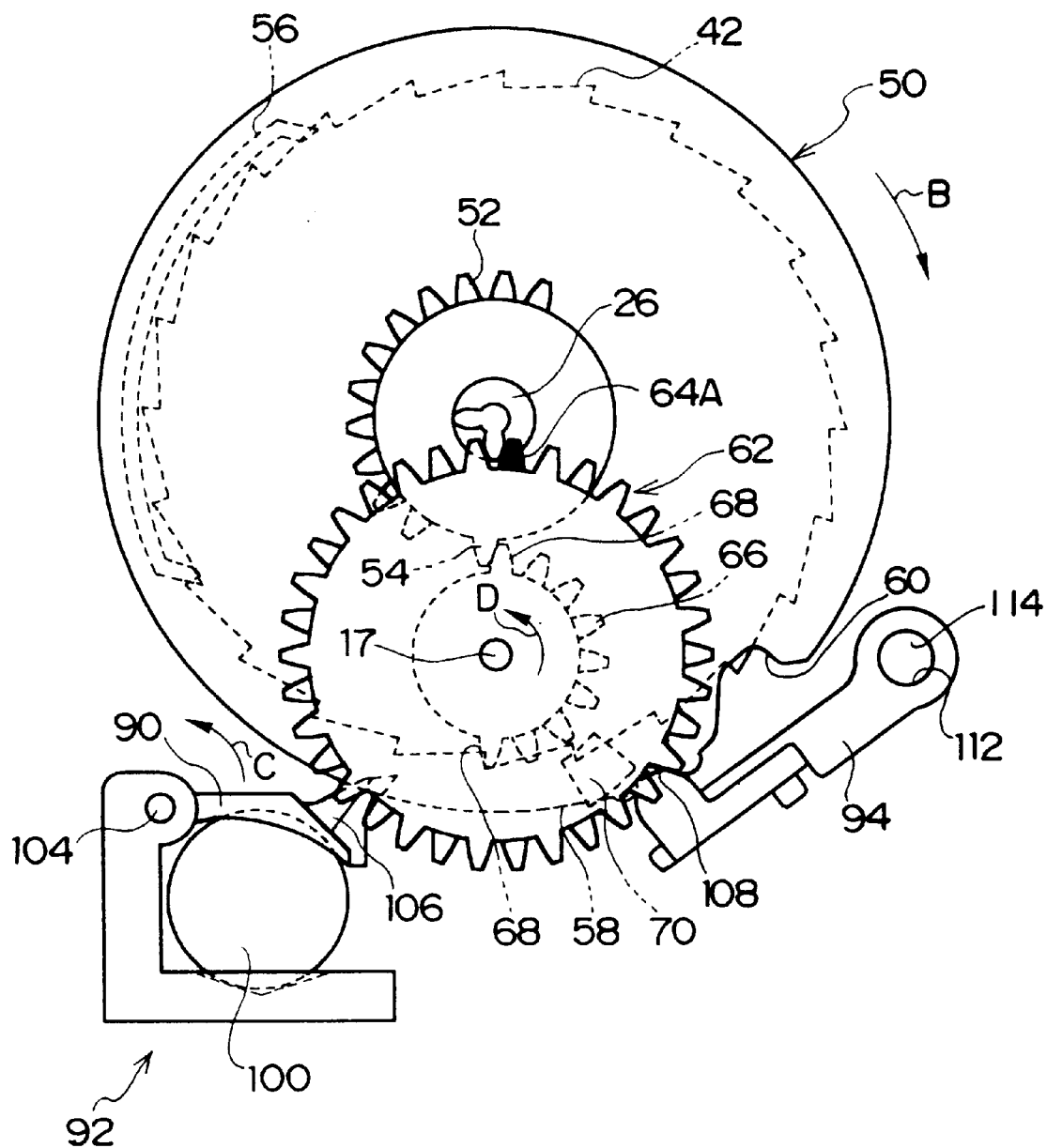
FIG. 6 is a front view of the principal portion showing a second switching standby position of the ALR gear mechanism of the webbing retractor according to the first embodiment of the present invention.

Moreover, when the webbing is pulled out from the above-described state, the reduction gear 64 meshing with the pinion gear 26 rotates in the direction of arrow B about one round. During this movement, the first intermediate gear portion 66 is in a state in which meshing with the first driven gear portion 52 and the second driven tooth portion 54 is released, and therefore, the cam plate member 50 is in a stopped state. This state is shown in FIG. 6, in which one second intermediate tooth portion 68 abuts against the second driven tooth portion 54.

Figure 7:
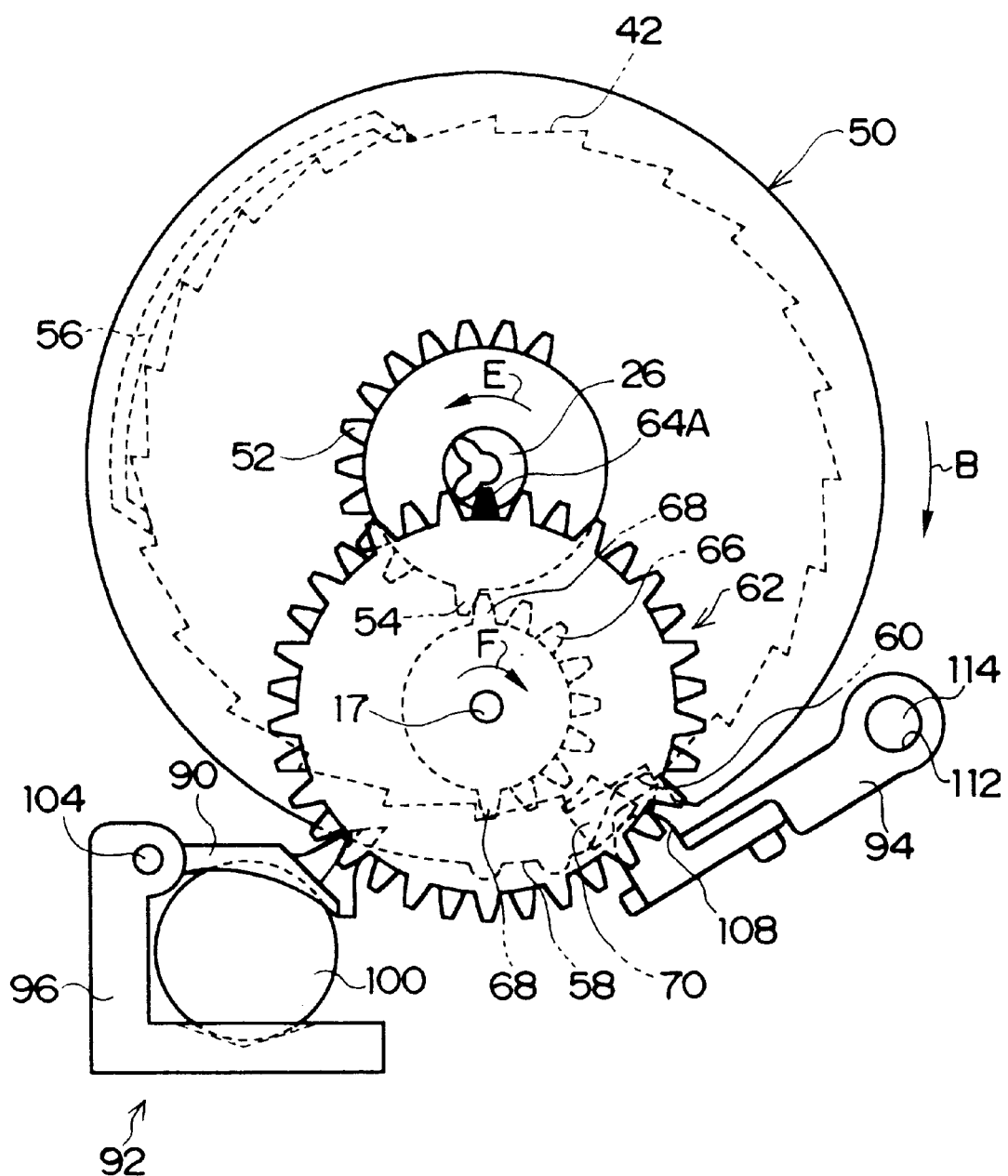
FIG. 7 is a front view of the principal portion of the ALR gear mechanism of the webbing retractor, showing a state in which the webbing is pulled out to its full length, according to the first embodiment of the present invention.

When the webbing is further pulled out to be brought into a state of being completely pulled out from the winding shaft 14, the webbing retractor is brought into the state shown in FIG. 7 in which the webbing is pulled out to its full length. In the state shown in FIG. 7, the reduction gear 64 meshing with the pinion gear 26 rotates from the state shown in FIG. 6 in the direction indicated by arrow D by one pitch or thereabout. As a result, one second intermediate tooth portion 68 rotates the second driven tooth portion 54 in the direction indicated by arrow D so that the cam plate member 50 is brought into a state of rotating in the direction indicated by arrow B at a small angle. At this time, the sliding contact portion 108 of the ALR lever 94 abuts against the stopper portion 70 so that meshing between the hook claw 110 and the ratchet gear 46 is released, and simultaneously, the engaging/stopping operation portion 60 of the cam plate member 50 is brought into a state of facing the sliding contact portion 108 of the ALR lever 94. Namely, the cam plate member 50 is rotated to reach a switching stand-by second position.

Subsequently, when the webbing is rewound in a direction in which the webbing is wound onto the winding shaft 14, the webbing retractor is brought into an ALR switching state shown in FIG. 8. Namely, due to the winding operation of the webbing, the pinion gear 26 rotates in the direction indicated by arrow E in FIG. 8 opposite to that indicated by arrow B and the reduction gear 64 meshing with the pinion gear 26 rotates a bit in the direction indicated by arrow F in FIG. 8 opposite to that indicated by arrow D. As a result, the stopper portion 70 of the intermediate gear 62 is separated from the sliding contact portion 108 of the ALR lever 94. The ALR lever 94 is swung toward the center of the cam plate member 50 by urging force of a spring (not shown) so as to come into the groove-shaped engaging/stopping operation portion 60. As a result, the hook claw 110 of the ALR lever 94 is made to mesh with the ratchet gear 46 of the lock wheel 42. The hook claw 110 meshes with the ratchet gear 46 so as to limit the rotation of the ratchet gear 46 in the direction of arrow B, and when the ratchet gear 46 rotates in the direction opposite to that indicated by arrow B, the movement of the ratchet gear 46 is not limited by the hook claw 110. Namely, the lock wheel 42 having the ratchet gear 46 is allowed to rotate freely in only one direction.

Figure 8:
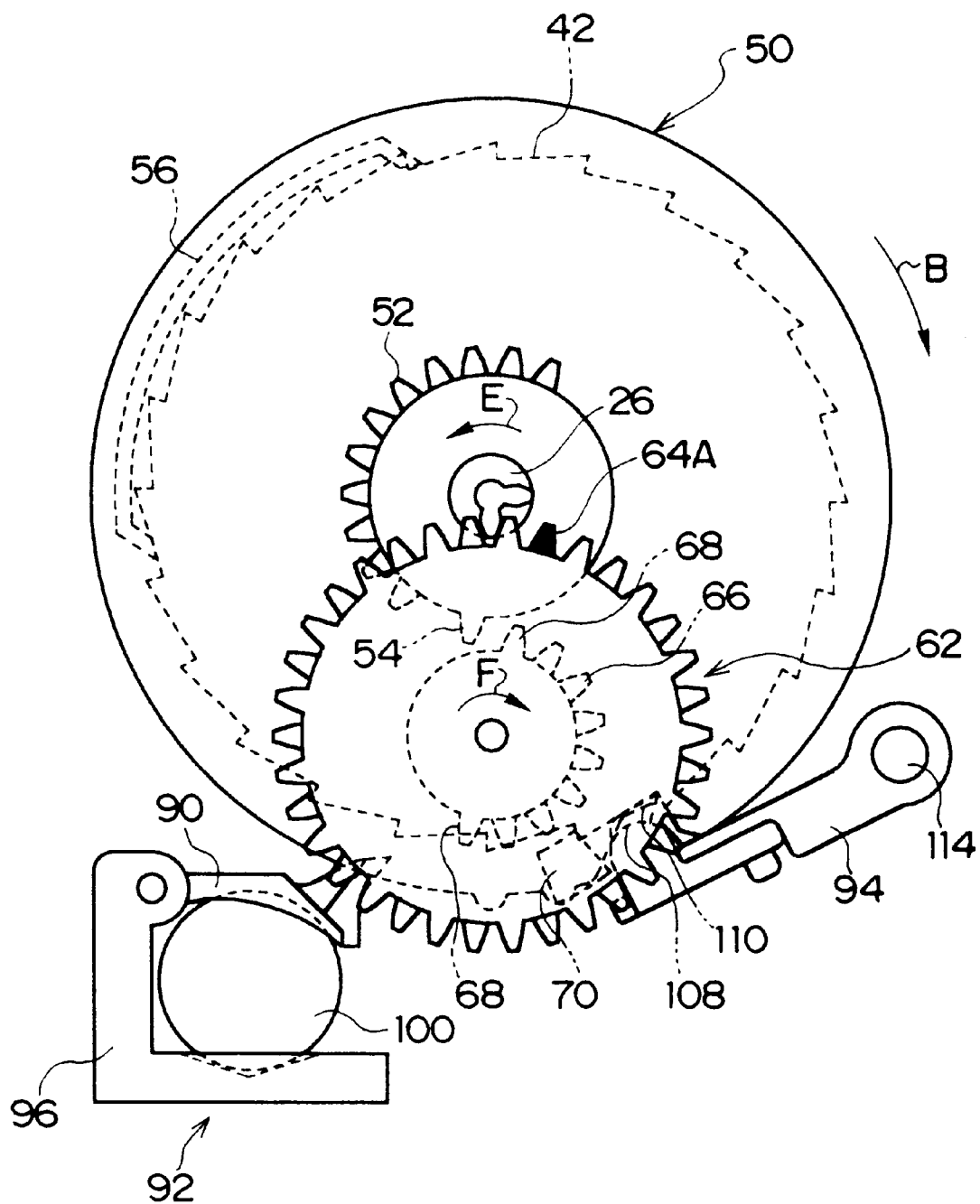
FIG. 8 is a front view of the principal portion of the ALR gear mechanism of the webbing retractor, showing a state in which the ELR is switched to the ALR, according to the first embodiment of the present invention.
Figure 9:
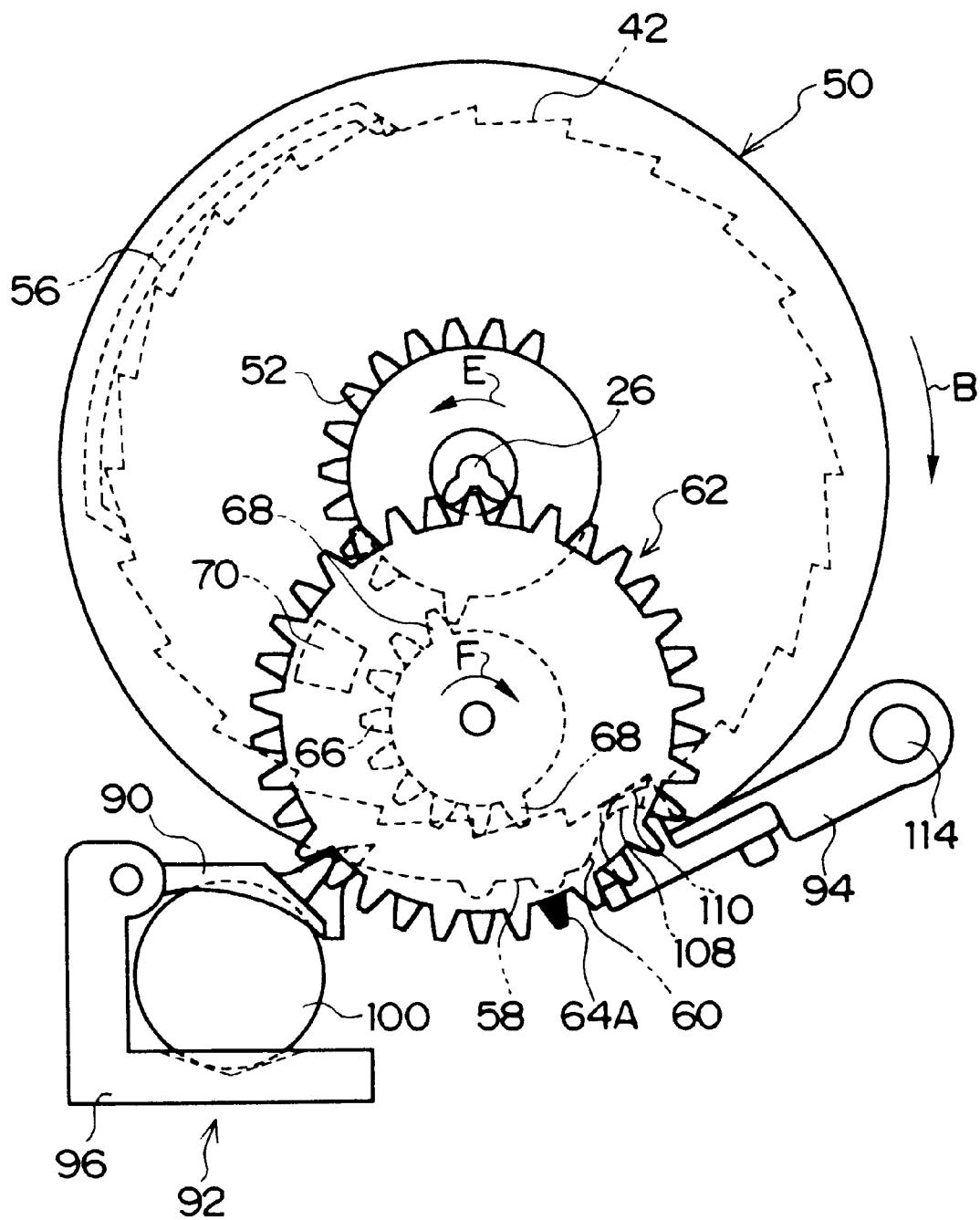
FIG. 9 is a front view of the principal portion of the ALR gear mechanism of the webbing retractor, showing a switching standby state from the ALR to the ELR, according to the first embodiment of the present invention.

When the webbing is further wound from the ALR switching state shown in FIG. 8, the pinion gear 26 rotates in the direction of arrow E together with the rotation of the winding shaft for winding the webbing and the reduction gear 64 meshing with the pinion gear 26 rotates in the direction of arrow F about one half round, so that the webbing retractor is brought into the ALR-to-ELR switching stand-by state shown in FIG. 9. During this operation, the first intermediate gear portion 66 and the second intermediate tooth portion 68 are not meshed with the first driven gear portion 52 and the second driven tooth portion 54, respectively. For this reason, even when the intermediate gear 62 rotates in the direction indicated by arrow F, the cam plate member 50 is held at this position. When the above operation allows the webbing retractor to be brought into the ALR-to-ELR switching standby state shown in FIG. 9, another second intermediate tooth portion 68 is brought into a state of abutting against the second driven tooth portion 54 of the cam plate member 50.

Further, in this state, when the winding operation of the webbing is effected, the reduction gear 64 meshing with the pinion gear 26 is rotated in the direction indicated by arrow F in FIG. 9 so that the second intermediate tooth portion 68 engages with the second driven tooth portion 54, and rotation of the cam plate member 50 in the direction opposite to that indicated by arrow B thereby starts. To continue, when the first intermediate gear portion 66 engages with the first driven gear portion 52, and further continuously, the cam plate member 50 rotates in the direction indicated by arrow E in FIG. 9, the webbing retractor is brought into the ALR-to-ELR switching state shown in FIG. 10. During this operation, the sliding contact portion 108 of the ALR lever 94, which is engaged with the engaging/stopping operation portion 60 of the cam plate member 50, is pushed out along the inclined surface of the engaging/stopping operation portion 60 toward the outer periphery of the cam plate member 50 and slides on the retaining portion 58 and further slides at the side of the outer periphery of the cam plate member 50. Due to this operation, the hook claw 110 of the ALR lever 94 is brought into a state in which meshing between the hook claw 110 and the ratchet gear 46 of the lock wheel 42 is released, i.e., non-engageable state.

Figure 10:
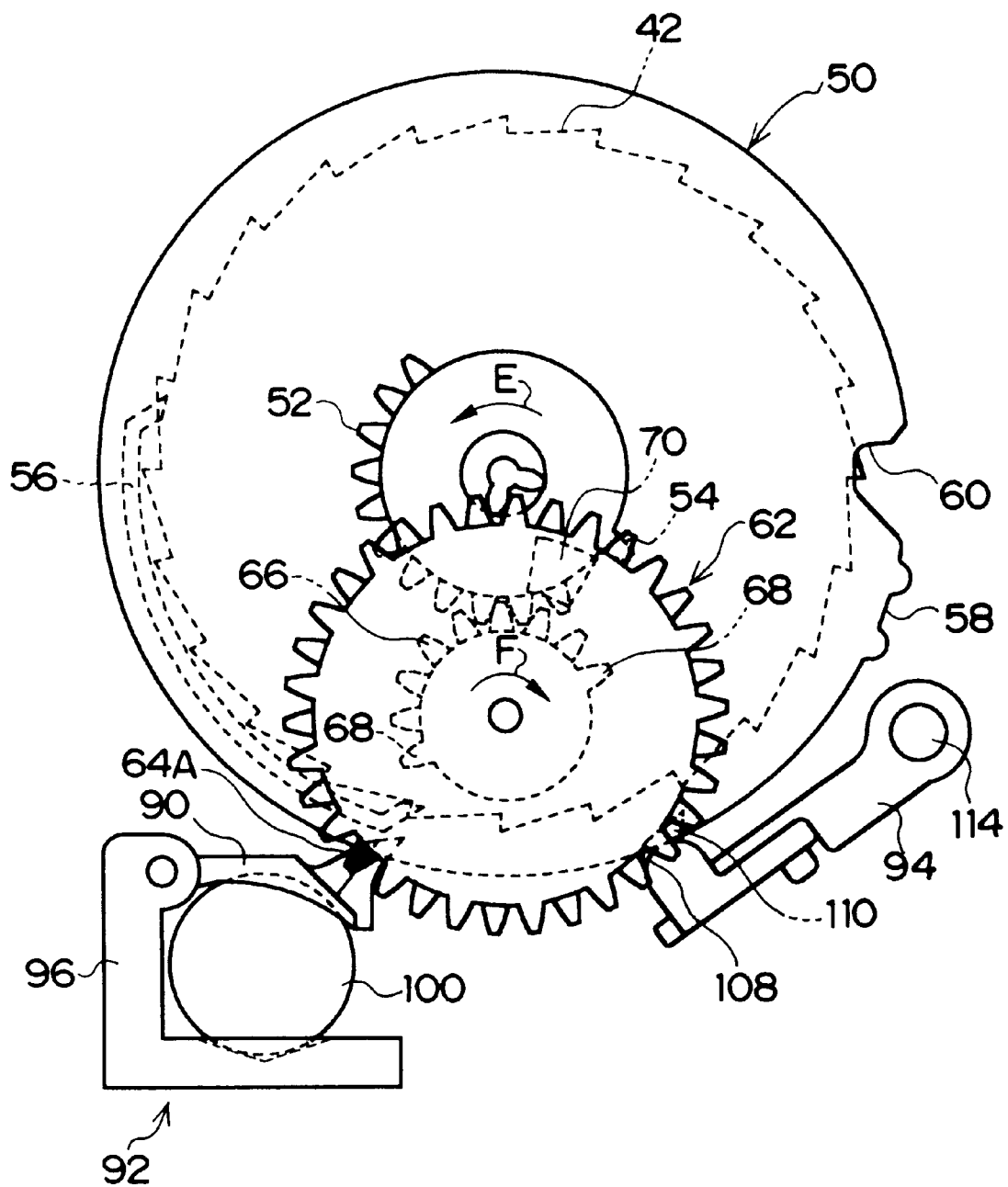
FIG. 10 is a front view of the principal portion of the ALR gear mechanism of the webbing retractor, showing a state in which the ALR is switched to the ELR, according to the first embodiment of the present invention.
Figure 11:
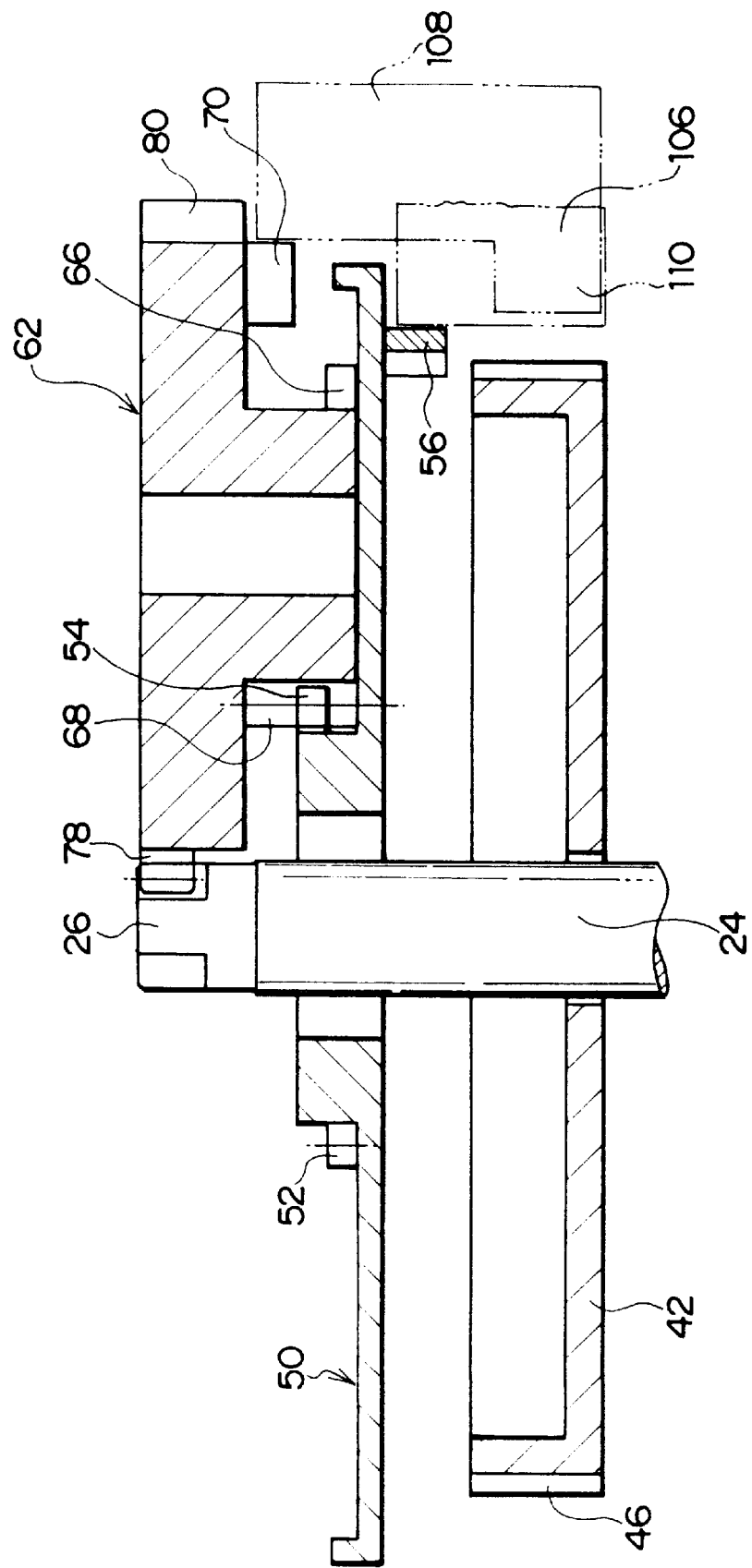
FIG. 11 is an explanatory diagram of the principal portion which shows a cross section of the structure shown in FIG. 4.

Subsequently, when the winding operation of the webbing is further effected, the reduction gear 64 further rotates in the direction indicated by arrow F in FIG. 10 due to the rotation of the pinion gear 26 in the direction opposite to that of arrow B and the cam plate member 50 further rotates in the direction indicated by arrow E in FIG. 10. As a result, the webbing retractor returns in the initial state shown in FIG. 4. During this operation, the restriction wall 56 of the cam plate member 50 rotates to come into a position corresponding to the ELR lever 90. As shown in FIG. 11, the engagement between the engaging/stopping projection 106 of the ELR lever 90 and the ratchet gear 46 of the lock wheel 42 is prevented and the function of the ELR is thereby stopped. Meanwhile, in the state in which the webbing is substantially completely wound onto the winding shaft 14, the webbing is not applied to the vehicle occupant, and therefore, there is no need for the function of the ELR to be exhibited. Therefore, in order to allow a smooth winding operation of the webbing onto the winding shaft 14, the restriction wall 56 stops the function of the ELR. In the first embodiment, during the winding operation of the webbing, the cam plate member 50 is provided to intermittently rotate. For this reason, a configurational range of the restriction wall 56 corresponding to the ELR lever 90 can be made smaller by at least an amount by which the cam plate member 50 stops, and the restriction wall 56 itself can accordingly be made smaller.

Next, a description will be given of application and operation of the webbing retractor according to the first embodiment having the above-described structure.

First, the webbing before being applied to the vehicle occupant is brought into a state of being wound onto the winding shaft 14 to its full length by the urging force of the spiral spring 18. In this state, as shown in FIG. 4, the ALR lever 94 is brought into a state of not being engageable with the ratchet gear 46 of the lock wheel 42 by the cam plate member 50. Namely, the webbing retractor main body 10 in this state is used as the ELR.

When the webbing is applied to the vehicle occupant in the above state, it suffices that the webbing is pulled out against the urging force of the spiral spring 18 while holding a tongue plate. By engaging the tongue plate with the buckle device, the vehicle occupant is brought into a state of the webbing being applied thereto and the driving position thereof can be freely changed.

At the time of sudden deceleration of the vehicle, the ball 86 moves inertially and the ELR lever 90 is rotated around the shaft pin 104 so as to engage the engaging/stopping projection 106 with the ratchet gear 46. For this reason, the rotation of the lock wheel 42 in the direction in which the webbing is pulled out is stopped.

At this time, the occupant moves inertially, and therefore, the webbing is pulled out from the winding shaft 14 and the winding shaft 14 rotates in the direction in which the webbing is pulled out. As a result, relative rotation is generated between the winding shaft 14 and the lock wheel 42. Due to relative rotation, the lock plates 32 rotating together with the winding shaft 14 are constructed such that the pins 40 are moved so as to be guided by the elongated holes 44 of the lock wheel 42, and the claw portions 36 each mesh with the lock tooth 38A of the internal gear ratchet wheel 38 so as to prevent the rotation of the winding shaft 14 in the direction in which the webbing is pulled out. As a result, the vehicle occupant is brought into a state of being restrained reliably by the webbing.

Meanwhile, in the above-described state in which the webbing is applied to the vehicle occupant, the ALR lever 94 does not mesh with the ratchet gear 46 of the lock wheel 42.

The webbing retractor 10 according to the first embodiment can be changed to the state of being used as the ALR as occasion demands (for example, when baggage such as a child seat is secured to a front passenger seat). This switching operation is effected by the webbing being pulled out to its full length.

When the webbing is pulled out from the winding shaft 14 from the state shown in FIG. 4, the cam plate member 50 is intermittently rotated via the intermediate gear 62 as described above. When the webbing is brought into a state immediately before having been pulled out to its full length, the sliding contact portion 108 of the ALR lever 94 is prevented by the stopper portion 70 from coming into the engaging/stopping operation portion 60. For this reason, there is no possibility that the hook claw 110 of the ALR lever 94 will mesh with the ratchet gear 46 of the lock wheel 42, and therefore, rotation of the winding shaft 14 is not stopped. As a result, the webbing can be brought into a state of being pulled out to its full length.

After the webbing has been pulled out to its full length as described above, when the webbing is slightly rewound onto the winding shaft 14 by the urging force of the spiral spring 18, the intermediate gear 62 rotates a bit in the direction indicated by arrow F, opposite to that indicated by arrow D. For this reason, the stopper portion 70 is separated from the sliding contact portion 108 and comes into the engaging/stopping operation portion 60. Accordingly, the hook claw 110 of the ALR lever 94 meshes with the ratchet gear 46 of the lock wheel 42 by the urging force of a spring (not shown). As a result, the rotation of the lock wheel 42 in the direction in which the webbing is pulled out is stopped. Namely, the webbing retractor 10 is switched from the state of being used as the ELR to that of being used as the ALR.

In the state in which the webbing retractor is switched to the ALR, the rotation of the winding shaft 14 in the direction in which the webbing is pulled out is prevented, but the rotation thereof in the direction in which the webbing is wound is allowed. For this reason, after an operation of securing baggage such as a child seat by the webbing has been effected, the remaining portion of the webbing is wound by the urging force of the spiral spring 18 so that baggage such as a child seat can be reliably secured to a vehicle seat.

Meanwhile, when the webbing retractor is switched from the ALR to the ELR, so long as the webbing is again brought into a state of being wound by a predetermined amount, the sliding contact portion 108 is separated from the engaging/stopping operation portion and the webbing retractor is thereby switched from the ALR to the ELR.

As described above, in the first embodiment, when the webbing is pulled out to its full length, the sliding contact portion 108 of the ALR lever 94 is held by the stopper portion 70 so as to prevent the hook claw 110 of the ALR lever 94 from engaging with the lock wheel 42. Therefore, in this state, the webbing can be brought into a state of being pulled out to its full length. For this reason, the usable length of the webbing can be made even and the remaining portion of the webbing wound onto the winding shaft 14 is eliminated, thereby resulting in a decrease of the cut length of the webbing. Accordingly, reduction in cost can be achieved.

In addition, so long as the webbing is wound a bit after the webbing has been brought into a state of being pulled out to its full length, the webbing retractor can reliably be switched from the ELR to the ALR by causing the sliding contact portion 108 of the ALR lever 94 to come into the engaging/stopping operation portion 60.

Further, in the above-described first embodiment, the present invention is applied to the webbing retractor 10 in which, by swinging the ELR lever 90 at the time of sudden deceleration of the vehicle to stop the rotation of the lock wheel 42 in the direction in which the webbing is pulled out, the rotation of the winding shaft 14 in the direction in which the webbing is pulled out is prevented. However, the present invention is not limited to the same, and may also be applied to a webbing retractor which, in addition to the above-described structure of the webbing retractor 10, has a structure such that, after rotation of the winding shaft 14 in the direction in which the webbing is pulled out is prevented at the time of sudden deceleration of the vehicle, the winding shaft 14 itself is swung, and as a result, an intermediate portion of the webbing is instantaneously clamped by a clamp device to prevent extension of the intermediate portion of the webbing.

Next, a second embodiment of the present invention will be described with reference to FIGS. 15 through 26. In the second embodiment, a structure in which a pinion gear of a shaft rotating in accordance with a winding or pullout operation of the webbing and a cam member for the ALR-ELR switching operation. Note that the same members and components as those of the first embodiment will be denoted by the same reference numerals.

Figure 15:
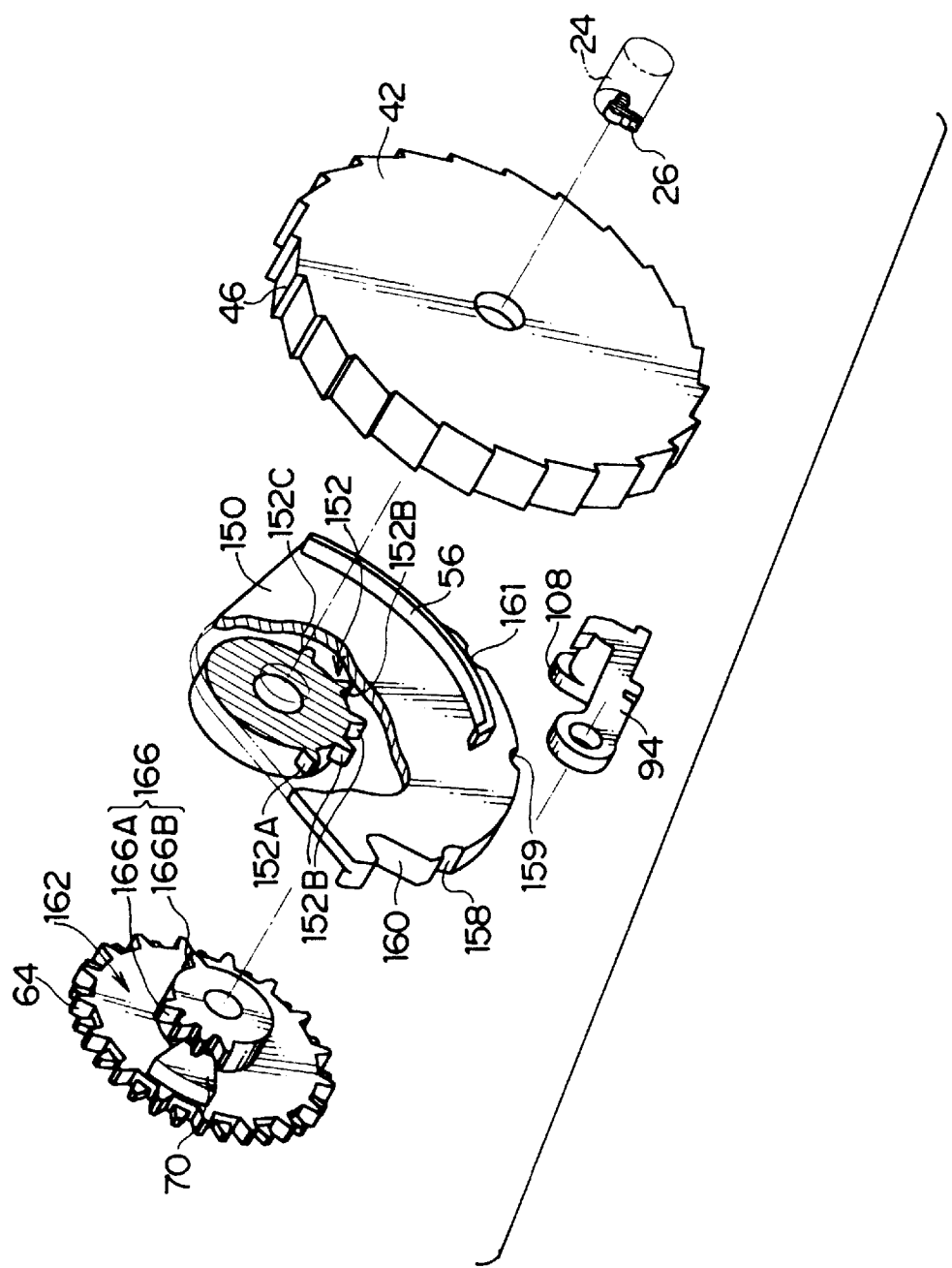
FIG. 15 is an exploded perspective view showing a principal portion of an ALR gear mechanism of a webbing retractor according to a second embodiment of the present invention.
Figure 16:
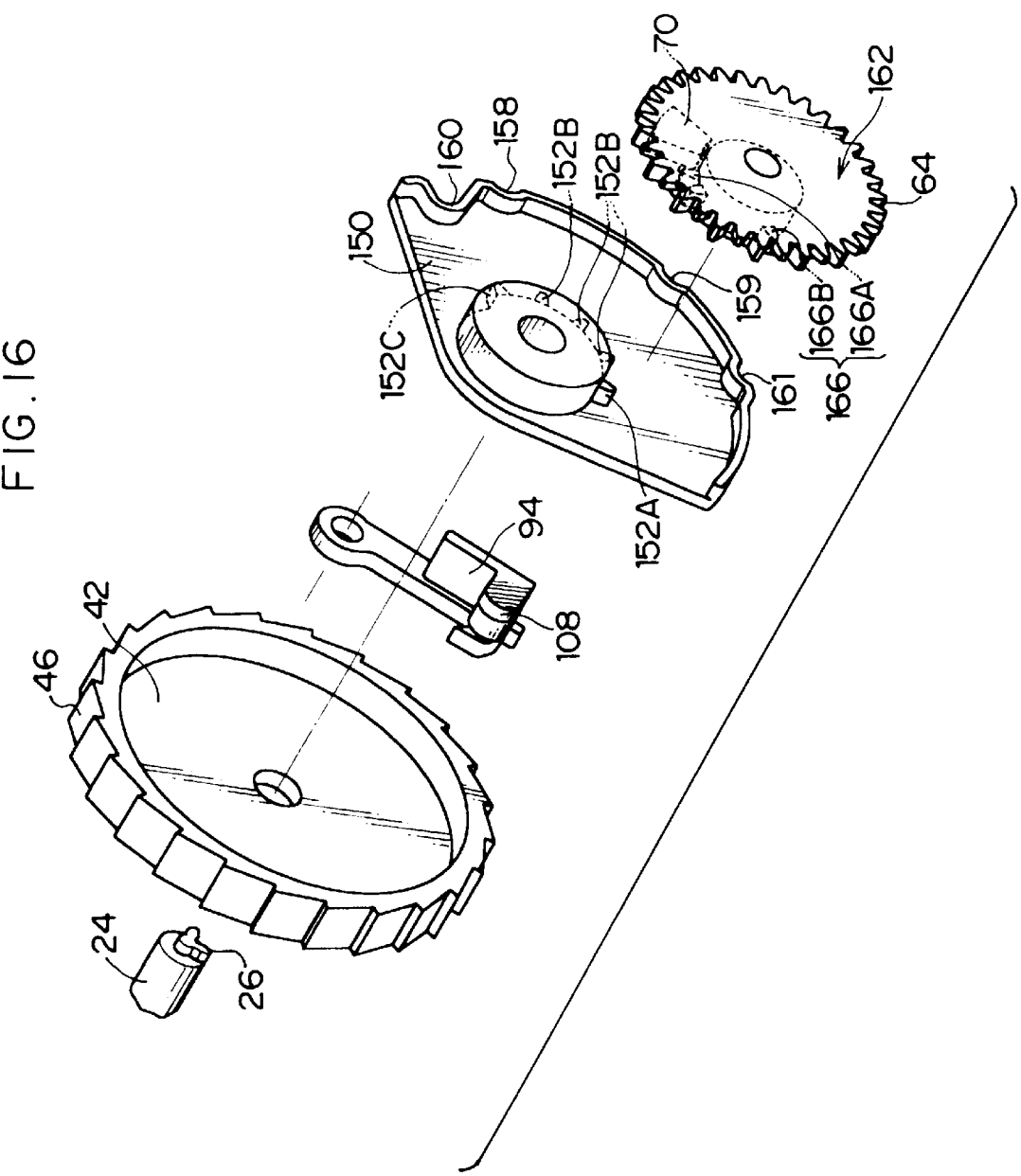
FIG. 16 is an exploded perspective view showing the principal portion of the ALR gear mechanism of the webbing retractor, seen from the other side surface, according to the second embodiment of the present invention.
Figure 17:
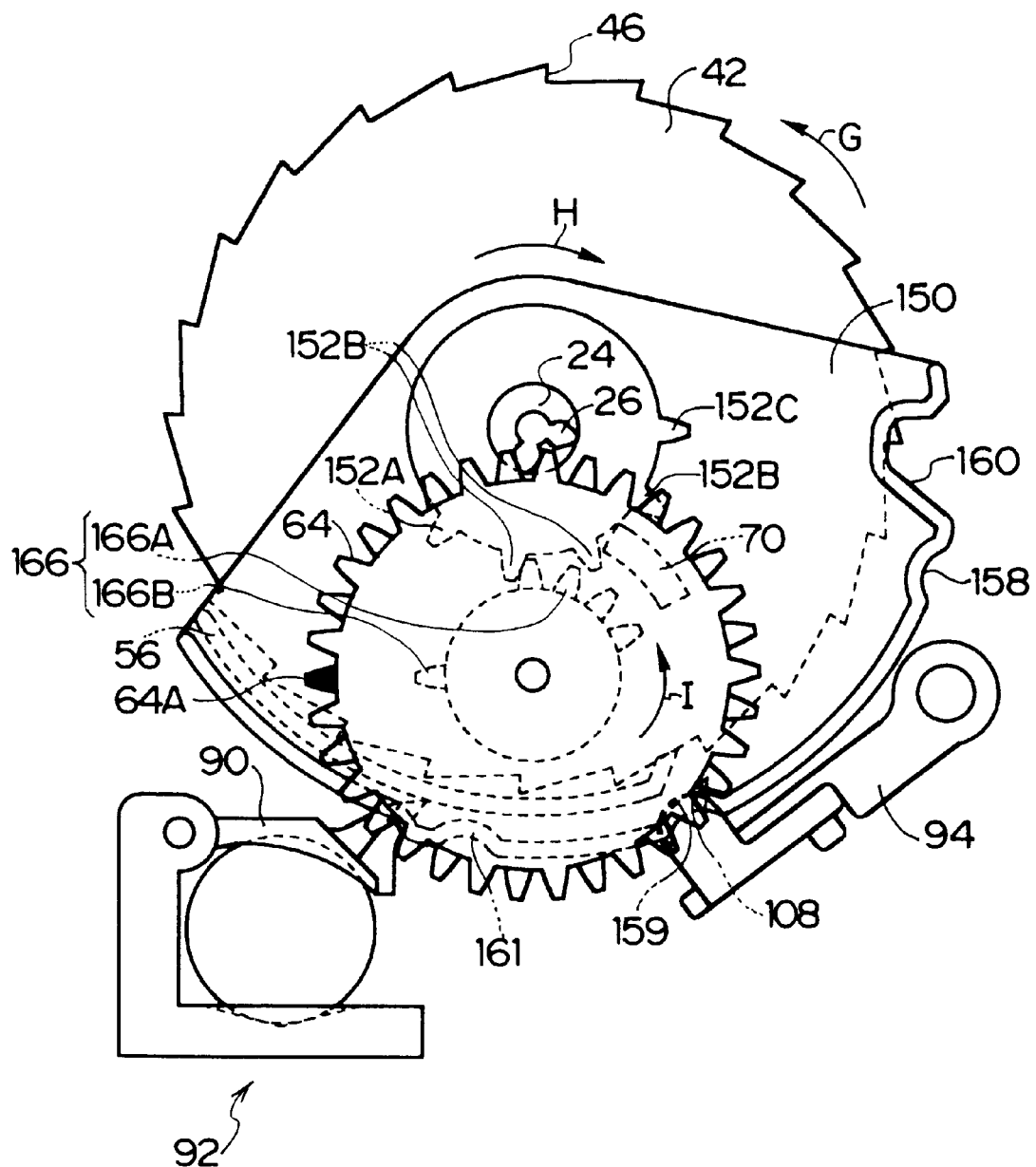
FIG. 17 is a front view showing a state in which switching starts in the ALR gear mechanism of the webbing retractor according to the second embodiment of the present invention.

As shown in FIGS. 15 through 17, a substantially fan-shaped cam plate member 150 which forms a cam member is supported by the projecting portion 24 so as to be positioned between the lock wheel 42 and the pinion gear 26. A driven gear portion 152 in which a partially toothed gear is provided substantially in a half circle of the driven gear portion 152 is formed integrally at the central portion of the surface of the cam plate member 150 at the side of the pinion gear 26.

Further, a restriction wall 56 having the shape of a circular arc is formed to project from a predetermined position on the surface of the cam plate member 150, which the surface facing the lock wheel 42, so as to correspond to the vicinity of the outer periphery of the ratchet gear 46. Moreover, three retaining portions 158, 159, and 161, which are each formed in the shape of a concave portion with a small circular arc portion being cut out, are respectively formed at three predetermined positions in the outer peripheral portion of the cam plate member 150. Further, an engaging/stopping operation portion 160 is formed in the outer peripheral portion of the cam plate member 150 so as to be disposed adjacent to the three retaining portions. The engaging/stopping operation portion 160 is formed as a substantially U-shaped concave portion and the side surface thereof at the side of the retaining portion 158 is formed as a gently sloping surface.

An intermediate gear 162 is supported by the shaft portion 17 (see FIG. 1) formed upright from the cover side plate 15. The intermediate gear 162 includes a reduction gear 64 having a large diameter and meshing with the pinion gear 26, and an intermediate gear portion 166 which is provided coaxially with the intermediate gear 162 so as to project from the center of the surface of the intermediate gear 162 facing the cam plate member 150, and further includes a fan-shaped trapezoidal stopper portion 70, which forms stopping means, at a predetermined position on the surface of the reduction gear 64 which faces the cam plate member 150.

The pinion gear 26 and the reduction gear 64 form a reduction gear mechanism based on intermittent movement similar to that of the above-described first embodiment.

As a result, when the pinion gear 26 makes one rotation, one intermittent movement with the reduction gear 64 rotating the space of two teeth is effected, and the reduction gear ratio can be thereby improved.

The intermediate gear portion 166 of the intermediate gear 162 engages with the driven gear portion 152 of the cam plate member 150 so as to rotate the cam plate member 150 in the range of a predetermined angle. For this reason, the intermediate gear portion 166 is formed as a partially toothed gear in which predetermined tooth portions are provided substantially in a half circle of the intermediate gear portion 166.

Namely, the intermediate gear portion 166 is formed by four tooth portions 166A arranged at regular predetermined pitches as shown in FIG. 15 and one tooth portion 166B disposed at a position apart from the four tooth portions 166A by a predetermined central angle.

Further, the driven gear portion 152 of the cam plate member 150 is formed as a partial toothed gear, which engages with the four tooth portions 166A of the intermediate gear portion 166 and is provided substantially in a half circle of the driven gear portion 152 with every other one being omitted from tooth portions provided at the regular predetermined pitches. The drive gear portion 152 includes one tooth portion 152A, three tooth portions 152B, and one tooth portion 152C, each provided at a predetermined central angle.

When the above-described intermediate gear portion 166 and the driven gear portion 152 mesh with each other, three tooth portions 152B provided at the intermediate portion of the driven gear portion 152 and four tooth portions 166A of the intermediate gear portion 166 mesh with each other in the same way as in the general gear structure. Further, the tooth portion 166B disposed separately from tooth portions 166A is provided to intermittently abut against each of the tooth portions 152A, 152B, and 152C of the driven gear portion 152 correspondingly to the direction in which the intermediate gear 166 rotates, so as to transmit the rotational movement to the driven gear portion 152.

Next, the relational movement of the pinion gear 26, the intermediate gear 162, the cam plate member 150, and the ALR lever 94 of the webbing retractor according to the second embodiment will be described.

Figure 26:
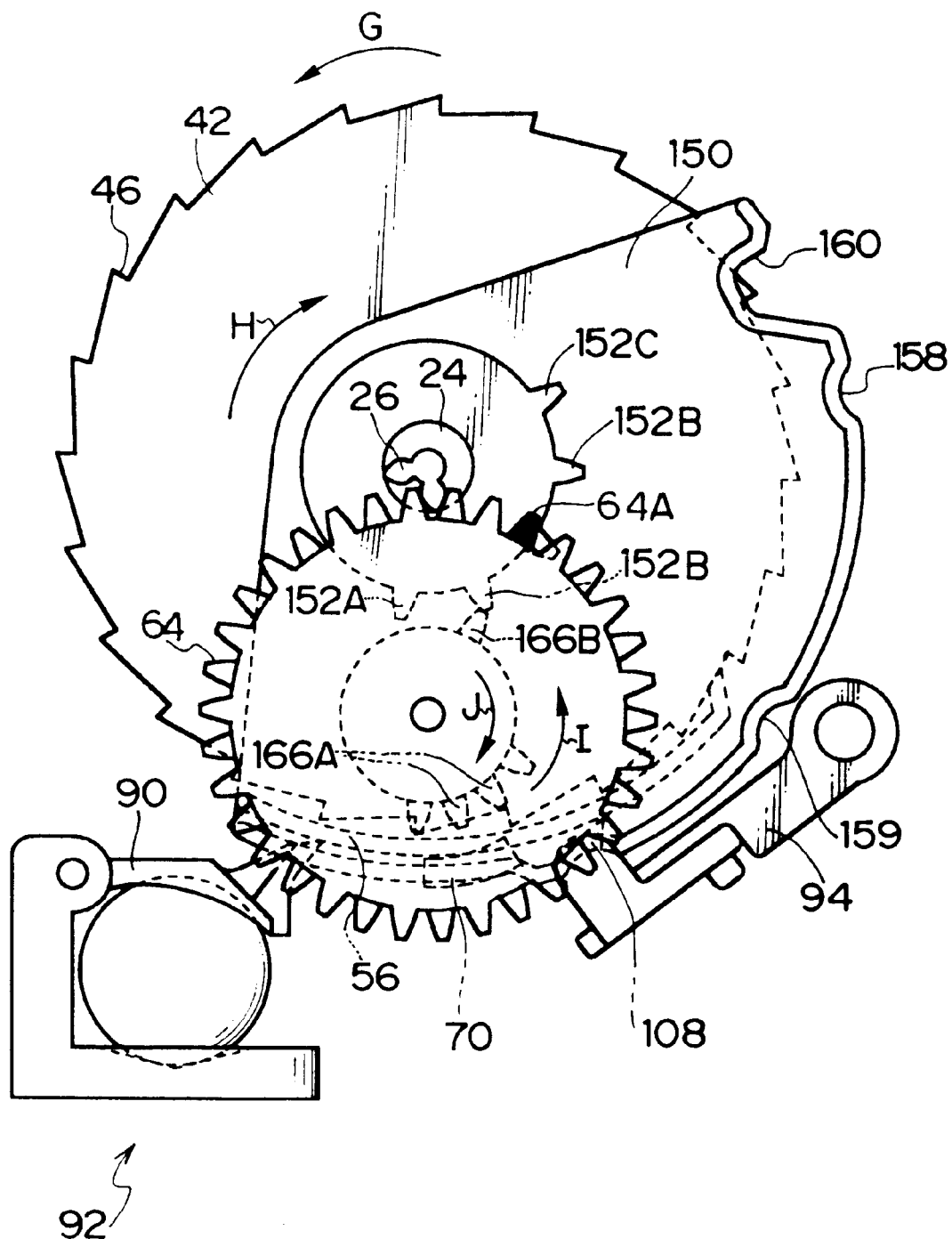
FIG. 26 is a front view showing a state in which the webbing is accommodated to its full length in the ALR gear mechanism of the webbing retractor according to the second embodiment of the present invention.

Further, the state in which the webbing is wound around the winding shaft 14 (see FIG. 1) of the webbing retractor to its full length is shown in FIG. 26. Namely, the pinion gear 26 and the reduction gear 64 engage with each other and the cam plate member 150 is brought into a state of rotating to the maximum rotation position in the direction indicated by arrow G in FIG. 26 in such a manner that one tooth portion 152B of the driven gear portion 152 is pushed by the tooth portion 166B of the intermediate gear portion 166. Further, the sliding contact portion 108 of the ALR lever 94 is brought into contact with the outer peripheral portion of the cam plate member 150. Moreover, the sliding contact portion 108 of the ALR lever 94 is fitted into the retaining portion 161 of the cam plate member 150 so that the rotational operation of the cam plate member 150 is slightly restricted.

When the pullout operation of the webbing starts in the above-described state in which the webbing is wound to its full length, the pinion gear 26 rotates in the direction indicated by arrow H in FIG. 26 with the rotation of the winding shaft 14 (see FIG. 1). As a result, the reduction gear 64 meshing with the pinion gear 26 rotates in the direction indicated by arrow I in FIG. 26 and the intermediate gear portion 166 integrated with the reduction gear 64 also rotates in the direction indicated by arrow I. One tooth portion 166B of the intermediate gear portion 166 abuts against the tooth portion 152A and the driven gear portion 152 rotates only at a small predetermined angle in the direction indicated by arrow H in FIG. 26. Accordingly, the cam plate member 150 integrated with the driven gear portion 152 also rotates at a small predetermined angle in the direction indicated by arrow H. In FIGS. 17 through 26, to make the rotational movement of the reduction gear 64 easier to under stand, one tooth of the reduction gear 64 is indicated as a marking tooth 64A denoted in black in each drawing.

When the webbing is pulled out from the state shown in FIG. 26 as described above, the reduction gear 64 makes about one half rotation so that the webbing retractor is brought into a switching start position shown in FIG. 17. At the switching start position, the tooth portion 166A disposed at the side of the tooth portion 166B of the intermediate gear portion 166 abuts against the tooth portion 152B at the side of the tooth portion 152A of the driven gear portion 152. At this time, since the sliding contact portion 108 of the ALR lever 94 is retained in the retaining portion 159 of the cam plate member 150, the tooth portion 152B is provided to properly abut against the tooth portion 166A in such a manner that the tooth portion 152B of the driven gear portion 152 integrated with the cam plate member 150 is held at a predetermined position. Further, the ELR lever 90 is set in a state of being restricted by the restriction wall 56 so as not to be engaged with the ratchet gear 46.

Figure 18:
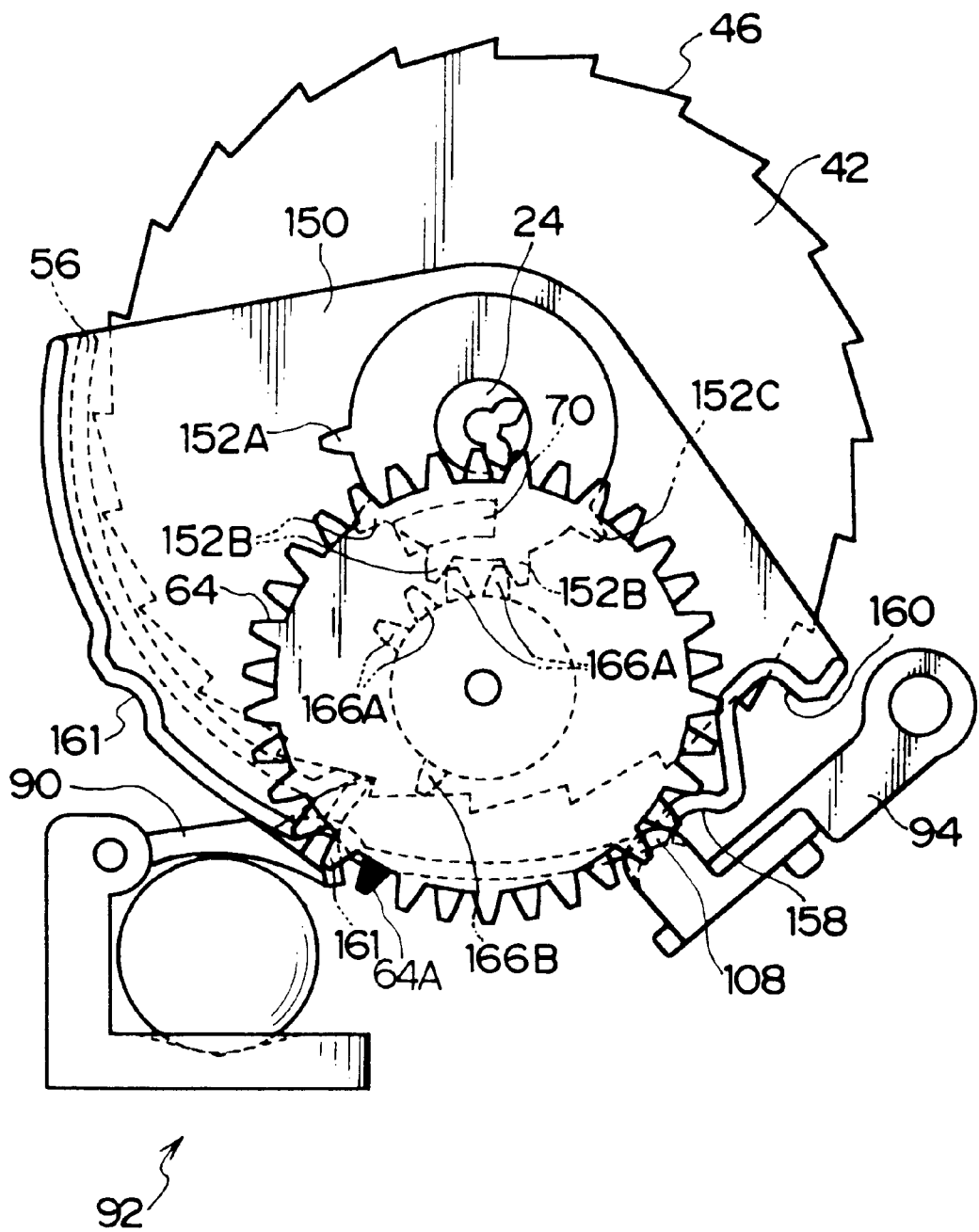
FIG. 18 is a front view showing a state in which V end locking is released in the ALR gear mechanism of the webbing retractor according to the second embodiment of the present invention.

When the webbing is further pulled out from the above-described state, the reduction gear 64 meshing with the pinion gear 26 rotates at a small angle in the direction indicated by arrow I in FIG. 17 so that the webbing retractor is brought into the V end lock release position shown in FIG. 18. During this operation, the intermediate gear portion 166 is brought into engagement with the driven gear portion 152, and therefore, the cam plate member 150 also rotate in an interlocking manner. In the state shown in FIG. 18, the restriction wall 56 of the cam plate member 150 is separated from the ELR lever 90 and the ELR lever 90 is thereby set in a state of being engageable with the ratchet gear 46.

Figure 19:
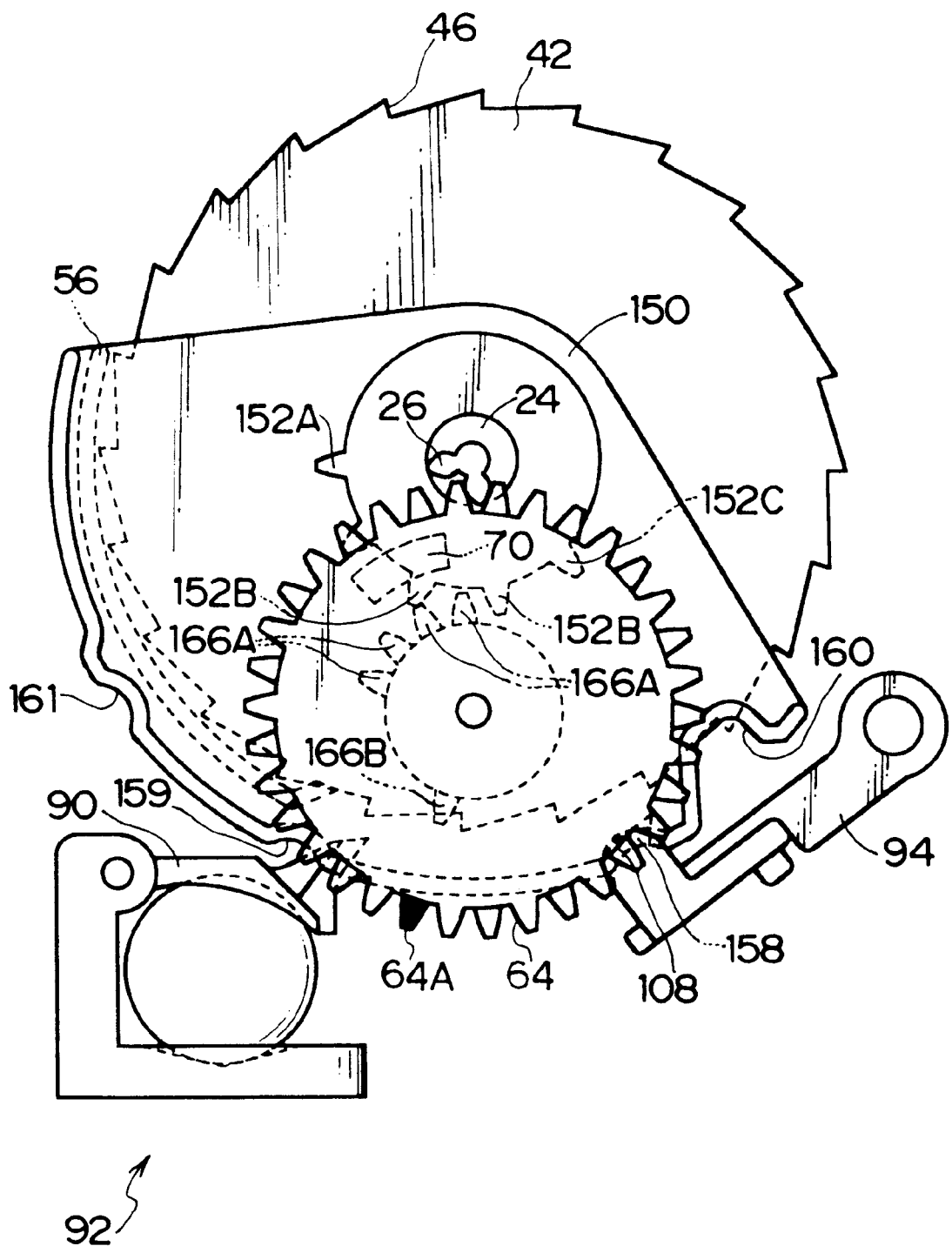
FIG. 19 is a front view showing a state in which switching is preset in the ALR gear mechanism of the webbing retractor according to the second embodiment of the present invention.

When the webbing is further pulled out and the cam plate member 150 rotates at a small angle via the pinion gear 26, the reduction gear 64, the intermediate gear portion 166, and the driven gear portion 152, the webbing retractor is brought into the switching preset state shown in FIG. 19. In the state shown in FIG. 19, the sliding contact portion 108 of the ALR lever 94 is fitted into the retaining portion 158 of the cam plate member 150 and the cam plate member 150 is thereby held at the predetermined position.

Further, in the above-described state, although the intermediate gear portion 166 rotates in the direction of arrow I, meshing between the intermediate gear portion 166 and the driven gear portion 152 is released. Namely, during about one half rotation of the intermediate gear portion 166 in the direction indicated by arrow I, the tooth portion 166A of the intermediate gear portion 166 rotates independently without being engaged with the driven gear portion 152.

Figure 20:
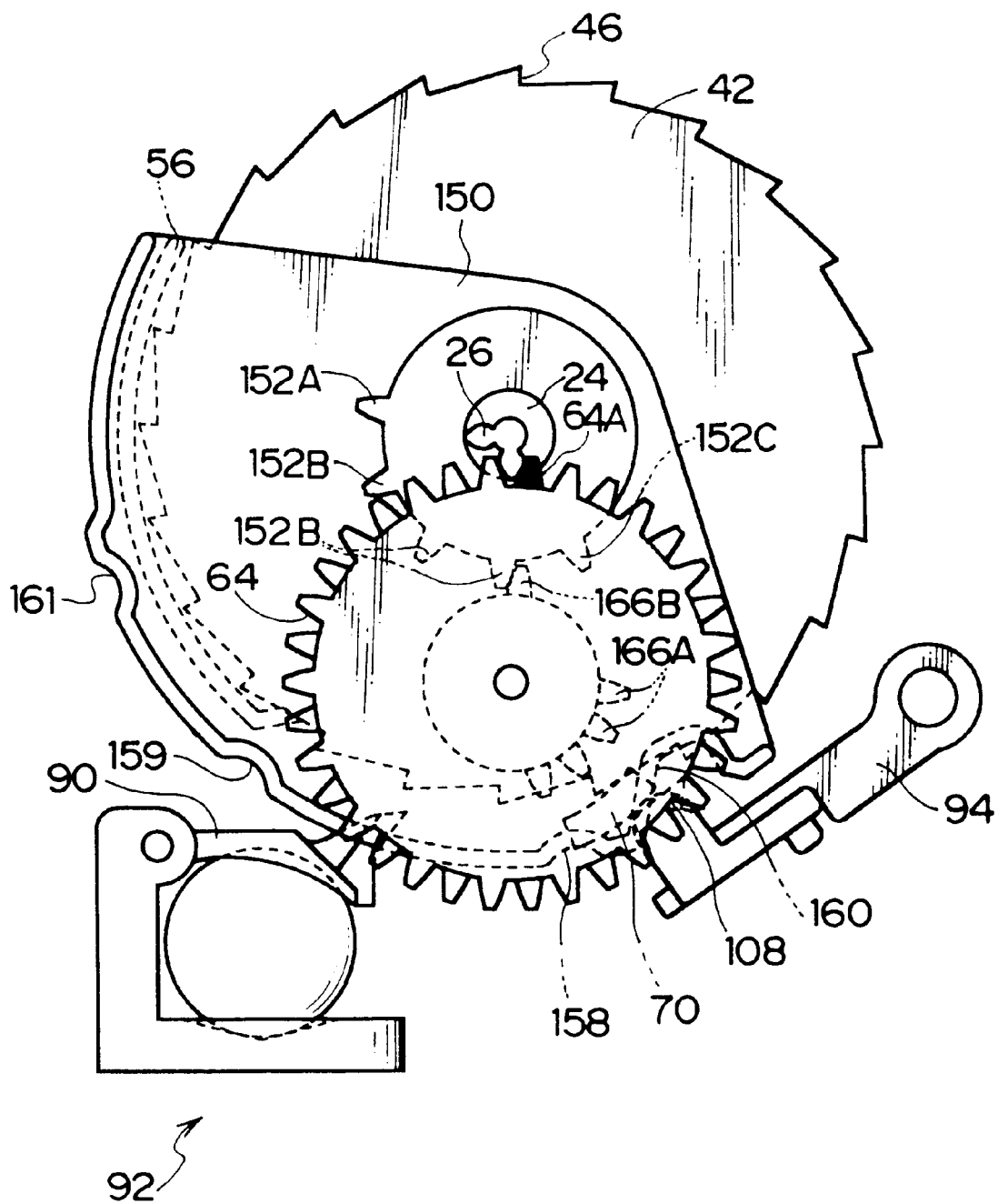
FIG. 20 is a front view showing a state in which switching is effected in the ALR gear mechanism of the webbing retractor according to the second embodiment of the present invention.

When the webbing is pulled out still further and the reduction gear 64 meshing with the pinion gear 26 is rotated so that the intermediate gear portion 166 integrated with the reduction gear 64 rotates, the tooth portion 166B of the intermediate gear portion 166 abuts against the tooth portion 152B at the side of the tooth portion 152C in the driven gear portion 152 so as to rotate the driven gear portion 152 and the cam plate member 150 integrated with the driven gear portion 152 at a small angle, and therefore, the webbing retractor is brought into a state of being switched, which is shown in FIG. 20.

In the state shown in FIG. 20, the sliding contact portion 108 of the ALR lever 94 is supported by the stopper portion 70 of the intermediate gear 162, and therefore, the sliding contact portion 108 comes into the engaging/stopping operation portion 160 of the cam plate member 150 and the hook claw 110 is thereby brought into a state of being not engageable with the ratchet gear 46. As a result, in this state, the winding shaft 14 (see FIG. 1) of the webbing is brought into a state of being freely rotated.

Figure 21:
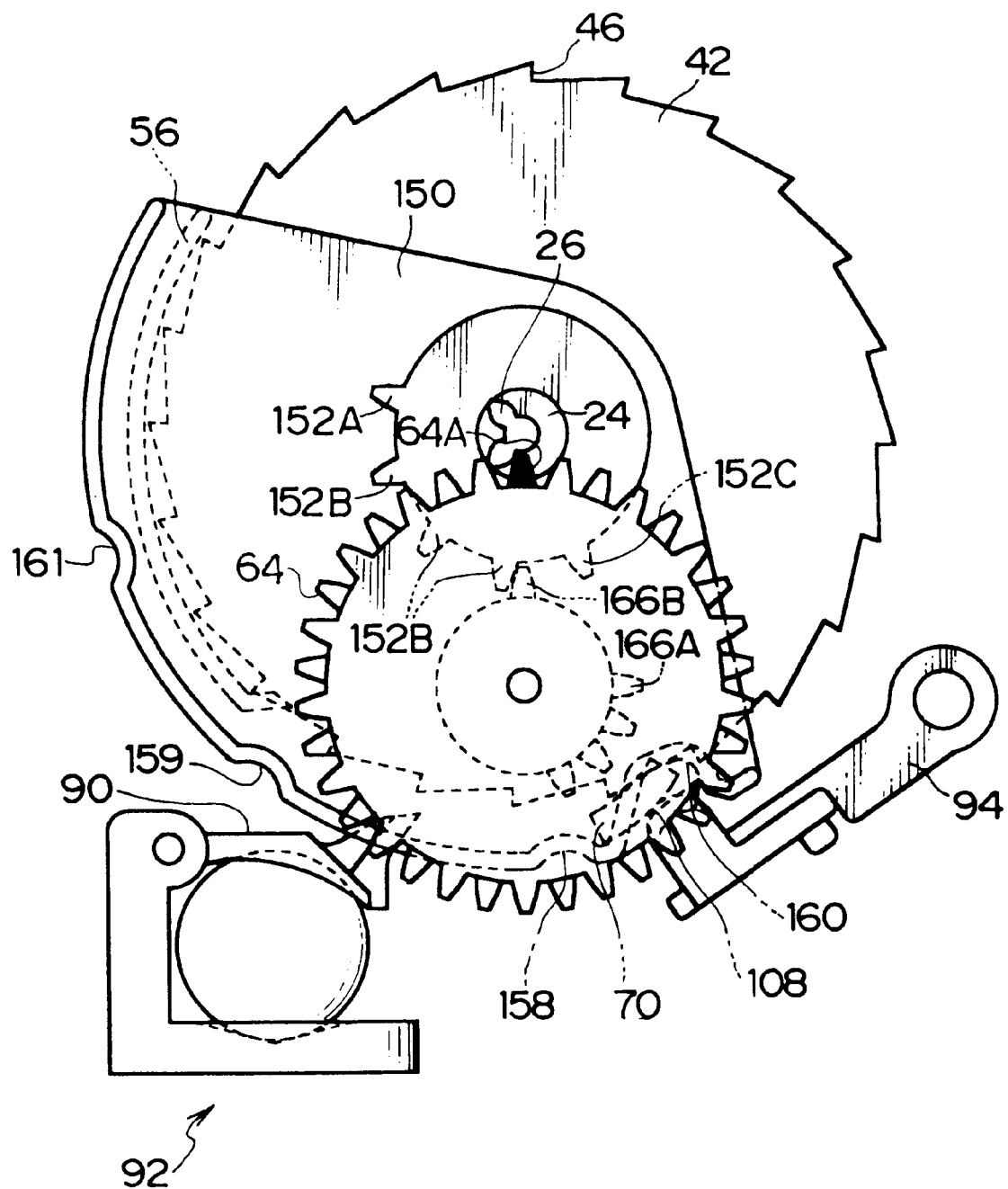
FIG. 21 is a front view showing a state in which the webbing is pulled out to its full length in the ALR gear mechanism of the webbing retractor according to the second embodiment of the present invention.

When the webbing is further pulled out to be brought into a state of being pulled out from the winding shaft 14 to its full length, the webbing retractor is brought into the state shown in FIG. 21. In the state shown in FIG. 21, the sliding contact portion 108 of the ALR lever 94 is supported by the stopper portion 70 and is thereby held so as not to come into the engaging/stopping operation portion 160 at a position corresponding to the sliding contact portion 108. Meanwhile, at this time, the webbing is set in a state of being pulled out to its full length in such a manner that no portion thereof is wound onto the winding shaft.

Figure 22:
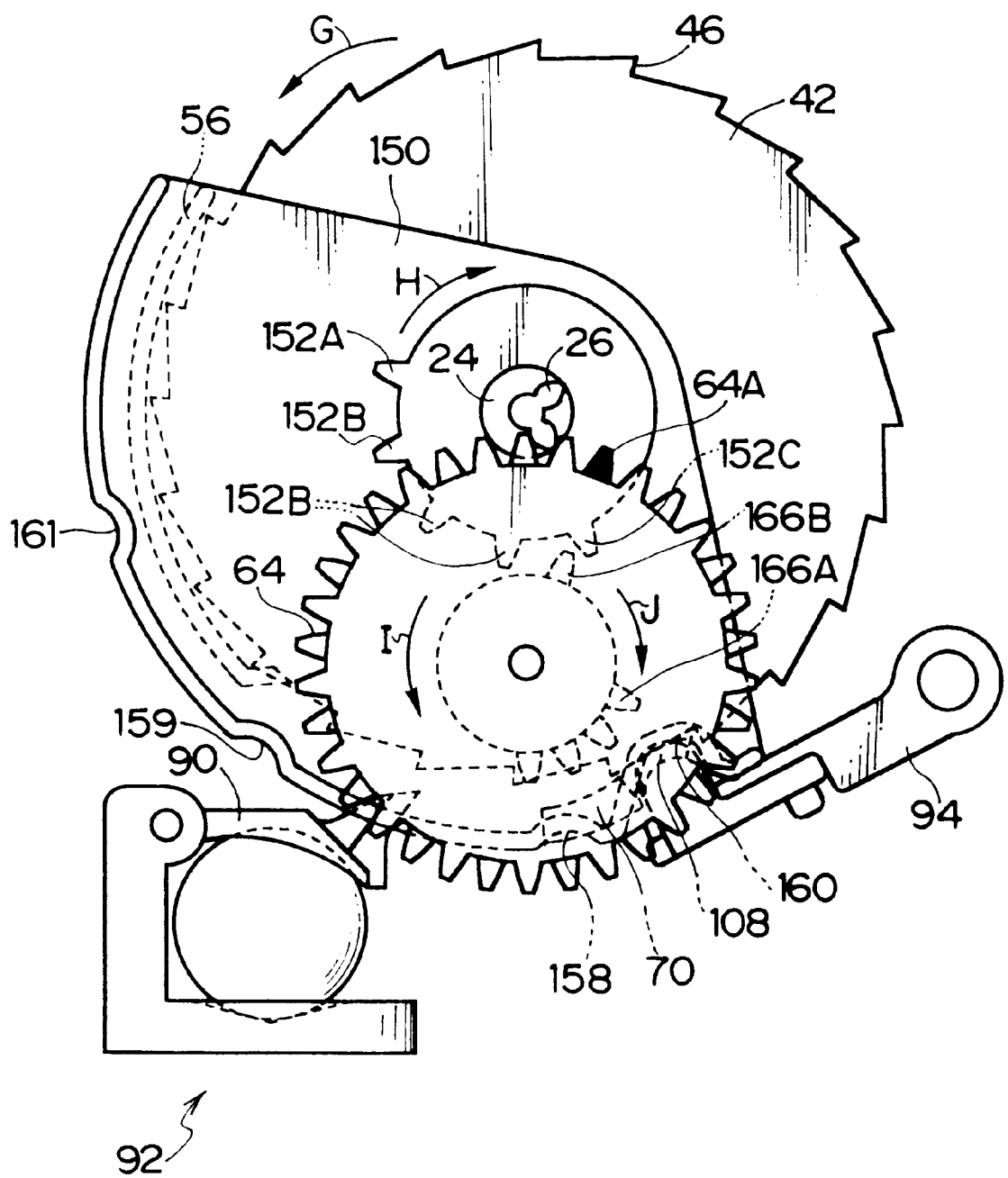
FIG. 22 is a front view showing a state in which switching to the ALR is effected in the ALR gear mechanism of the webbing retractor according to the second embodiment of the present invention.

When the webbing is slightly rewound onto the winding shaft 14, the webbing retractor is brought into the ALR switching state shown in FIG. 22. Namely, due to the winding operation of the webbing, the pinion gear 26 rotates in the direction indicated by arrow G in FIG. 22 and the reduction gear 64 meshing with the pinion gear 26 rotates a bit in the direction indicated by arrow J in FIG. 22. As a result, the stopper portion 70 of the intermediate gear 162 is separated from the sliding contact portion 108 of the ALR lever 94. The ALR lever 94 is swung by the urging force of a spring (not shown) toward the center of the cam plate member 150 so as to come into the groove-shaped engaging/stopping operation portion 160. For this reason, the hook claw 110 of the ALR lever 94 is brought into engagement with the ratchet gear 46 of the lock wheel 42. The hook claw 110 is provided to engage with the ratchet gear 46 so as to restrict the rotation of the ratchet gear 46 in the direction indicated by arrow H in FIG. 22, and when the ratchet gear 46 rotates in the direction indicated by arrow G opposite to that indicated by arrow H, the hook claw 110 does not restrict any movement of the ratchet gear 46. Namely, the lock wheel 42 having the ratchet gear 46 is provided to freely rotate only in one direction.

When the webbing is further wound from the ALR switching state shown in FIG. 22, the pinion gear 26 rotates in the direction indicated by arrow G in FIG. 22 in such a manner as to interlock with the winding shaft onto which the webbing is wound and the reduction gear 64 meshing with the pinion gear 26 makes about one half rotation in the direction indicated by arrow J in FIG. 22. As a result, the webbing retractor is brought into an ALR-to-ELR switching start position shown in FIG. 23. During this operation, the intermediate gear portion 166 is brought into a state of being not engageable with the driven gear portion 152, and therefore, even when the intermediate gear 162 rotates in the direction indicated by arrow J, the cam plate member 150 is held at this position. When the webbing retractor is thus brought into the ALR-to-ELR switching start position shown in FIG. 23, the tooth portion 166B of the intermediate gear portion 166 is brought into a state of abutting against the tooth portion 152B at the side of the tooth portion 152C of the drive gear portion 152 in the cam plate member 150.

Figure 23:
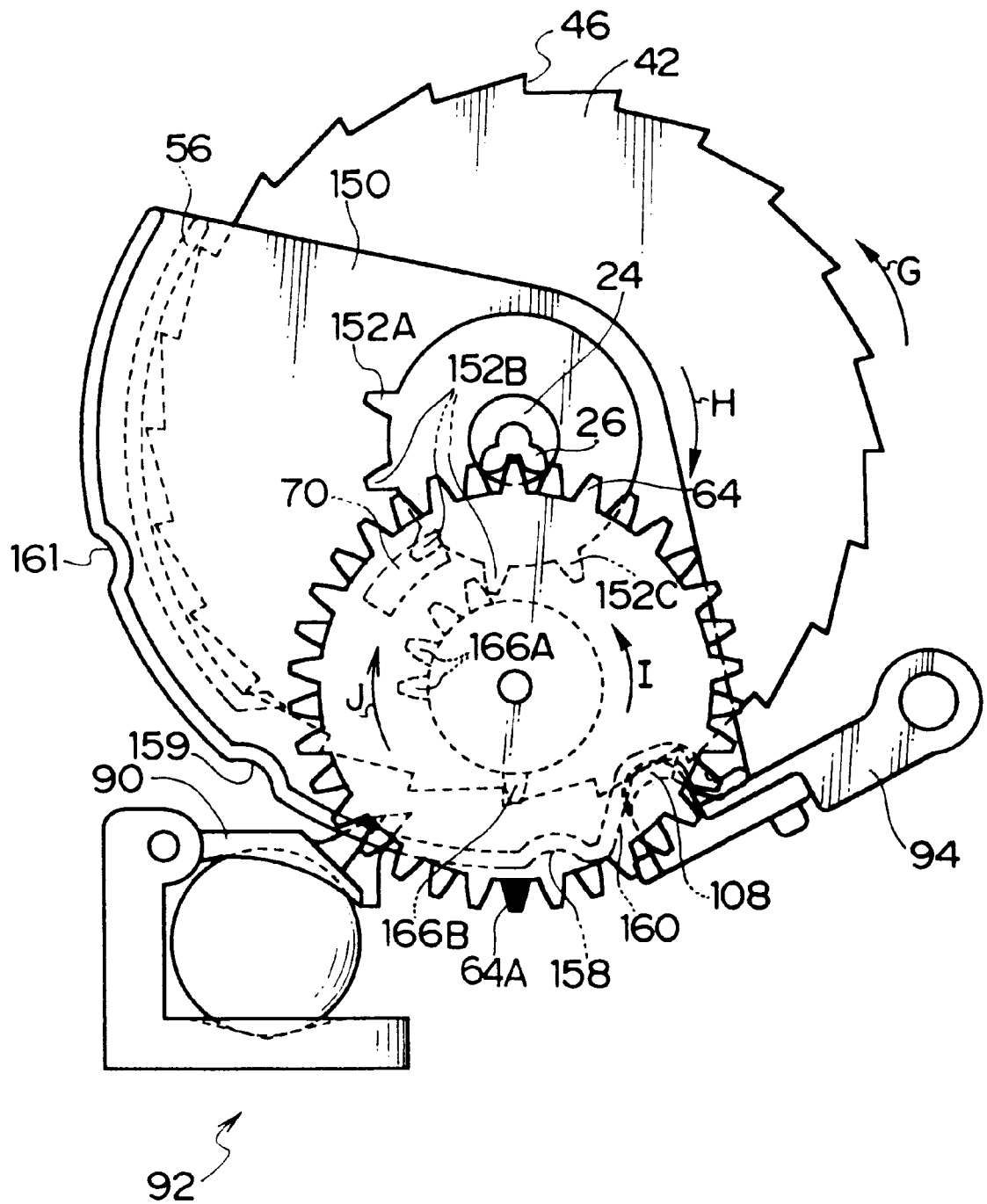
FIG. 23 is a front view showing a state in which switching starts in the ALR gear mechanism of the webbing retractor according to the second embodiment of the present invention.
Figure 24:
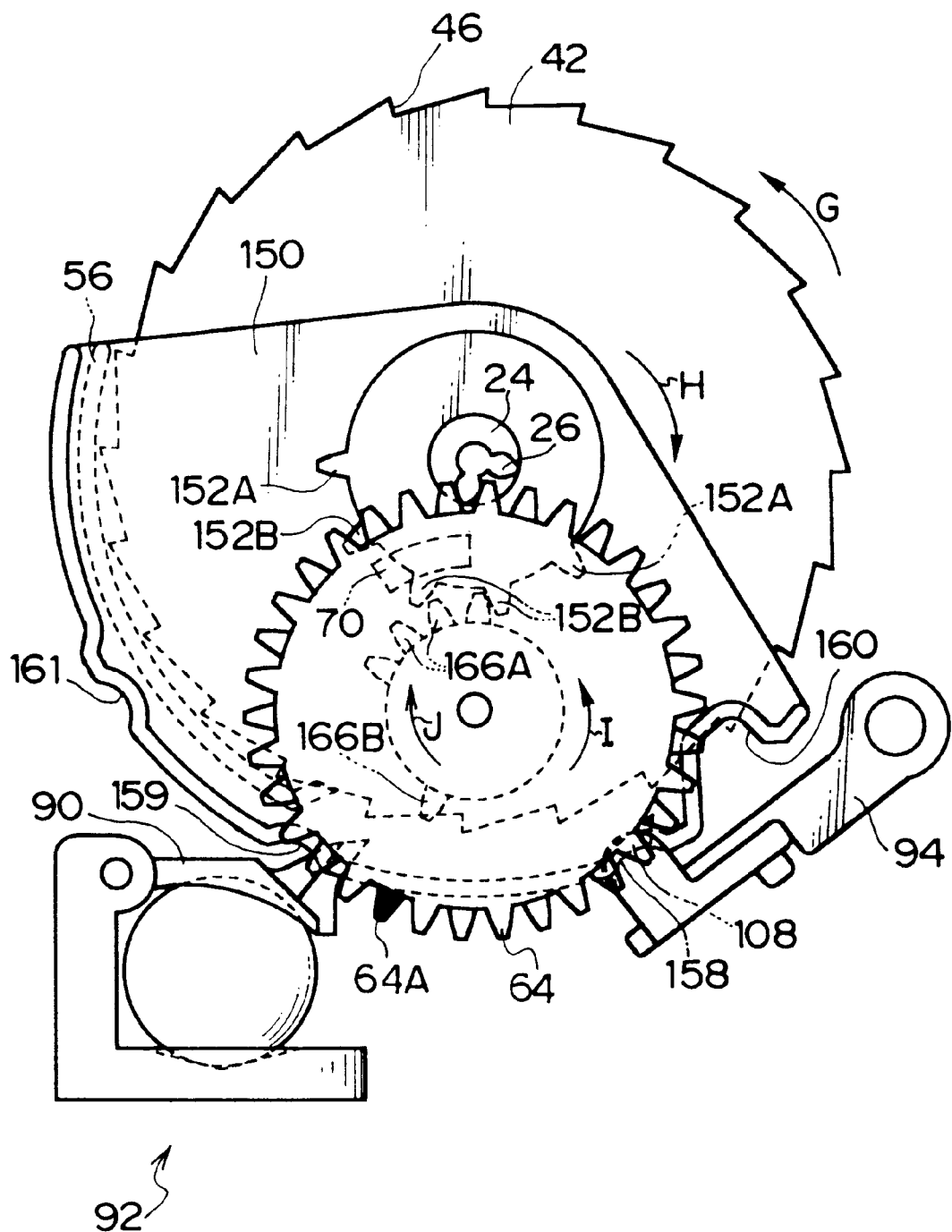
FIG. 24 is a front view showing a state in which the ALR is released in the ALR gear mechanism of the webbing retractor according to the second embodiment of the present invention.
Figure 25:
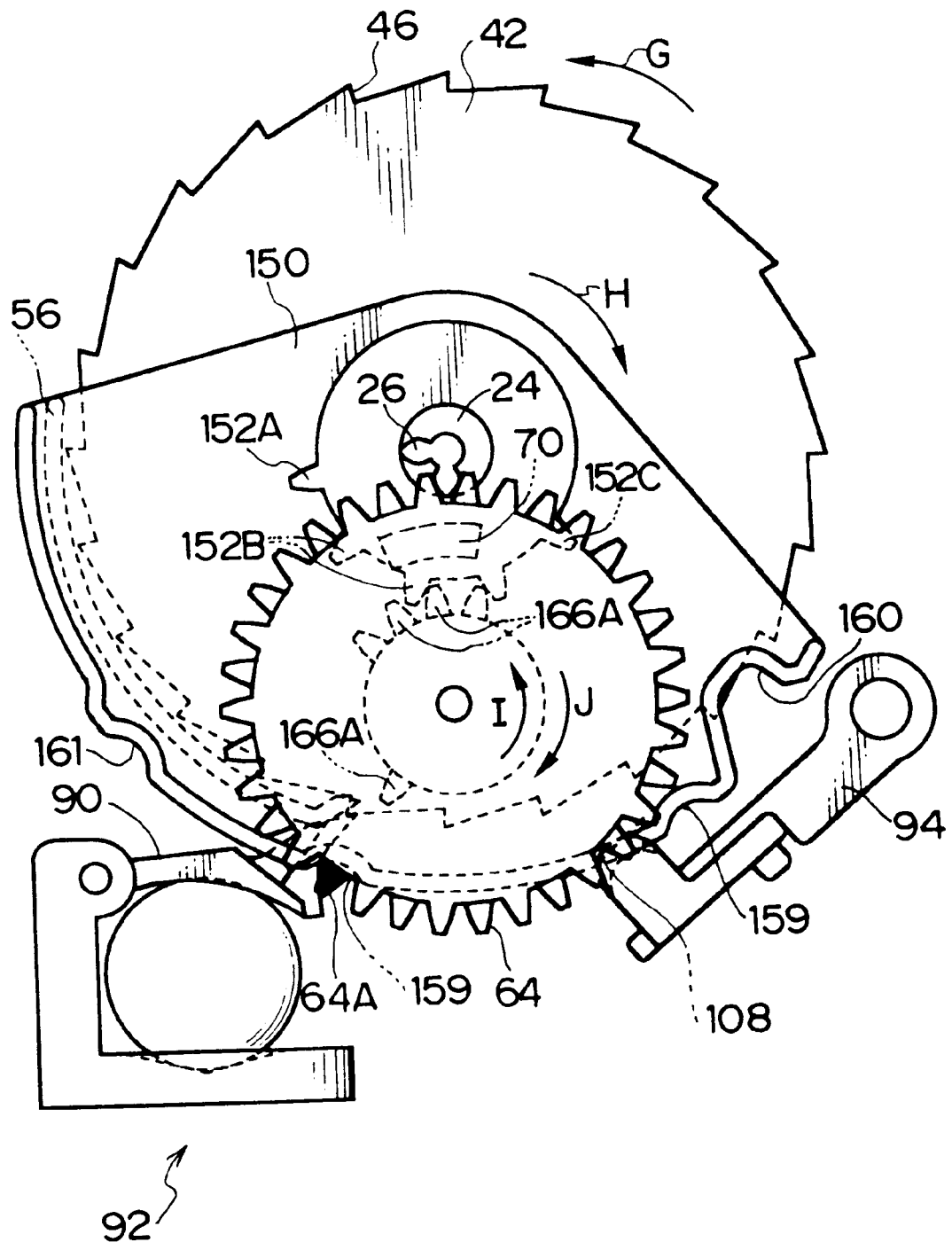
FIG. 25 is a front view showing a state in which V end locking operates in the ALR gear mechanism of the webbing retractor according to the second embodiment of the present invention.

Further, when the winding operation of the webbing is further effected from the above-described state, the reduction gear 64 engaging with the pinion gear 26 is rotated in the direction indicated by arrow J in FIG. 23 and the tooth portions 166A of the intermediate gear portion 166 mesh with the tooth portions 152B of the driven gear portion 152 so as to start rotation of the cam plate member 150 in the direction indicated by arrow G. To continue, the first intermediate gear portion 166 meshes with the driven gear portion 152, and subsequently, the cam plate member 50 is rotated in the direction indicated by arrow G. As a result, the webbing retractor is brought into the ALR release state shown in FIG. 24. During this operation, the sliding contact portion 108 of the ALR lever 94, engaged with the engaging/stopping operation portion 160 of the cam plate member 150, is pushed out along the inclined surface of the engaging/stopping operation portion 160 and toward the outer periphery of the cam plate member 150 and is engaged with the retaining portion 158 so as to stop the cam plate member 150 at the predetermined position. As a result, the hook claw 110 of the ALR lever 94 is brought into a state of not being engageable with the ratchet gear 46 of the lock wheel 42.

Subsequently, when the winding operation of the webbing is further effected, the pinion gear 26 rotates in the direction indicated by arrow G to further rotate the reduction gear 64 in the direction indicated by arrow J, and the cam plate member 150 is further rotated in the direction indicated by arrow G. As a result, the webbing retractor is brought into the V end lock operating state (i.e., end locking prevention state) shown in FIG. 25. In this state, a starting end portion of the restriction wall 56 of the cam plate member 150 rotates to come into a position corresponding to the ratchet gear 46 of the lock wheel 42 and operates so as to prevent the ELR lever 90 from engaging with the ratchet gear 46 of the lock wheel 42. Accordingly, when the webbing is further wound, the function of the ELR is stopped.

Moreover, when the winding operation of the webbing is further effected, the pinion gear 26 is rotated and the intermediate gear 166 integrated with the reduction gear 64 meshing with the pinion gear 26 rotates in the direction indicated by arrow J. First, the tooth portions 166A engage with the tooth portions 152B of the driven gear portion 152 so as to rotate the driven gear portion 152 in the direction indicated by arrow G. When meshing between the tooth portions 166A and the tooth portions 152B is released, the driven gear portion 152 and the cam plate member 150 stop rotating and the intermediate gear portion 166 rotates in an idling manner about one half round. As a result, the webbing retractor is brought into the state in which the webbing is wound to its full length (see FIG. 26).

Meanwhile, during the above-described operation, when the driven gear portion 152 and the intermediate gear portion 166 rotate relatively and the tooth portions 152B and the tooth portions 166A do not properly engage with one another, by slightly pulling out or winding the webbing, the tooth portion 166B abuts against the tooth portion 152A or the tooth portion 152C so as to restore the driven gear portion 152 to an appropriate position, and therefore, the tooth portions 152B and the tooth portions 166A can be adjusted to satisfactorily engage with one another.

Further, in the second embodiment, the pinion gear 26 and the reduction gear 64 are each formed by a gear mechanism, but the present invention is not limited to the same. For example, a wrapping connector driving mechanism or other reduction gear transmission mechanism can also be used.

Other structures, operations and effects in the second embodiment are all the same as those of the first embodiment. Accordingly, the same members as those of the first embodiment will be denoted by the same reference numerals, and a description thereof will be omitted.

Next, a third embodiment of the present invention will be described.

Figure 27:
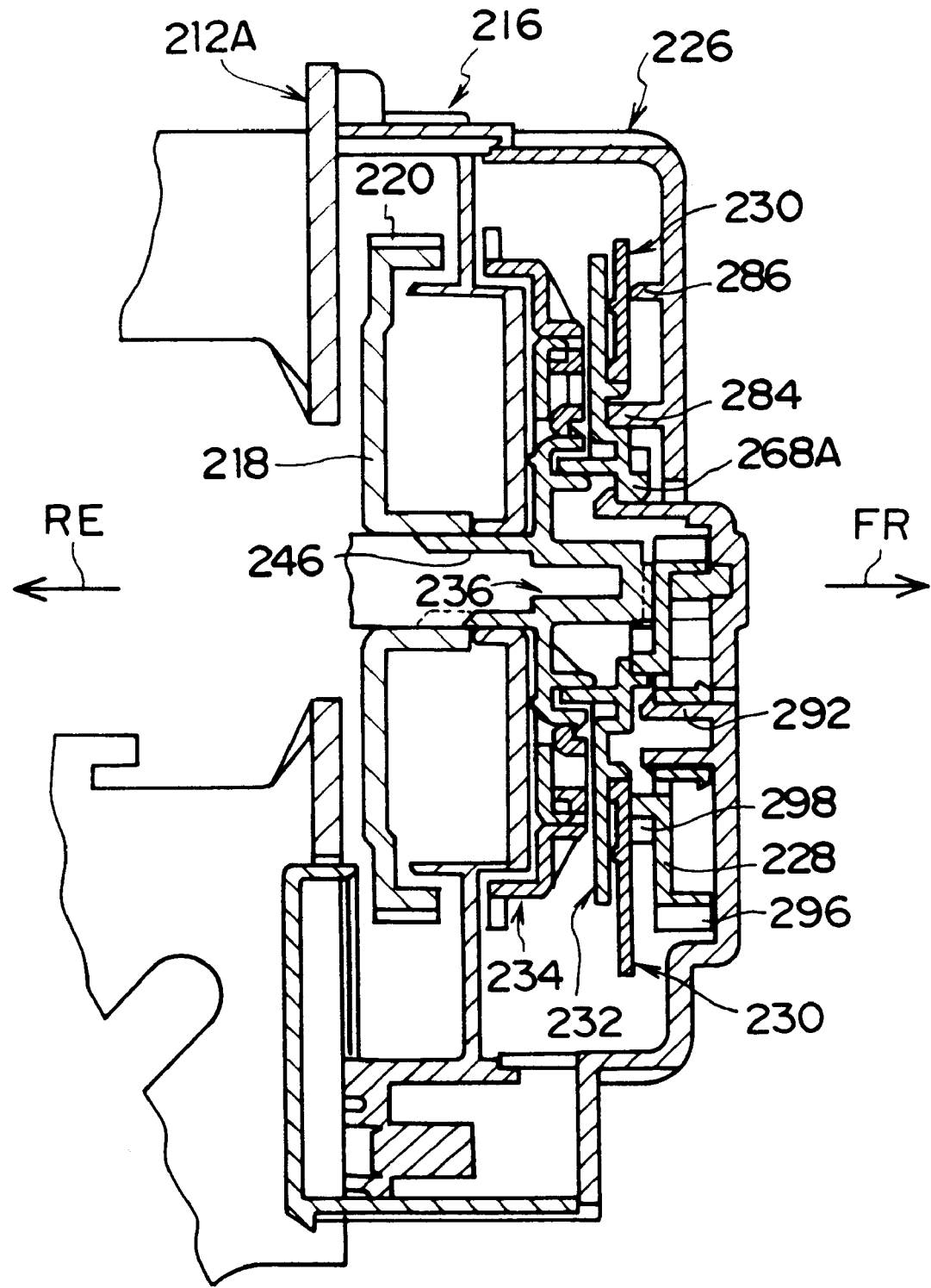
FIG. 27 is a cross-sectional end view of a principal portion of an ALR-ELR switching mechanism of a webbing retractor according to a third embodiment of the present invention, in which a winding shaft 214 is not shown.
Figure 28:
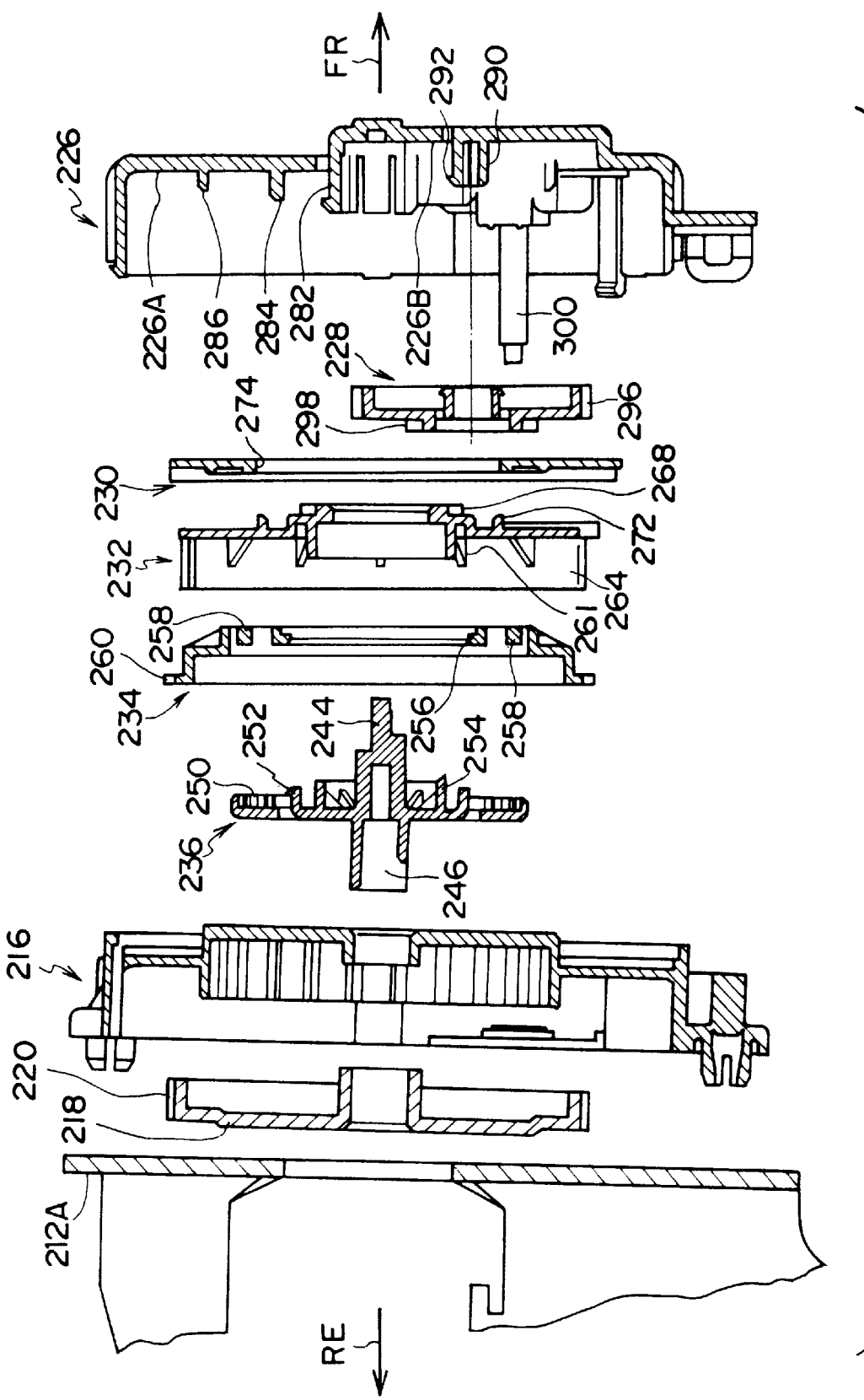
FIG. 28 is an exploded view of a longitudinal cross section of a portion, corresponding to FIG. 27, of the ALR-ELR switching mechanism of the webbing retractor according to the third embodiment of the present invention.

Schematic structure of the retractor:

FIGS. 27 and 28 each show a cross-sectional view of a principal portion of a webbing retractor according to the third embodiment of the present invention, and FIGS. 29 through 33 each show an exploded perspective view of the principal portion of the webbing retractor.

Figure 31:
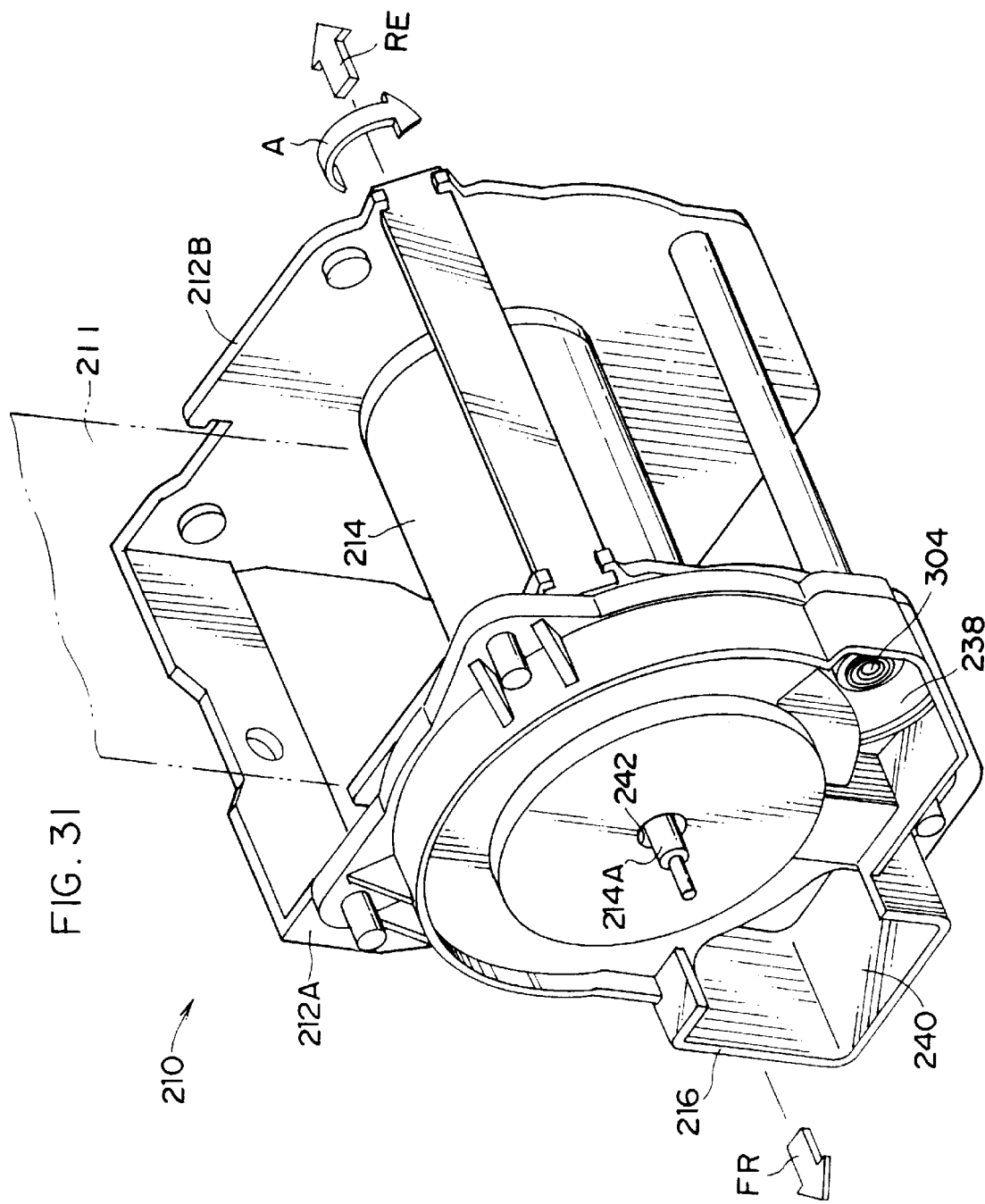
FIG. 31 is an exploded perspective view showing the principal portion of the ALR-ELR switching mechanism of the webbing retractor according to the third embodiment of the present invention.

As shown in FIG. 31, in the webbing retractor of this embodiment, a main body frame 210 is fixed to a vehicle body by mounting bolts (not shown). The main body frame 210 includes a pair of leg portions 212A, 212B extending from side portions thereof in parallel with each other. A sensor cover 216 is installed at the leg portion 212A as shown toward the front in FIG. 31.

A winding shaft 214 is supported by these frame leg portions 212A, 212B. Further, a through hole (not shown) is formed in the central portion of the winding shaft 214 so as to pass through the winding shaft in a radial direction. One end portion of a webbing 211 for restraining a vehicle occupant is inserted in the through hole so as to be engagingly retained by the winding shaft 214. The direction in which the winding shaft 214 rotates to pull out the webbing is indicated by arrow A in FIG. 31.

Further, one end of a spiral spring (not shown) is engagingly retained at the rear end of the winding shaft 214 (toward the back in FIG. 31 facing in the direction indicated by arrow RE) and the winding shaft 214 is constantly urged in the direction in which the webbing is wound (i.e., the direction opposite to that indicated by arrow A). For this reason, the webbing is usually wound onto the winding shaft 214 in the direction opposite to that of arrow A. When the webbing 211 is pulled out and a tongue plate (not shown) installed at the other end of the webbing is engaged with a buckle device (not shown) installed on the vehicle body, the vehicle occupant can be brought into a state in which the webbing is applied thereto.

Figure 29:
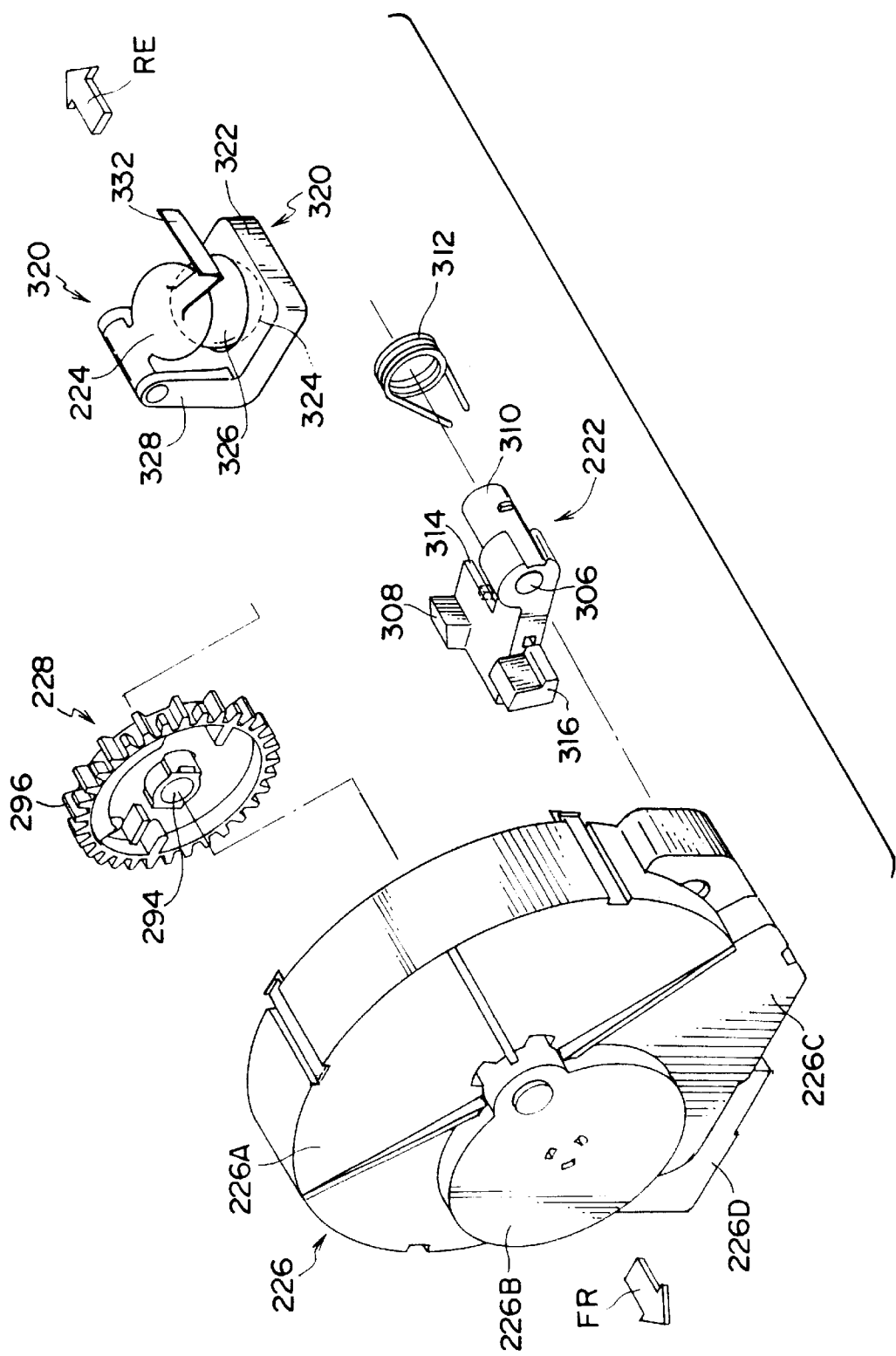
FIG. 29 is an exploded perspective view showing a principal portion of the ALR-ELR switching mechanism of the webbing retractor according to the third embodiment of the present invention.

Structure of the locking means:

Locking means which has been generally used is installed at a portion of the winding shaft 214. The structure of the locking means used in this embodiment is the same as that of the locking means of the first embodiment, and a brief description thereof will be given. As shown in FIG. 27 and FIG. 29, the locking means is formed in such a manner that a lock wheel 218 is rotatably supported by the winding shaft 214. An external gear ratchet wheel 220 is formed on the outer periphery of the lock wheel 218. An ALR pawl (ALR lever) 222, described later, which is used to cause the locking means to effect an operation of stopping the pullout of a webbing, and a sensor pawl 224 of an acceleration sensor 320 are provided to be engageable with and removable from the external gear ratchet wheel 220. When the rotation of the external gear ratchet wheel 220 is stopped by the above-described pawls, corresponding rotation is generated between the winding shaft 214 and the external gear ratchet wheel 220.

In the locking means, in a case in which the ALR pawl 222 is engaged with the ratchet wheel 220, or in a case in which a large acceleration is applied to the vehicle and the sensor pawl 224 is engaged with the external gear ratchet wheel 220, when the webbing is pulled in the direction of being pulled out from the winding shaft 214, the winding shaft 214 starts rotating and the lock wheel 218 is also about to rotate in such a manner as to follow the winding shaft 214 via urging means such as a spring. However, at this time, when the ALR pawl 222 or the sensor pawl 224 engages with the external gear ratchet wheel 220 to prevent rotation of the lock wheel 218, the winding shaft 214 alone rotates a bit with respect to the lock wheel 218 whose rotation is prevented. As a result, the locking means is constructed such that, due to the relative rotational movement of the lock wheel 218 and the winding shaft 214, a claw portion (not shown) of the locking means, which forms a part of the locking means and is installed at the side of the winding shaft 214, engages with an internal gear ratchet wheel (not shown) integrated with the leg portion 212A to prevent the rotation of the winding shaft 214 in the direction in which the webbing is pulled out, thereby preventing the webbing from being pulled out further.

Arrangement of ALR-ELR switching mechanism:

As understood from comparing and verifying FIGS. 27 through 33, in the above-described webbing retractor, an ALR-ELR switching mechanism is mounted at a portion of the winding shaft 214 extending from the leg portion 212A of the main body frame 210, the portion being disposed further toward the exterior than the lock wheel 218 for the locking means. The ALR-ELR switching mechanism is formed in such a manner that a holder 228, a disk control 230, a cam member 232, a ratchet member 234, and a rotor 236 are provided between the sensor cover 216 and the sensor plate 226. Further, the ALR pawl 222 and an acceleration sensor device 320 are disposed between the sensor cover 216 and the sensor plate 226.

Schematic structure of the sensor cover:

As shown in FIGS. 27, 28, and 31, the sensor cover 216 is fixed to an outer side surface of the leg potion 212A so as to cover the locking means having the lock wheel 218 and includes a circular cover portion with an extending shaft portion 214A of the winding shaft 214 extending from the leg portion 212A being disposed as the center. As shown in FIG. 31, the sensor cover 216 includes an ALR accommodation portion 238 for the ALR pawl 222 and an accommodation portion 240 for the acceleration sensor device 320 formed at two positions thereon. Meanwhile, a through hole 242 is formed at the center of the circular cover portion of the sensor cover 216 and the extending shaft portion 214A of the winding shaft 214 extends from the through hole 242. The rotor 236 is fixed at the extending shaft portion 214A.

Figure 30:
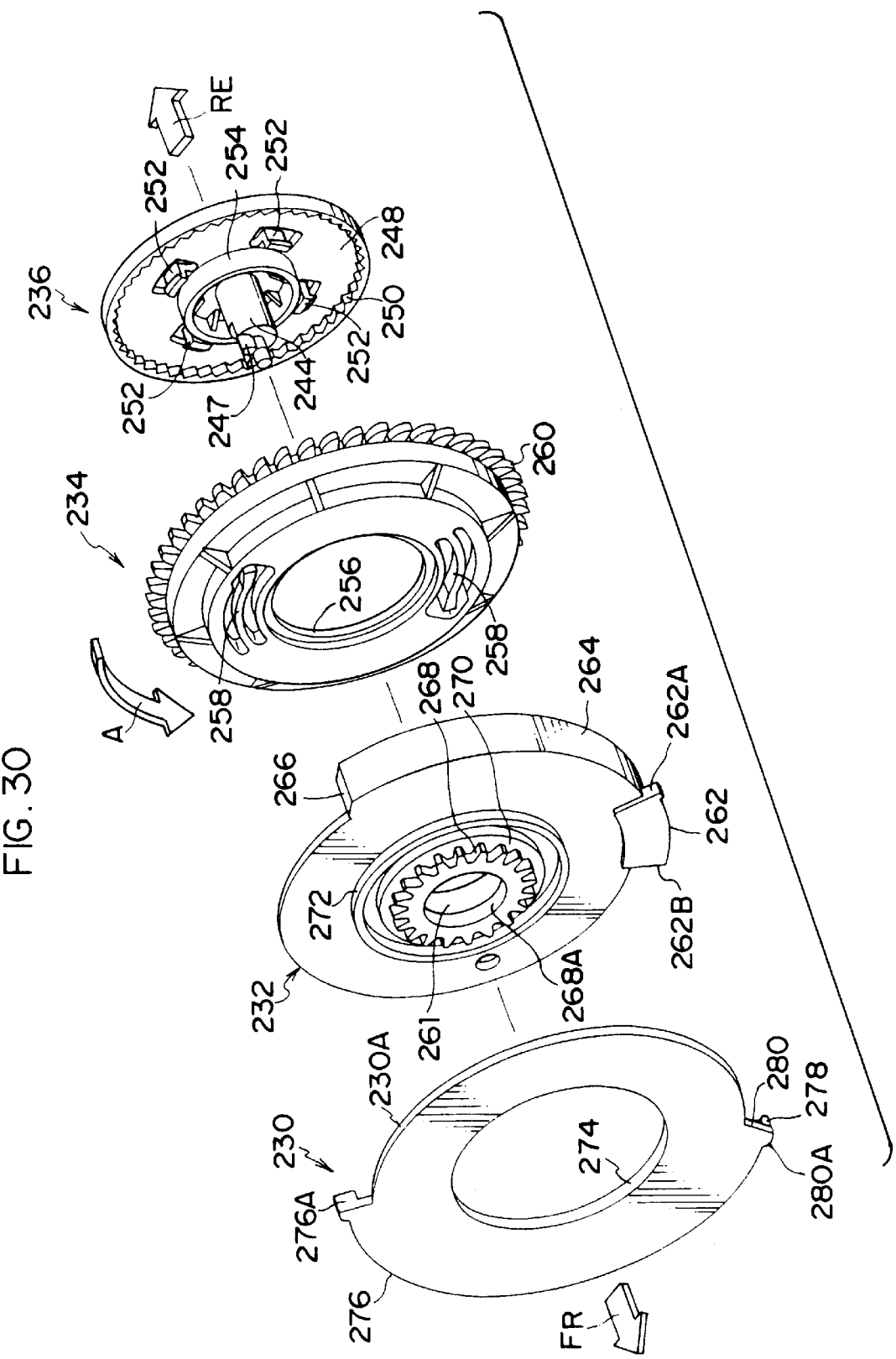
FIG. 30 is an exploded perspective view showing the principal portion of the ALR-ELR switching mechanism of the webbing retractor according to the third embodiment of the present invention.
Figure 33:
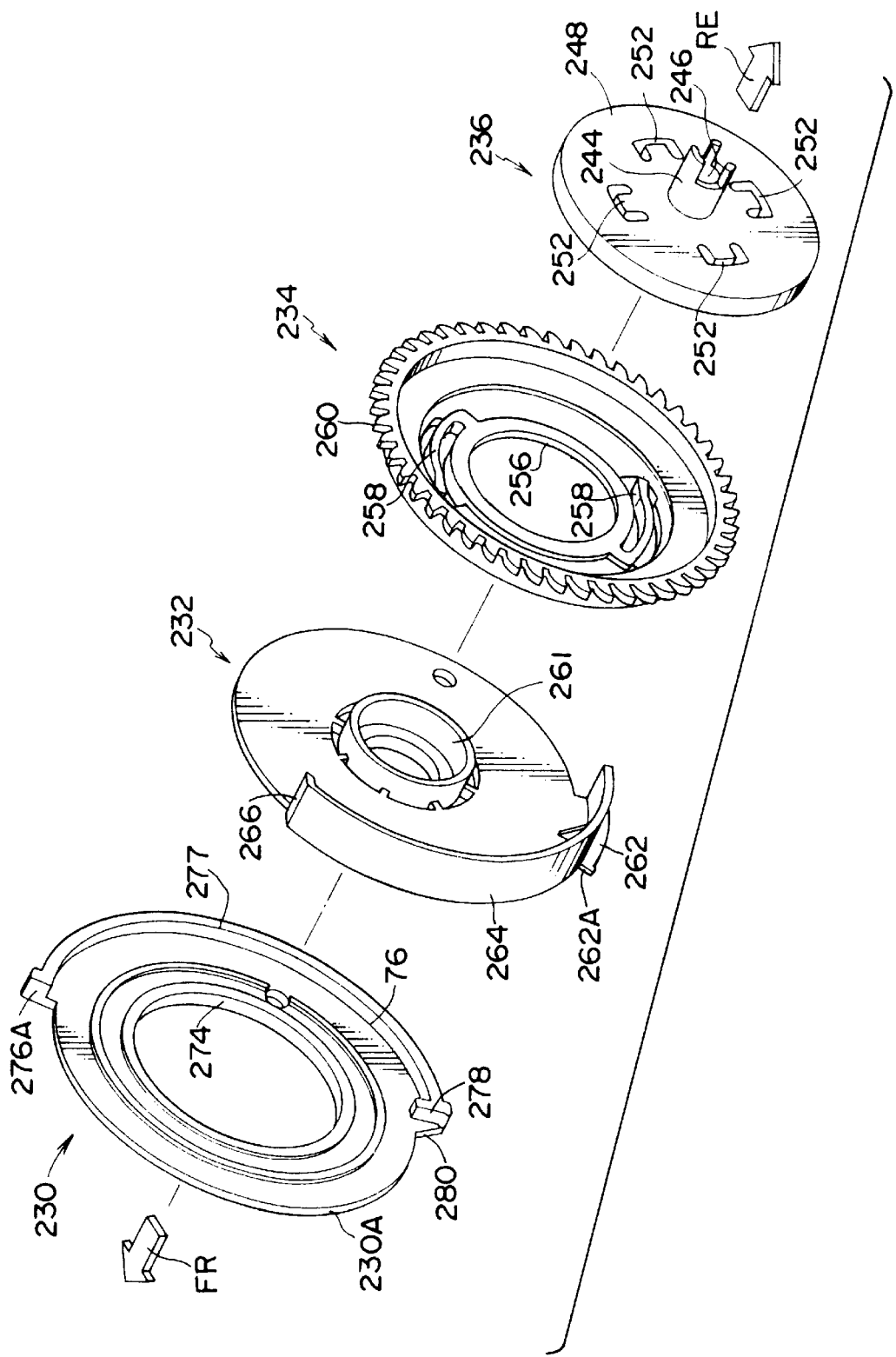
FIG. 33 is an exploded perspective view showing a principal portion of a portion corresponding to FIG. 30 of the ALR-ELR switching mechanism of the webbing retractor, seen from the other side surface, according to the third embodiment of the present invention.

Structure of the rotor:

As shown in FIGS. 30 and 33, the rotor 236 includes a cylindrical shaft portion 244. The shaft portion 244 and the extending shaft portion 214A are fixed to each other in such a manner that the extending shaft portion 214A is fitted and inserted in a hole portion 246 which opens at the rear end portion of the shaft portion 244 in the axial direction, and the rotor 236 thereby rotates integrally with the extending shaft portion 214A.

The rotor 236 includes a first drive gear 47 which is formed as a partially toothed gear having two continuous tooth portions (as clearly shown in FIG. 35) at the front end portion of the shaft portion 244 (facing in the direction indicated by arrow FR in FIG. 30). Further, the rotor 236 also includes a circular plate-shaped supporting plate portion 248 at the intermediate portion of the shaft portion 244. An annular wall portion is formed to project from a peripheral edge portion of the supporting plate portion 248 at the front side and an internal gear ratchet portion 250 is formed on the inner peripheral surface of the annular wall portion. Further, by forming a substantially U-shaped groove (see FIG. 33) at each of quadrantal positions of the central angle on the circumference whose center is the same as that of the shaft portion 244, an elastic supporting body 252 in which an end of a substantially L-shaped member is formed to be bent in the shape of a hook (see FIG. 28) is integrated with the supporting plate portion 248. Further, a shaft cylinder 254 is formed, between the elastic supporting bodies 252 and the shaft portion 244, integrally with the supporting plate portion 248 in such a manner as to be disposed coaxially with the shaft portion 244.

Structure of the ratchet member:

The ratchet member 234 is mounted on the rotor 236 in such a manner as to be rotatable in a predetermined one direction (the direction in which the webbing is pulled out). The ratchet member 234 is substantially annular with an opening 256 being formed in the central portion thereof. The elastic supporting bodies 252 are inserted in the opening 256 and the ratchet member 234 is provided to be rotatable around the elastic supporting bodies 252 (see FIG. 27). As shown in FIGS. 30 and 33, an overhung type engaging/stopping member 258 which is bent and elongated along a circumferential direction of the ratchet member 234 to have a substantially U-shaped notch or an inverted U-shaped notch is formed at each predetermined two positions on the side surface of the ratchet member 234. In the ratchet member 234 supported by the elastic supporting body 252 of the rotor 236, an end projecting corner portion of the engaging/stopping member 258 elastically abuts against the internal gear ratchet portion 250 and the ratchet member 234 is about to rotate, with respect to the rotor 236, in the direction indicated by arrow A in FIG. 30, the engaging/stopping member 258 elastically deforms so as to be rotatable in such a manner as to slide on the internal gear ratchet portion 250. When the ratchet member 234 is about to rotate, with respect to the rotor 236, in the direction opposite to that indicated by arrow A (i.e., the direction in which the webbing is wound), the engaging/stopping member 258 engages with the internal gear ratchet portion 250 so that the rotation of the ratchet member 234 in the direction opposite to that indicated by arrow A is prevented.

The ratchet member 234 includes a ratchet gear portion 260 which facilitates an operation for releasing the sensor pawl 224 from engaging with the external gear ratchet wheel 220 of the lock wheel 218.

Structure of the cam member:

As described above, the cam member 232 is mounted on the rotor 236 supporting the ratchet member 234. As shown in FIGS. 30 and 33, the cam member 232 is formed, as a whole, as a substantially circular plate and a shaft cylinder portion 261 is formed in the central portion of the cam member 232 in such a manner as to project toward the rotor 236. As shown in FIG. 27, the shaft cylinder portion 261 is supported so that the rotor 236 and the cam member 232 are relatively rotatable by fitting the shaft cylinder 254 of the rotor 236 slidably into the hole of the shaft cylinder portion 261.

An interlock stopping portion 262 and a stopping portion 264 are formed integrally in the outer peripheral portion of the cam member 232. The interlock stopping portion 262 has a substantially trapezoidal shape and a portion thereof extends from the outer periphery of the cam member 232. Further, the interlock stopping portion 262 is formed integrally with the cam member 232 in such a manner as to become higher by one step than the side surface at the side of the cam member 232 at the side of the disk control 230, which faces in the direction indicated by arrow FR). Further, the side portions of the interlock stopping portion 262 along the diametric direction of the cam member 232 are formed as interlocking portions 262A, 262B which abut against and interlock with a portion of the disk control 230.

The stopping portion 264 is formed as a small-width arcuate wall in an outer peripheral portion of the cam member 232 and the arcuate wall is provided to extend in the range of a predetermined central angle starting from the interlock stopping portion 262. Further, the stopping portion 264 is formed such that the diameter thereof is made larger than the outside diameter of the cam member 232 in the same way as in the interlock stopping portion 262. A guide surface portion 266 is formed at the end portion of the stopping portion 264 at the side opposite to the interlock stopping portion 262 in such a manner as to be positioned toward the outer periphery of the cam member 232 and to be inclined toward an axial center of the cam member 232.

An annular pedestal 270 is formed to be raised on a surface of the cam member 232 facing the disk control 230 around a through hole of the shaft cylinder portion 261. Further, a cam rotating gear 268 provided as an external gear is formed integrally with the pedestal 270 in such a manner as to be raised on the pedestal 270. Moreover, a ring-shaped rotation supporting portion 272 having a rectangular cross-sectional configuration is formed integrally with the cam member 232 around the cam rotating gear 268 and the pedestal 270.

Structure of the disk control:

The disk control 230 is rotatably supported by the rotating supporting portion 272 of the cam member 232. The disk control 230 is formed to have an annular shape in which a round shaft opening 274 is provided at the center of the circular plate thereof. As shown in FIG. 27, with the rotation supporting portion 272 of the cam member 232 being inserted in the round shaft opening 274, the disk control 230 and the cam member 232 are provided in a relatively rotatable manner while the disk control 230 is guided slidably by the side surface of the cam member 232.

A stopping operation portion 276 for the ALR pawl 222 is formed integrally with the outer peripheral portion of the disk control 230. The stopping-operation portion 276 extends outward in a radial direction of the disk control 230 in the range of a predetermined central angle to form an arcuate extending portion. As shown in FIGS. 27, 28, and 33, a peripheral edge end portion of the stopping-operation portion 276 is formed to project toward the cam member 232 to have a hook-shaped cross-sectional configuration and the projecting portion is formed as a stopping rib portion 277 such that an outer peripheral portion of the stopping-operation portion 276 has a thickness having a predetermined width. As a result, a portion of the disk control 230 in which the stopping-operation portion 276 is not formed is provided as a small diameter portion 230A.

As shown in FIG. 33, an abutment end portion 276A which is one end portion of the stopping-operation portion 276 is formed to have an L-shaped configuration to abut against the interlocking portion 262A of the interlock stopping portion 262. Further, an abutment rib portion 278 is formed integrally with the stopping rib portion 277 at the other end portion of the stopping operation portion 276 and along the diametral direction of the disk control 230 in such a manner as to abut against the interlocking portion 262B. Moreover, a guide oblique side 280 formed obliquely to a radial direction of the disk control 230 is provided at the other end portion of the stopping-operation portion 276 from the outer periphery of the disk control 230 to a top portion of the abutment rib portion 278.

Meanwhile, a radial direction end of the guide oblique side 280 has a diameter which is larger than that of the stopping-operation portion 276 and a line connecting the above end and the stopping-operation portion 276 is formed as a gently sloping surface 280A. When the disk control 230 rotates in a direction counterclockwise from the state shown in FIG. 38 to that shown in FIG. 39, a driven pedestal portion 316 of the ALR pawl 222, described later, is provided to move to the interlock stopping portion 262 in such a manner as to easily pass over the end of the guide oblique side 280.

The above-described disk control 230 in a state of being mounted on the cam member 232 is provided to be relatively rotatable with respect to the cam member 232 in the range in which the abutment end portion 276A abuts against the interlocking portion 262A and is stopped and the abutment rib portion 278 abuts against the interlocking portion 262B and is stopped.

Figure 32:
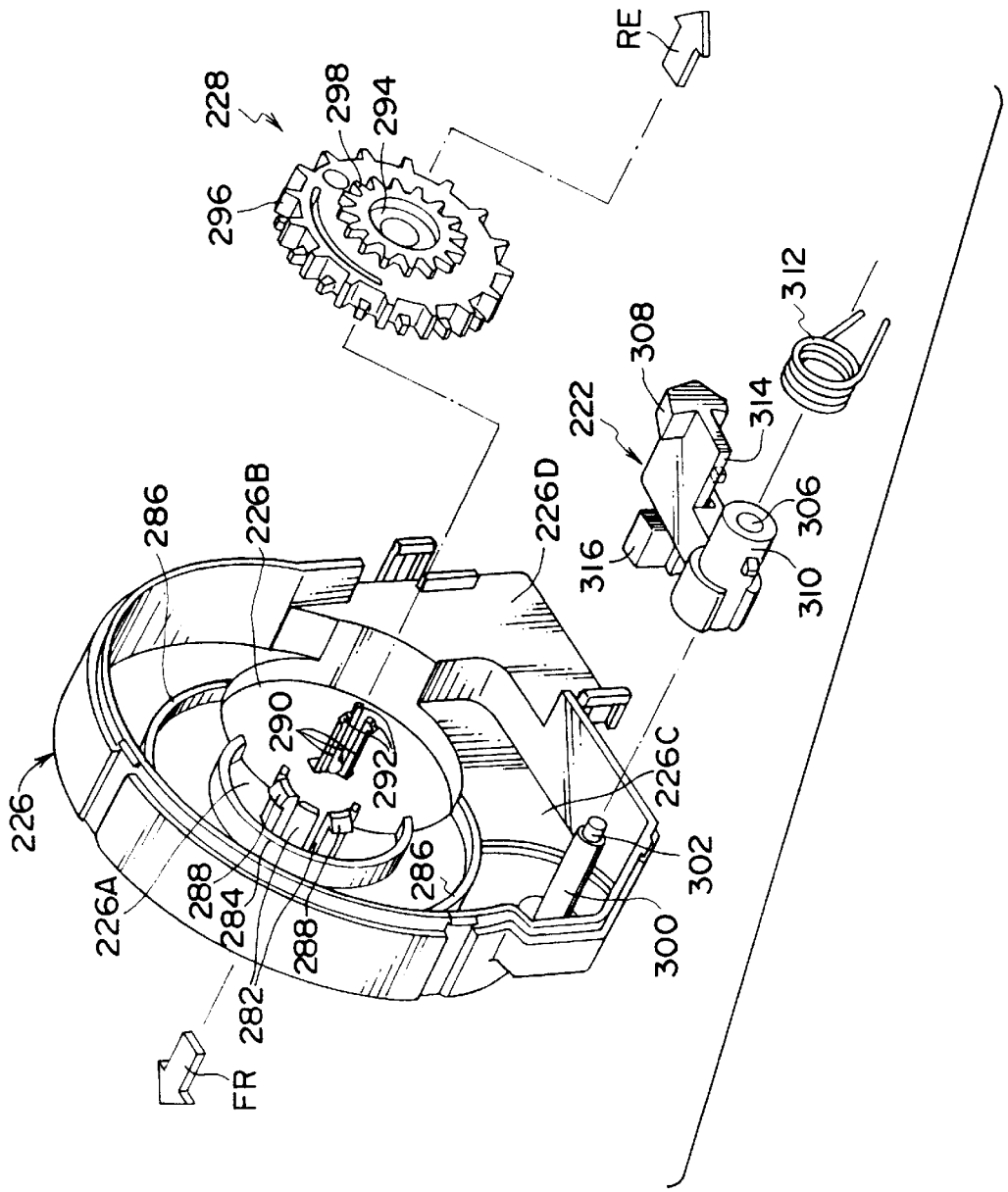
FIG. 32 is an exploded perspective view showing a principal portion of a portion corresponding to FIG. 29 of the ALR-ELR switching mechanism of the webbing retractor, seen from the other side surface, according to the third embodiment of the present invention.

Structure of the inner side portion of the sensor cover:

As shown in FIGS. 27 and 32, the sensor plate 226 mounted on the sensor cover 216 to form a housing includes a main case portion 226A (see FIG. 29) having a substantially circular configuration in a front view and covering the disk control 230, the cam member 232, the ratchet member 234, and the rotor 236, a holder case portion 226B for covering a holder 228 formed in a substantially small circular shape at an eccentric portion of the sensor plate 226, an ALR pawl covering portion 226C for covering the ALR pawl 222, and an acceleration sensor covering portion 226D for covering the acceleration sensor device 320. The main case portion 226A, the holder case portion 226B, the ALR pawl covering portion 226C, and the acceleration sensor covering portion 226D are formed integrally with one another.

As shown in FIGS. 27, 28, and 32, engaging/receiving claw portions 282 for the cam member 232, a small sliding contact guide rib 284, and a large sliding contact guide rib 286 are formed to project from an inner side central portion of the main case portion 226A. The engaging/receiving claw portions 282 are formed such that a plurality of small projecting members is arranged substantially in the shape of a semicircle and a curved claw portion 288 having a substantially triangular shape in a side view is formed at each of the ends of the two claw portions of the engaging/receiving claw portions 282. The curved claw portion 288 serves to prevent pullout of the sensor plate 226 in such a manner as to be engaged with the rear side of a peripheral opening portion 268A (at the side of the ratchet member 234) which extends into the shaft cylinder portion 261 opened to the center of the cam rotating gear 268 of the cam member 232.

The small sliding contact guide rib 284 provided in the inner surface portion of the main case portion 226A is formed substantially in the shape of a semicircular ring around the engaging/receiving claw portion 282. In the assembled state shown in FIG. 27, the small sliding contact guide rib 284 contacts slidingly the side surface of the cam member 232 so as to limit the amount by which the cam member 232 moves in the axial direction.

The large sliding contact guide rib 286 provided in the inner surface portion of the main case portion 226A is disposed in the shape of a semicircular ring around the small sliding contact guide rib 284. As compared to the small sliding contact guide rib 284, the large sliding contact guide rib 286 has a large diameter and a low height-wise dimension. In the assembled state shown in FIG. 27, the large sliding contact guide rib 286 contacts the side surface of the disk control 230 slidingly so as to limit the amount by which the disk control 230 moves in the axial direction.

Structure of the holder:

As clearly seen from FIGS. 27, 28, and 32, the holder case portion 226B of the sensor plate 226 is formed to project outward from the main case portion 226A of the sensor plate 226 (toward the side opposite to the sensor cover 216, i.e., in the direction indicated by arrow FR) so as to have a small circular shape. A supporting member 290 projecting toward the inner surface of the holder case portion 226B (i.e., toward the sensor cover 216) is provided in the central portion of the holder case portion 226B. The supporting member 290 is formed as a rotation supporting shaft in which three prisms are disposed at tripartition positions of a circumference, and at each end of the three prisms, a claw portion 292 projecting outward from the circumference formed by the supporting member 290 substantially in a triangular shape in side view. The holder 228 is supported rotatably by the supporting member 290. A cylindrical shaft hole portion 294 is formed integrally with the central portion of the holder 228. As shown in FIG. 27, with a supporting member 290 passing through the shaft hole portion 294 and the claw portions 292 being engaged with a counterbore portion of the shaft hole portion 294, which faces the disk control 230, the holder 228 is supported in a freely rotating manner with respect to the sensor plate 226.

As shown FIGS. 27, 28, 29, and 32, the holder 228 includes, in the outer peripheral portion thereof, a reduction gear 296 engaging with a first drive gear 247 of the rotor 236, the reduction gear being formed as an external gear in which tooth portions of which each tooth width is reduced to half are arranged alternately. Further, an interlocking gear portion 298 which is a ring-shaped external gear is provided around the shaft hole portion 294 on a flat surface portion of the holder 228 at the side of the disk control 230 (i.e., at the side toward arrow RE). In the assembled state shown in FIG. 27, the interlocking gear portion 298 meshes with the cam rotating gear 268 of the cam member 232.

Structure of the ALR pawl:

As shown in FIGS. 27, 29, and 32, the ALR pawl cover portion 226C of the sensor plate 226 is formed below the main case portion 226A at a position near one side portion of the main case portion 226A and a round rod-shaped shaft pin 300 is provided upright from a portion of the cover portion 226C. An engaging projecting portion 302 having a small columnar shape is formed at the end of the shaft pin 300. At the time of assembly, the engaging projecting portion 302 is fitted into an engaging hole 304 formed at a corresponding position on the sensor cover 216 shown in FIG. 31.

As shown in FIGS. 29 and 32, the ALR pawl 222 includes a tubular bearing portion 310 having a shaft hole 306 at a base end portion of the ALR pawl 222 and also includes a claw portion 308 which is integrally formed at an end portion of the ALR pawl 222 and engages with the external gear ratchet wheel 220 of the lock wheel 218. The ALR pawl 222 is supported by the ALR pawl cover portion 226C in such a manner that the shaft pin 300 is inserted into the shaft hole 306 formed as a round through hole. Further, a rectangular notch 314 is formed between the bearing portion 310 and the claw portion 308 of the ALR pawl 222. A coil portion of a helical coil spring 312 passes along and is mounted on the outer peripheral portion of the bearing portion 310. Due to the urging force of the helical coil spring 312, the ALR pawl 222 is constantly urged in a direction in which the claw portion 308 is engaged with the external gear ratchet wheel 220 of the lock wheel 218.

Figure 35:
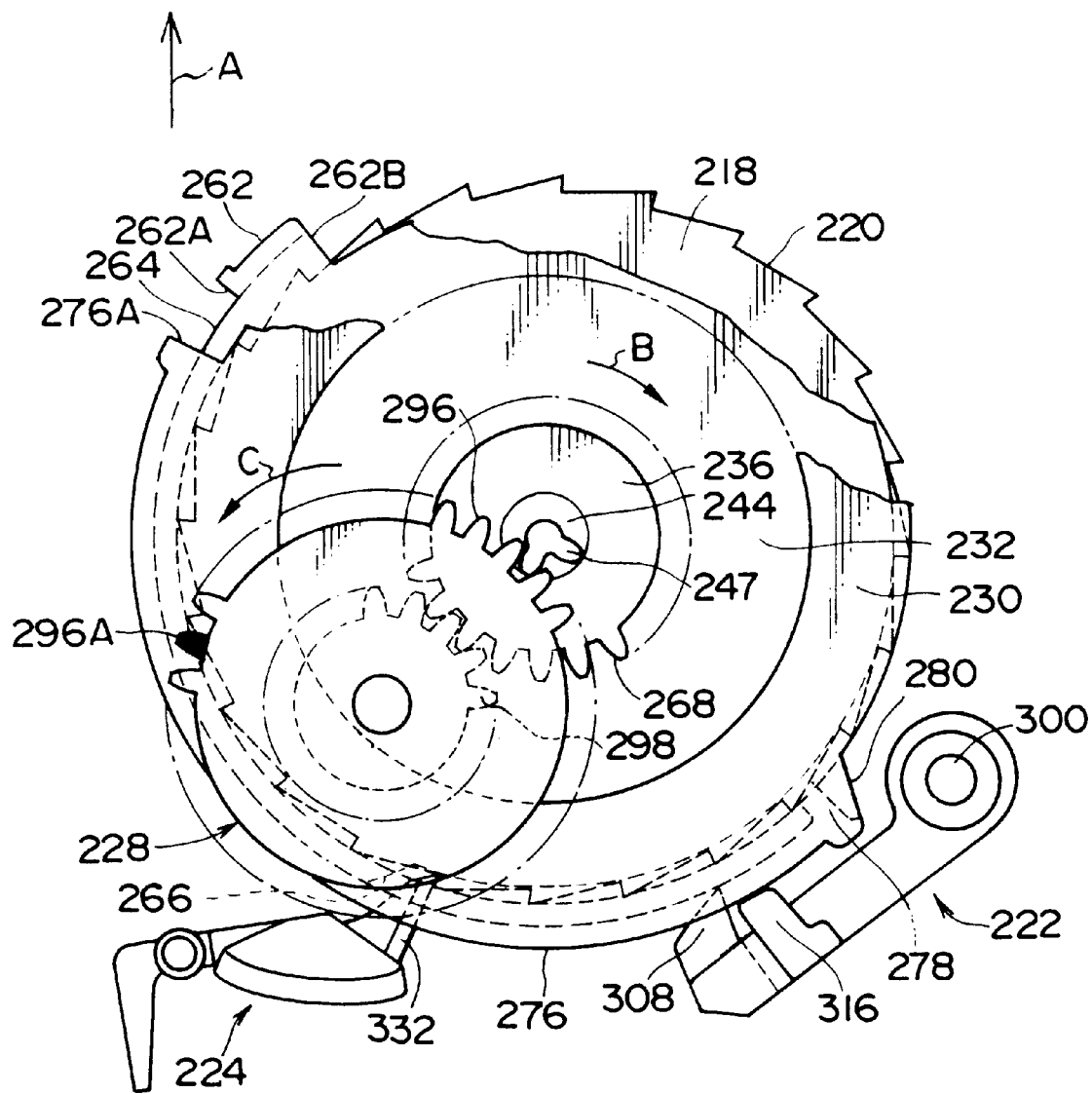
FIG. 35 is a front view of a principal portion in partial cross section, showing a state in which the webbing is retracted immediately before its full winding state, of the ALR-ELR switching mechanism of the webbing retractor according to the third embodiment of the present invention.
Figure 36:
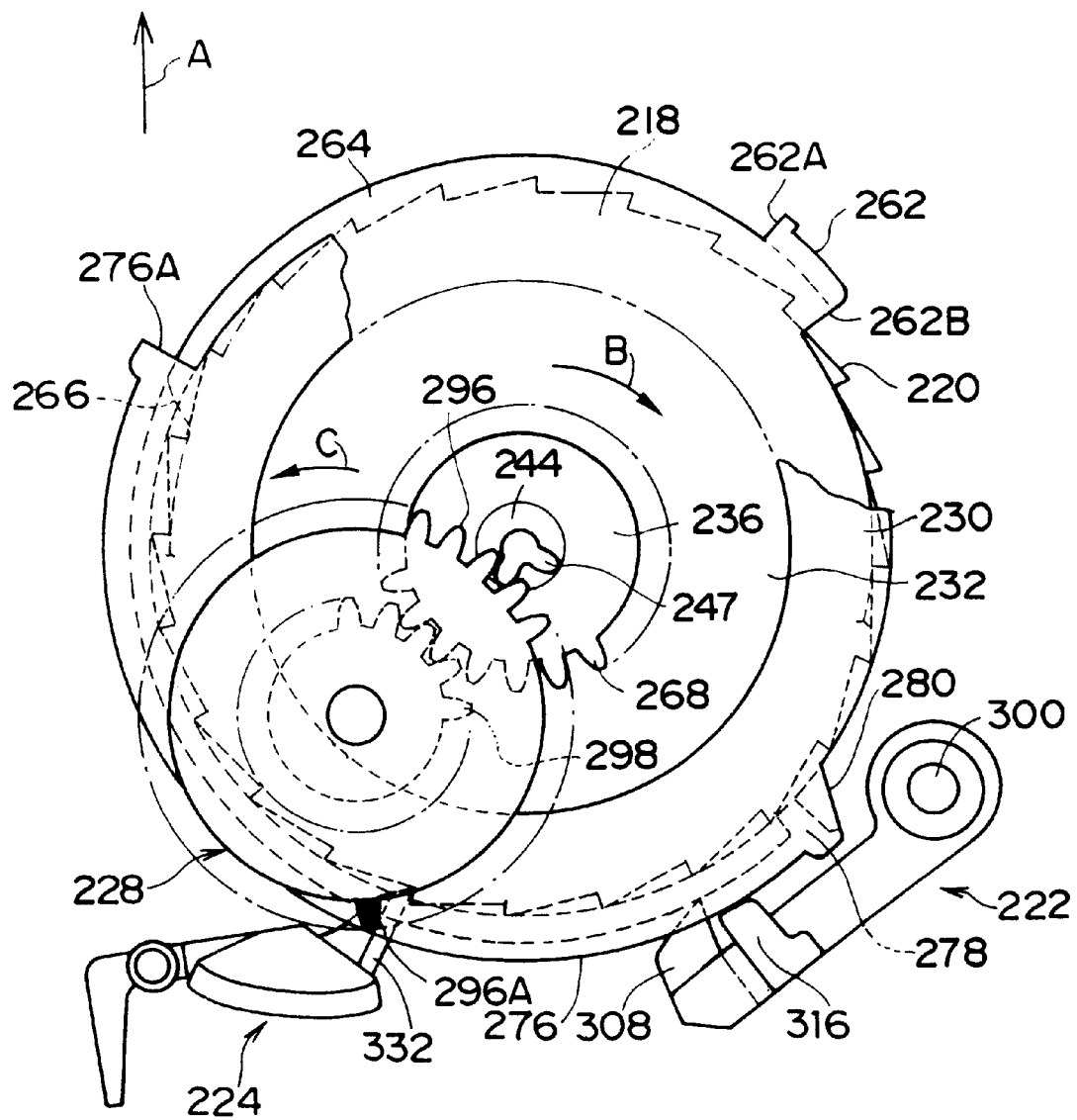
FIG. 36 is a front view of a principal portion showing, in partial cross section, a state of ordinary ALR-ELR switching mechanism use for the webbing retractor according to the third embodiment of the present invention.
Figure 37:
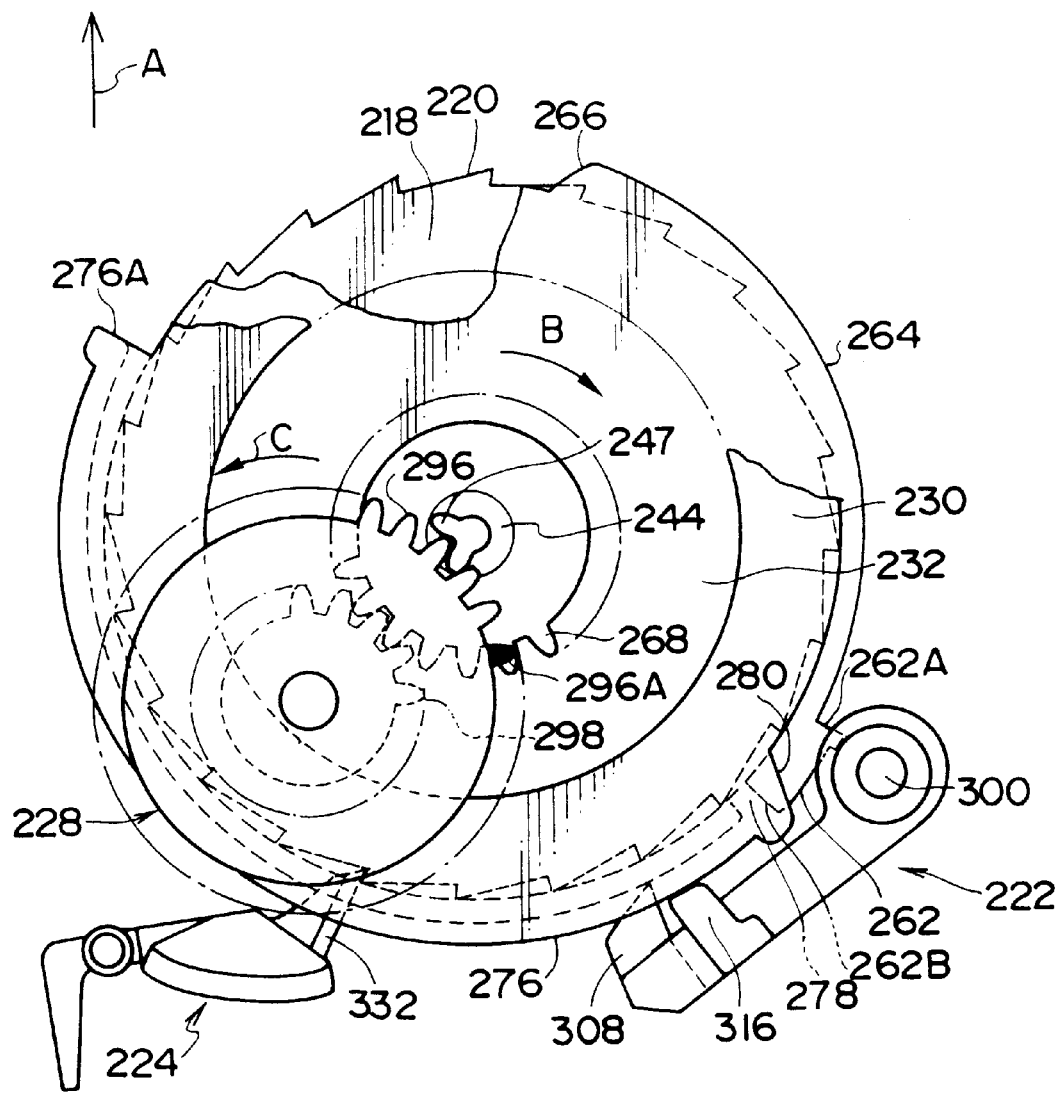
FIG. 37 is a front view of a principal portion showing, in partial cross section, a state immediately before switching of the ALR-ELR switching mechanism of the webbing retractor according to the third embodiment of the present invention.
Figure 38:
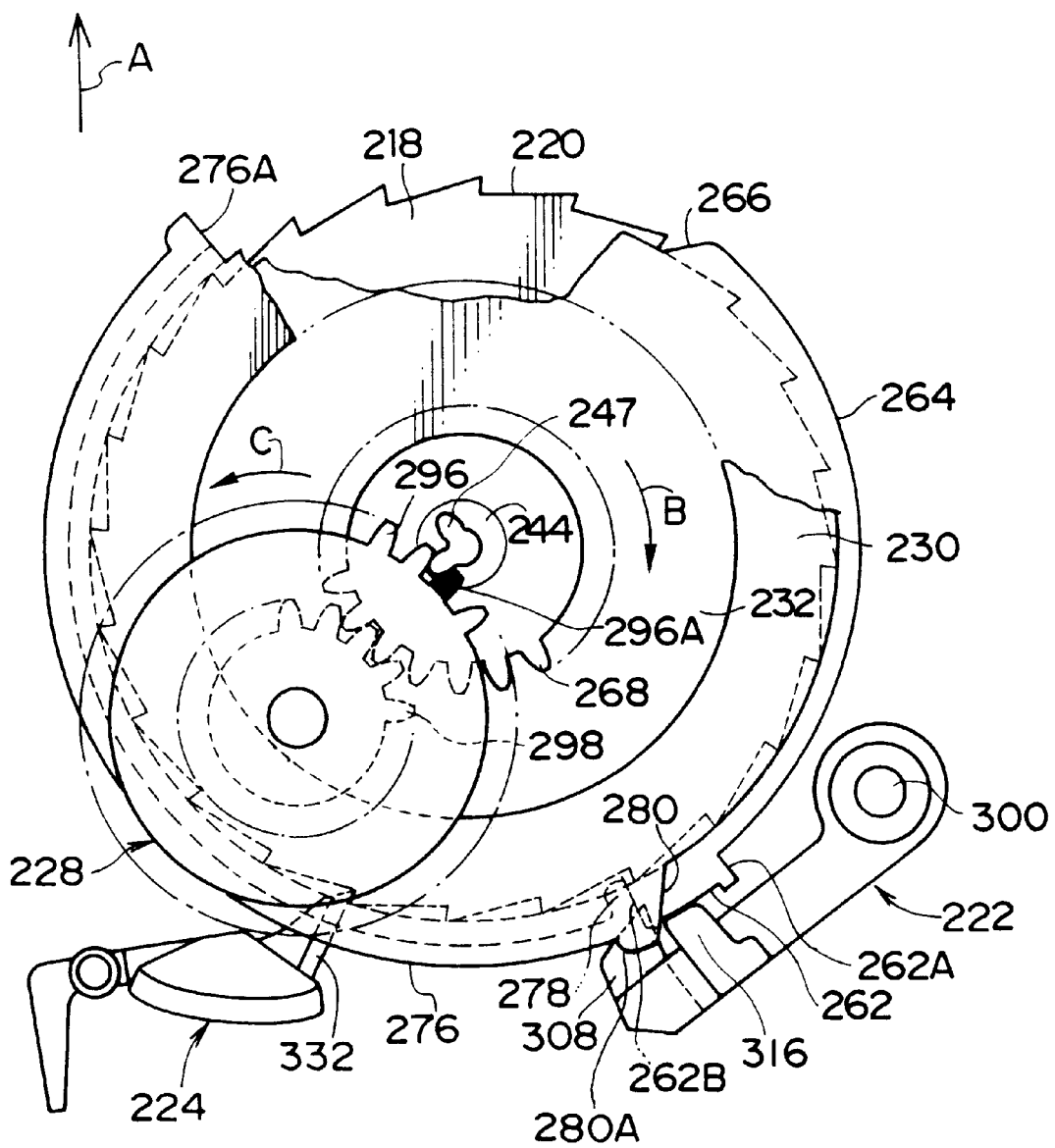
FIG. 38 is a plan view of the principal portion showing, in partial cross section, a state immediately before switching of the ALR-ELR switching mechanism of the webbing retractor according to the third embodiment of the present invention.

Further, a small driven pedestal portion 316 is integrally formed at a side portion of the ALR pawl 222 which is opposite to the notch 314. The driven pedestal portion 316 slidably contacts the interlock stopping portion 262 of the cam member 232 and the stopping-operation portion 276 of the disk control 230, so as to move the ALR pawl 222 in a direction in which the claw portion 308 is moved apart from the external gear ratchet wheel 220 of the lock wheel 218. Namely, when the cam member 232 rotates in a direction clockwise from the state shown in FIG. 37, the interlock stopping portion 262 presses the driven pedestal portion 316 as shown in FIG. 38 to separate the ALR pawl 222 from the external gear ratchet wheel 220. Further, when the stopping-operation portion 276 corresponds to the ALR pawl 222, the claw portion 308 of the ALR pawl 222 is moved apart from the external gear ratchet wheel 220 as shown in FIGS. 35 through 37.

Structure of the acceleration sensor device:

As understood from FIGS. 29, 31, and 32, the acceleration sensor cover portion 226D of the sensor plate 226 is disposed below the main case portion 226A and at a position adjacent to the ALR pawl cover portion 226C. The acceleration sensor cover portion 226D forms an accommodating portion of the acceleration sensor device 320 with the sensor plate 226 being installed at the sensor cover 216. The acceleration sensor device 320 is generally available. As shown in FIG. 29, the acceleration sensor device 320 is formed in such a manner that a metallic spherical body 326 is installed in a concave receiving portion 324, which forms a part of a large diameter spherical surface and is provided in a pedestal 322 fixed to the sensor plate 226, and a sensor pawl 224 supported by a support 328 of the pedestal 322 is placed on the spherical body 326. Then, when the spherical body 326 moves up in the concave receiving portion 324 due to an acceleration of a vehicle which is greater than or equal to a predetermined value, the sensor pawl 224 is moved so as to engage the claw portion 332 with the external gear ratchet wheel 220 of the lock wheel 218.

Figure 34:
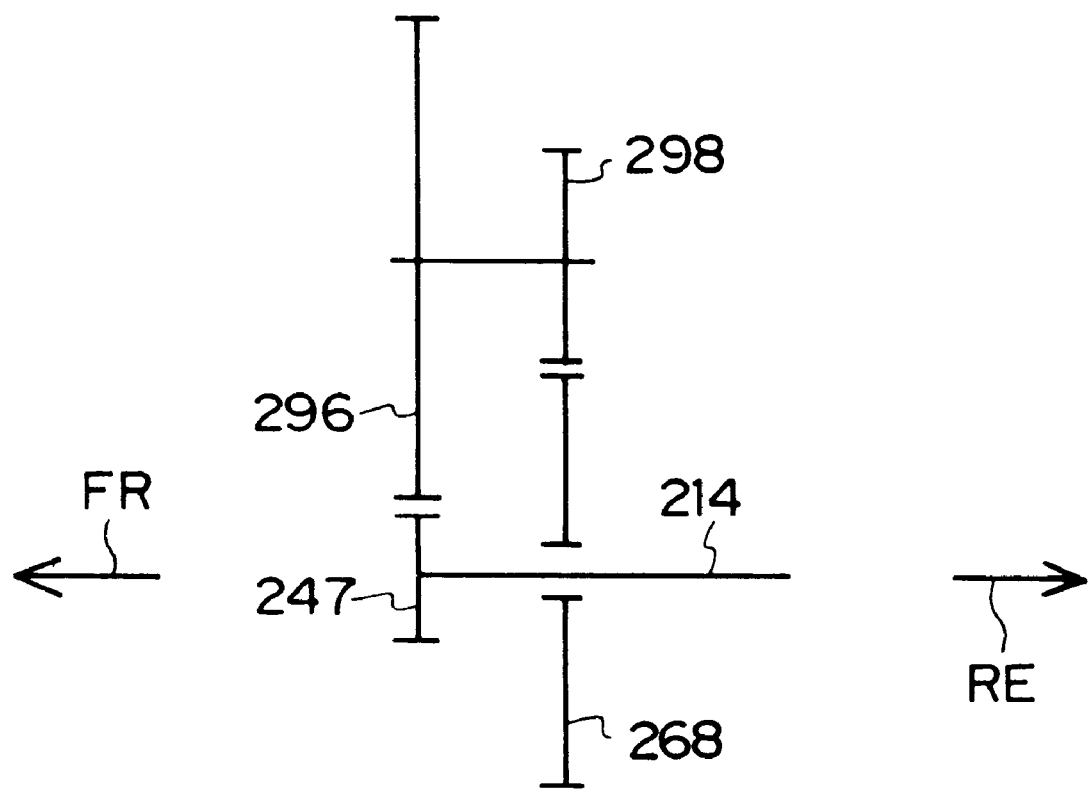
FIG. 34 is an explanatory diagram showing a schematic structure of a gear mechanism of a principal portion of the ALR-ELR switching mechanism of the webbing retractor according to the third embodiment of the present invention.

Gear reduction mechanism for the cam member:

Next, a description will be given of a gear reduction mechanism used by the above-described ALR-ELR switching mechanism with reference to FIG. 34. In the gear reduction mechanism, the reduction gear 296 meshes with the first drive gear 247 rotating integrally with the winding shaft 214. The first drive gear 247 and the reduction gear 296 form a reduction gear mechanism based on intermittent movement thereof, and the intermittent movement is effected in such a manner that, when the first drive gear 247 makes one rotation, the reduction gear 296 continuously rotates the space of two teeth and thereafter stops rotating.

The intermittent movement of the reduction gear 296 is transmitted to the cam rotating gear 268, meshing with the interlocking gear portion 298, via the interlocking gear portion 298 rotating integrally with the reduction gear 296, and the cam member 232 integrated with the cam rotating gear 268 is thereby rotated.

ALR-ELR switching movement:

A description will be hereinafter given of an operation of the ALR-ELR switching mechanism of the webbing retractor in this embodiment.

Figure 43:
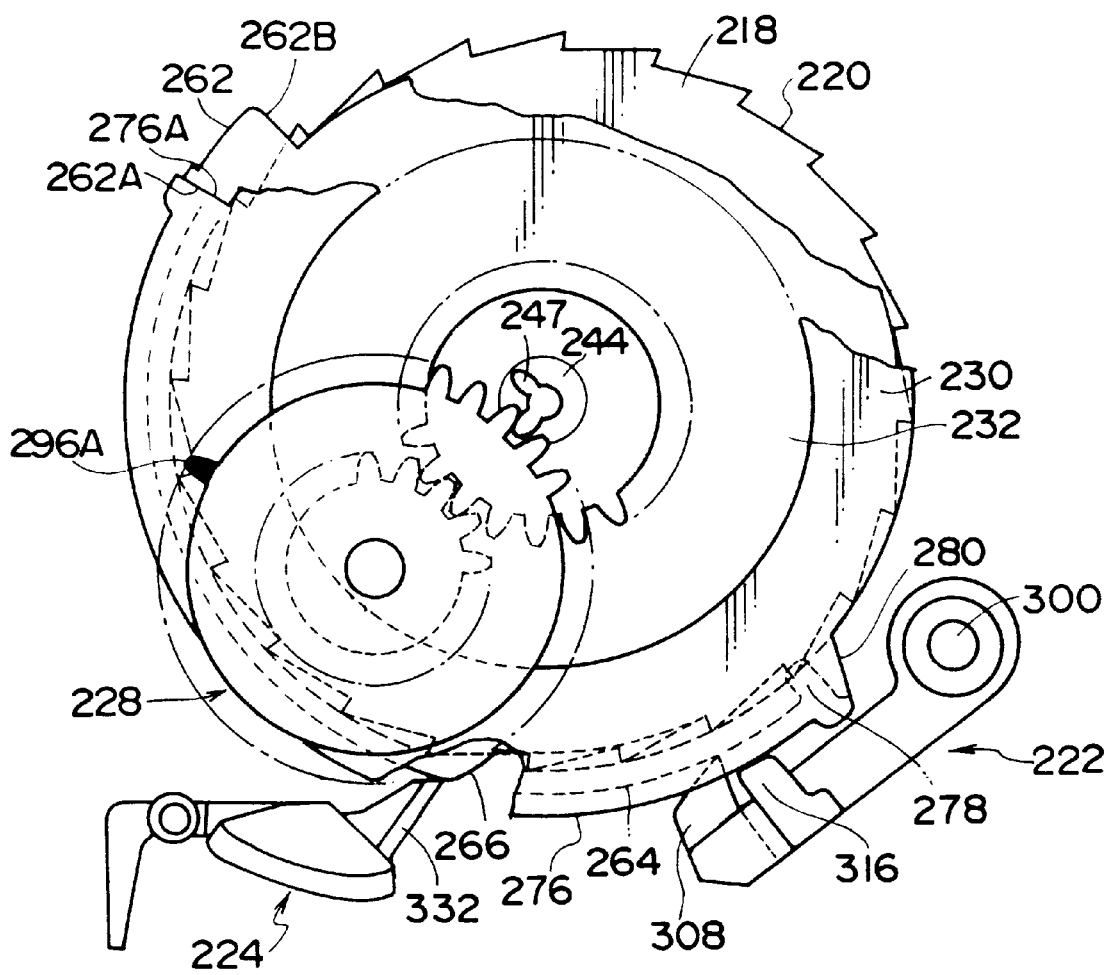
FIG. 43 is a front view of a principal portion of the ALR-ELR switching mechanism of the webbing retractor, showing an operating state to prevent end locking, according to the third embodiment of the present invention.

The state in which the winding shaft 214 of the webbing retractor rotates in the direction opposite to that indicated by arrow A and the webbing is thereby wound substantially to its full length is shown in FIG. 43. Namely, the driven pedestal portion 316 of the ALR pawl 222 is placed on the outer peripheral surface of the stopping-operation portion 276 of the disk control 230 near the abutment rib portion 278 so as to separate the claw portion 308 of the ALR pawl 222 from the external gear ratchet wheel 220 of the lock wheel 218 into a nonengageable manner, and due to the operation of the ALR pawl 222, the end lock release state in which movement of the webbing in the direction of being pulled out is not stopped is set. Further, in the state shown in FIG. 35, the claw portion 332 of the sensor pawl 224 is located at a position apart from the guide surface portion 266 of the stopping portion 264 of the cam member 232 (i.e., the guide surface portion 266 stops at a position apart from the claw portion 332 in a circumferential direction). For this reason, the acceleration sensor device 320 is actuated in response to acceleration of the vehicle so as to push up the sensor pawl 224 at a position indicated by the solid line in FIG. 35, and when the webbing is about to be pulled out, the locking means operates so that the pullout operation of the webbing can be controlled. Meanwhile, when the webbing is rapidly wound by winding and the urging force of the winding shaft, even when in a full winding state the locking means inadvertently operates due to the relative rotation of the winding shaft 214 and the lock wheel 218 to be brought into an end locking state in which the pullout operation of the webbing is stopped, so long as the webbing is wound onto the winding shaft 214 by a small amount, this locking state can be released. Accordingly, there is no possibility that the end locking state is continuously maintained.

Next, a state in which a vehicle occupant is fastened by a seat belt with the webbing being pulled out by a predetermined amount is shown in FIG. 36 coming after FIG. 35.

Namely, when the pullout operation of the webbing starts from the state shown in FIG. 43 in which the webbing is wound to its full length, the rotation of the winding shaft 214 allows rotation of the first drive gear 247 in the direction indicated by arrow B in FIG. 36. As a result, the reduction gear 294 meshing with the first drive gear 247 intermittently rotates in the direction indicated by arrow C in FIG. 36 and the interlocking gear portion 298 integrated with the reduction gear 294 also rotates in the direction indicated by arrow C. The cam rotating gear 268 engaging with the interlocking gear portion 298 rotates in the direction indicated by arrow B. As a result, the cam member 232 integrated with the cam rotating gear 268 rotates in the direction indicated by arrow B without rotating the disk control 230. In FIGS. 35 to 43, to make the rotational movement of the reduction gear 296 easier to under stand, one tooth of the reduction gear 296 is indicated as a marking tooth 296A denoted in black in each drawing.

In the above-described state, the interlock stopping portion 262 of the cam member 232, which rotates at a low speed after slowdown, moves from near the abutment end portion 276A to the guide oblique side 280 in the range of the small diameter portion 230A of the disk control 230. At this time, the disk control 230 is subjected to force which is about to slightly rotate the disk control 230 due to friction between the cam member 232 and the disk control 230. However, the driven pedestal portion 316 of the ALR pawl 222 abuts against a portion between a raised projecting portion of the abutment end portion 276A and the gently sloping surface 280A so as to limit the rotation of the disk control 230 caused by the friction against the cam member 232, and therefore, the disk control 230 does not rotate until it is forcibly rotated by the interlock stopping portion 262 of the cam member 232.

At this time, the ALR pawl 222 is maintained in a state of not being engageable with the external gear ratchet wheel 220 with the driven pedestal portion 316 being placed on the stopping operation portion 276 of the disk control 230. Further, at this time, the sensor pawl 224 is maintained in a state of being engageable with the external gear ratchet wheel 220. In the state shown in FIG. 36, the webbing is applied to the vehicle occupant by being engaged with a buckle. There is no possibility that the cam member 232 is moved greatly by the winding or pullout operation of the webbing which is caused by alteration of a driving position or the like. When acceleration of a predetermined value or more acts so that the claw portion 332 is engaged with the external gear ratchet wheel 220, the locking means stops rotation of the winding shaft 214 in the direction in which the webbing is pulled out, and the vehicle occupant is thereby restrained by the webbing. When the state in which the vehicle occupant is restrained by the webbing is released, the webbing retractor is restored to the state shown in FIG. 43.

Even when the winding shaft rotates from the state shown in FIG. 36 in a fixed range in the direction in which the webbing is pulled out or in the direction in which the webbing is wound due to alteration of a driving position of the vehicle occupant or due to the difference of physical size of the occupant, the interlock stopping portion 262 of the cam member 232 does not abut against the guide oblique side 280. Accordingly, the state in which the disk control 230 holds the ALR pawl 222 remains unchanged. When the webbing is further pulled out over a range of the amount by the webbing is applied to the vehicle occupant, the reduction gear 296 of the holder 228 makes about one third rotation from the state shown in FIG. 36 to reach a position immediately before the switching state shown in FIG. 37. In the state shown in FIG. 37, the interlocking portion 262B provided at the end of the interlock stopping portion 262 of the cam member 232 which rotates with the reduction gear 296 in the direction indicated by arrow B abuts against the abutment rib portion 278 of the disk control 230. Meanwhile, other states are the same as those in FIG. 36.

When the webbing is further pulled out from the state shown in FIG. 37, the cam member 232 further rotates in the direction indicated by arrow B by the above-described gear mechanism while pushing the disk control 230 forward. As a result, the webbing retractor is brought into a state shown in FIG. 38 in which switching is effected.

In the state shown in FIG. 38, the driven pedestal portion 316 of the ALR pawl 222 moves across the gently sloping surface 280A from the stopping operation portion 276 to be placed on the interlock stopping portion 262, and the ALR pawl 222 is thereby maintained in a state of not being engageable with the external gear ratchet wheel 220. Meanwhile, the sensor pawl 224 is maintained in the state of being engageable with the external gear ratchet wheel 220.

Figure 39:
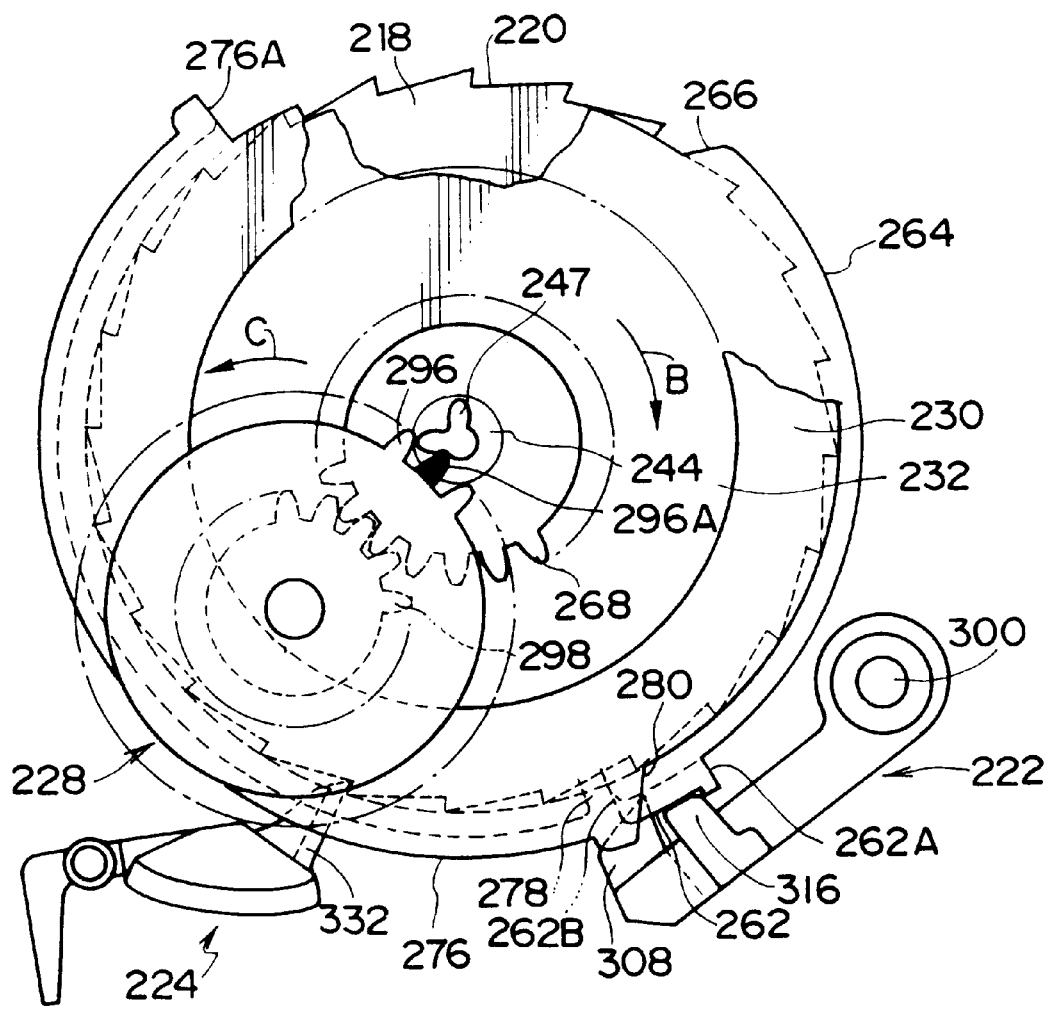
FIG. 39 is a plan view of a principal portion of the ALR-ELR switching mechanism of the webbing retractor, which shows a state in which the webbing is pulled out to its full length, according to the third embodiment of the present invention.

When the webbing wound onto the winding shaft 214 is pulled out to its full length as shown in the state shown in FIG. 39 coming after FIG. 38, the cam member 232 further rotates in the direction of arrow B by a small amount and the driven pedestal portion 316 is placed on the interlock stopping portion 262 at a position near the interlocking portion 262A, namely, the webbing retractor is brought, by the gear mechanism, into the state in which the webbing is pulled out to its full length (see FIG. 39). Other operations of the state shown in FIG. 39 in which the webbing is pulled out to its full length are the same as those of the above-described state shown in FIG. 38. Meanwhile, in the state shown in FIG. 39, the ALR pawl 222 cannot be engaged with the external gear ratchet wheel 220, and therefore, the webbing can be pulled out to its full length. For this reason, it is possible to prevent a small amount of the webbing from remaining on the winding shaft 214 due to the full pullout operation of the webbing, the length of the webbing to be pulled out can be constantly made fixed so as to correspond to the overall length of the webbing.

When the webbing retractor of this embodiment is assembled for manufacturing, the state shown in FIG. 39 is set as one standard of an assembly operation with an assembly initial state being set.

Figure 40:
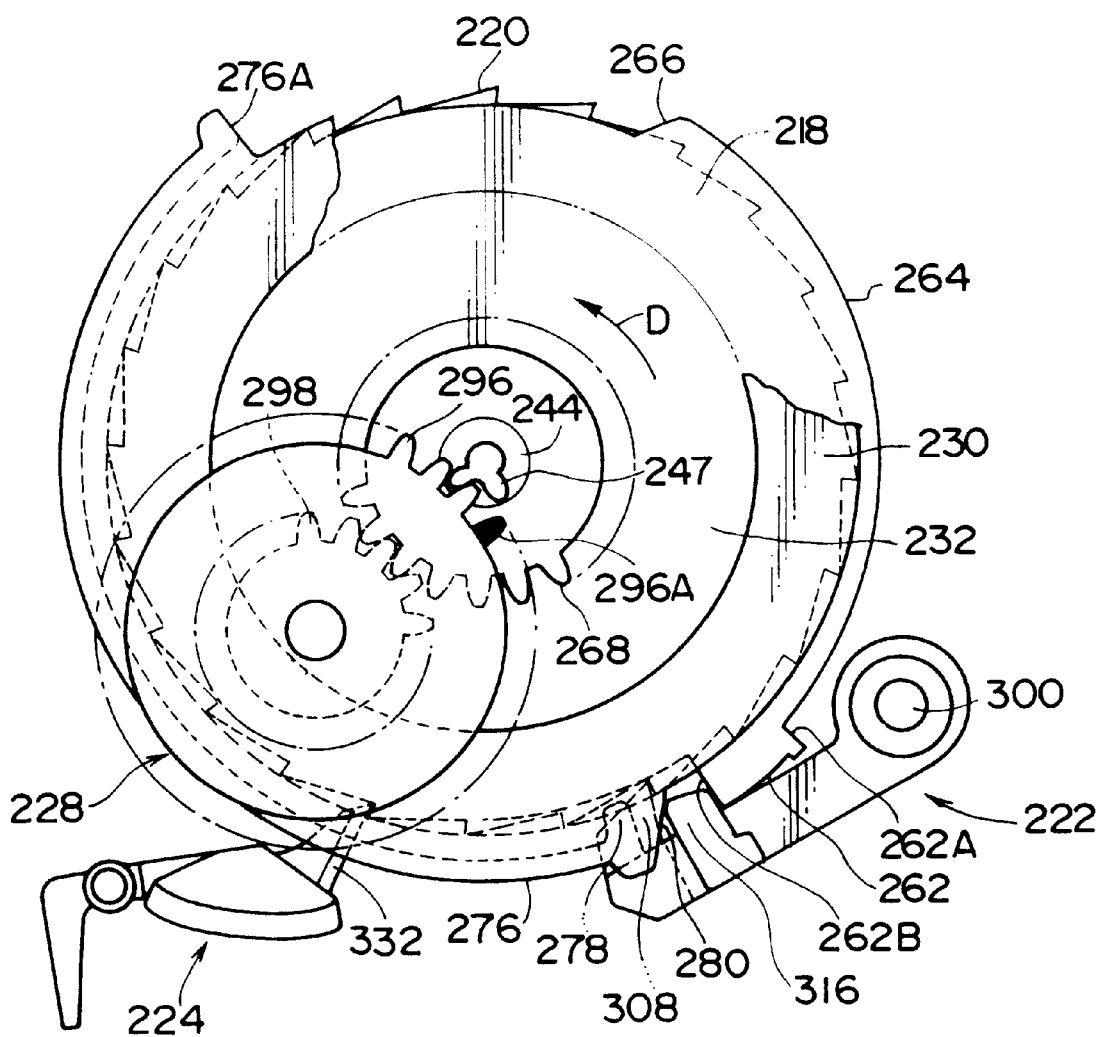
FIG. 40 is a plan view of a principal portion of the ALR-ELR switching mechanism of the webbing retractor, which shows a state in which switching to the ALR is effected, according to the third embodiment of the present invention.

When the webbing is wound by a small amount from the state shown in FIG. 39, the webbing retractor is brought into the ALR switching state shown in FIG. 40. Namely, when the winding operation of the webbing is effected, the first drive gear 247 rotates in the direction indicated by arrow D in FIG. 40, and the cam member 232 also rotates in the direction indicated by arrow D by the above-described gear mechanism which interlocks with the first drive gear 247 so as to move apart from the disk control 230. Due to this operation, the driven pedestal portion 316 of the ALR pawl 222 is separated from the interlock stopping portion 262 of the cam member 232 and the ALR pawl 222 causes the claw portion 308 to engage with the external gear ratchet wheel 220 of the lock wheel 218 by the urging force of the helical coil spring 312.

In the state shown in FIG. 40 in which the webbing retractor is switched to the ALR, the webbing can be wound and is also brought into a state of not being pulled out. Namely, during the webbing winding operation, the lock wheel 218 rotates in the direction indicated by arrow D and the external gear ratchet wheel 220 rotates while the claw portion 308 of the ALR pawl 222 slides thereon, and therefore, the webbing winding operation is allowed.

However, when the webbing is about to be pulled out in the state shown in FIG. 40, the claw portion 308 of the ALR pawl 222 engages with the external gear ratchet wheel 220 and the rotation of the lock wheel 218 in the direction opposite to that indicated by arrow D is thereby prevented. As a result, the relative rotation is generated between the lock wheel 218 and the winding shaft 214 and the locking means operates to stop the pullout operation of the webbing. Meanwhile, even in this operation, the operation in which due to operation of the acceleration sensor device 320 the locking means is operated to stop the pullout operation of the webbing is executed without change.

Subsequently, when the webbing is sufficiently wound over the ordinary range of the amount by which the webbing is applied to the vehicle occupant, the cam member 232 rotates in the direction of arrow D by the gear mechanism and the interlocking portion 262A of the interlock stopping portion 262 abuts against the abutment end portion 276A of the disk control 230. As a result, the webbing retractor is brought into the ALR release start state shown in FIG. 41. Meanwhile, in the state shown in FIG. 41, the ALR pawl 222 and the sensor pawl 224 are respectively provided to operate in the same way as in the state shown in FIG. 40.

Figure 41:
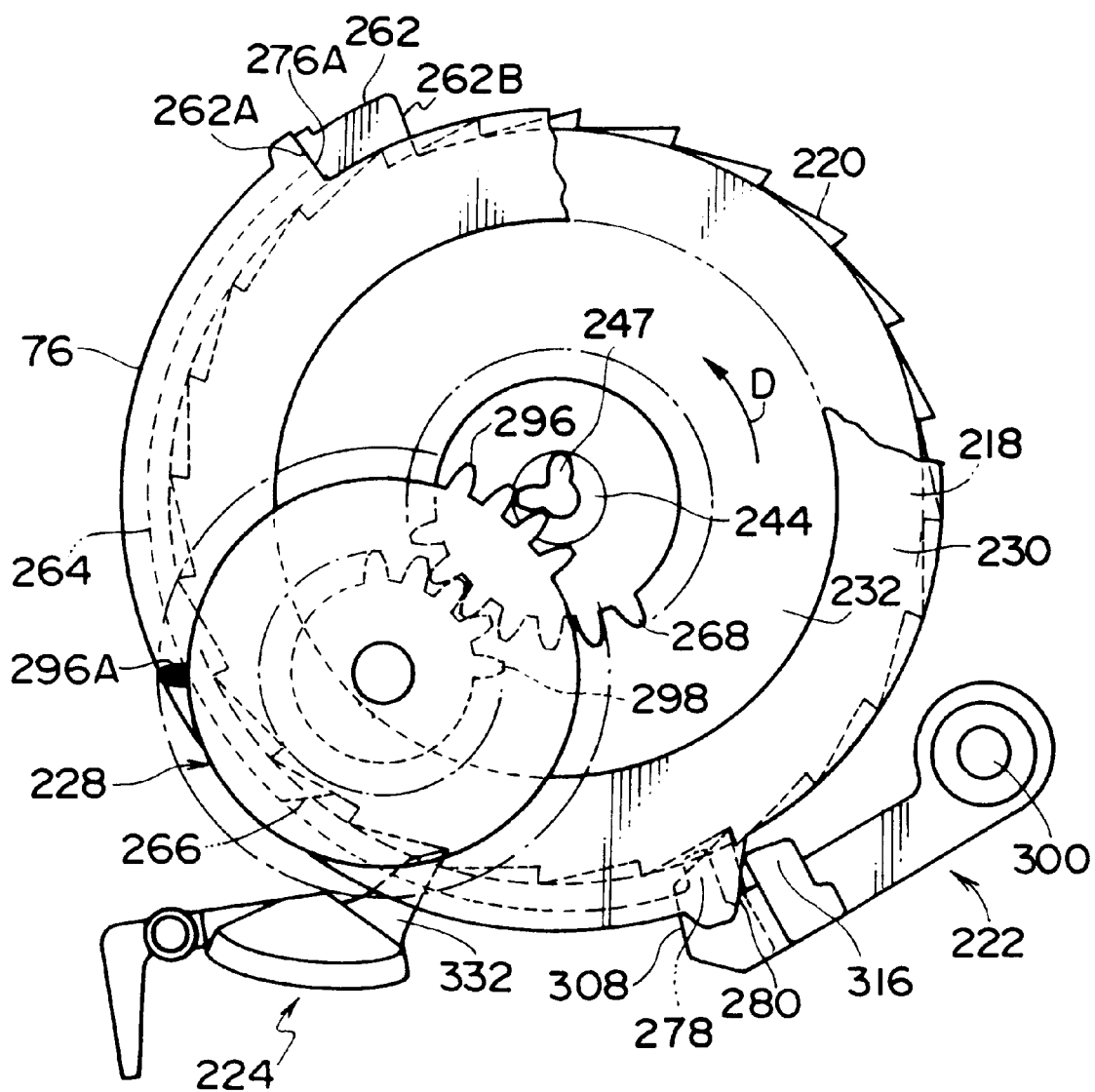
FIG. 41 is a plan view of a principal portion of the ALR-ELR switching mechanism of the webbing retractor, which shows a state in which release from the ALR starts, according to the third embodiment of the present invention.

When the webbing is further wound from the state shown in FIG. 41, the cam member 232 further rotates in the direction indicated by arrow D so as to push to rotate the disk control 230 in the direction of arrow D. As a result, the guide oblique side 280 of the disk control 230 pushes up the driven pedestal portion 316 onto the stopping operation portion 276 and the claw portion 308 of the ALR pawl 222 is maintained in the state in which released from the ALR has been completed, in which the claw portion 308 is not engageable with the external gear ratchet wheel 220 of the lock wheel 218. Further, in the state shown in FIG. 42 in which release from the ALR has been completed, the sensor pawl 224 engages with the external gear ratchet wheel 220 to operate the locking means, thereby preventing pullout of the webbing.

Figure 42:
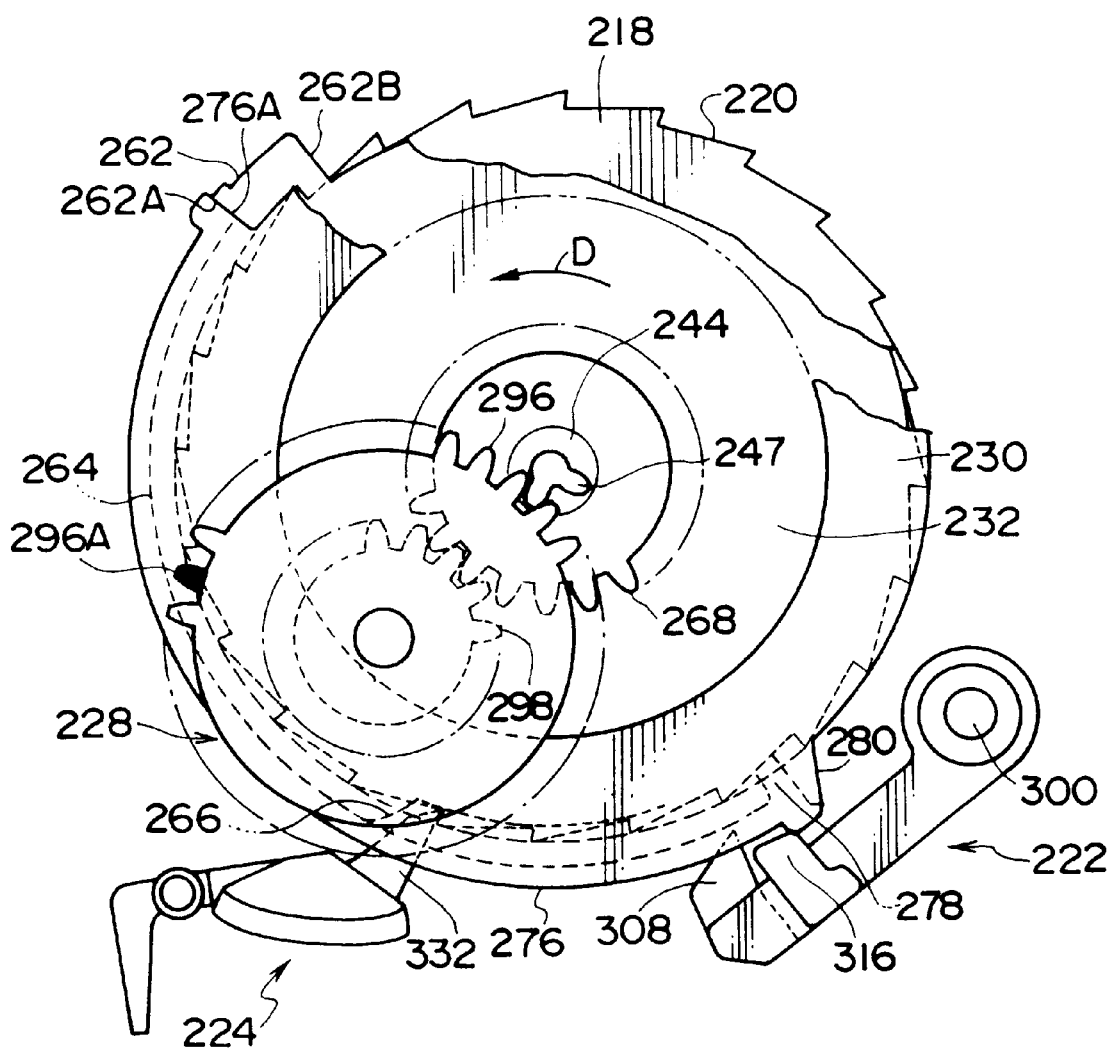
FIG. 42 is a front view of a principal portion of the ALR-ELR switching mechanism of the webbing retractor, showing a state in which release from ALR release is completed, according to the third embodiment of the present invention.

When the webbing is further wound from the state shown in FIG. 42 in which release from the ALR has been completed, the cam member 232 further rotates in the direction indicated by arrow D together with the disk control 230, the guide surface portion 266 pushes up the claw portion 332 of the sensor pawl 224, and the claw portion 332 is brought into a state of not being engageable with the external gear ratchet wheel 220 of the lock wheel 218. As a result, the webbing retractor is brought into an operating state for preventing end locking, which is shown in FIG. 43. In the operating state for preventing the end locking shown in FIG. 43, the claw portion 308 of the ALR pawl 222 is in a state of not being engageable with the external gear ratchet wheel 220 by the stopping-operation portion 276. Accordingly, in the state immediately before the webbing is wound to its full length, the ALR pawl 222 and the sensor pawl 224 are both brought into a state of not being engageable with the external gear ratchet wheel 220, and therefore, there is no possibility that the locking means is operated to stop the pullout operation of the webbing. For this reason, in the state in which the webbing is rapidly wound to its full length, the lock wheel 218 relatively rotates with the winding shaft 214 by inertial force and the pullout operation of the webbing is prevented by the locking means. As a result, the end locking state in which the webbing cannot be further pulled out can be avoided.

Further, when the pullout operation of the webbing starts from the state shown in FIG. 43, the webbing retractor is restored to its initial state coming after the state shown in FIG. 35 and the above-described operation is effected repeatedly.

Further, in each of the above-described embodiments of the present invention, a reduction gear mechanism having one set of intermittent gears is used as a gear mechanism for ALR-ELR switching operation. Accordingly, as compared to a case in which a plurality of intermittent gears is used, manufacturing and assembly of gear components can be effected simply and at low cost.

What is claimed is:

1. A webbing retractor comprising:
a winding shaft onto which a webbing used for restraining a vehicle occupant is wound;
locking means which is actuated to stop rotation of said winding shaft in a direction in which the webbing is pulled out;
an ALR lever which can be moved at an operating position where said locking means is actuated and at a non-operating position where said locking means is not actuated, and which is usually urged toward the operating position by an urging force;
a cam member to which rotation of said winding shaft is transmitted via a gear mechanism so as to hold said ALR lever at the non-operating position from the first state in which the webbing is wound onto said winding shaft substantially to its full length to a second state immediately before the webbing is pulled out substantially to its full length and also set said ALR lever in a state of being movable to the operating position; and
stopping means to which rotation of said winding shaft is transmitted via the gear mechanism, said stopping means holding said ALR lever at the non-operating position throughout the end of the second state to until just before a third state in which the webbing is rewound onto the winding shaft and allowing movement of said ALR lever to the operating position by the urging force when said winding shaft rotates, at the beginning of the third state, in a direction in which the webbing is wound, the direction being opposite to the direction in which the webbing is pulled out.

2. A webbing retractor according to claim 1, wherein said cam member is a substantially circular plate body having a substantially circular edge portion and a recessed edge portion, and said ALR lever is held at the non-operating position in such a manner as to face the substantially circular edge portion and is also set in a state of being movable at the operating position in such a manner as to face the recessed edge portion.

3. A webbing retractor according to claim 2, wherein the substantially circular plate body is rotatably supported by said winding shaft, and during a time from the first state to the third state coming after the second state, the substantially circular plate body is provided to be rotated via the gear mechanism in accordance with rotation of said winding shaft in the direction in which the webbing is pulled out.

4. A webbing retractor according to claim 1, wherein the gear mechanism includes a pinion gear which rotates with said winding shaft, and a reduction gear which engages with the pinion gear and is rotated at a reduced speed in accordance with rotation of the pinion gear, and said stopping means is a stopper portion provided in the reduction gear.

5. A webbing retractor according to claim 1, wherein said cam member is a plate body formed into a substantially triangular shape, the plate body having a substantially arcuate edge portion and a recessed edge portion, and said ALR lever is held at the non-operating position in such a manner as to face the substantially arcuate edge portion, and is also set in a state of being movable at the operating position in such a manner as to face the recessed edge portion.

6. A webbing retractor according to claim 4,
wherein the reduction gear includes a first intermediate gear portion and a second intermediate gear portion;
said cam member is a cam plate member rotatably supported by said winding shaft, the cam plate member including a first driven gear portion which meshes with the first intermediate gear portion in a range of a predetermined central angle around said winding shaft so as to rotate the cam plate member, a first region in which when said ALR lever engages the cam plate member, said ALR lever is held at the non-operating position against the urging force, and a second region in which when said ALR lever engages the cam plate member, said ALR lever can be moved at the operating position by the urging force; and
said cam plate member includes a second driven tooth portion, in which during a time from the second state to the third state the second driven tooth portion engages with a portion of the second intermediate gear portion to rotate the cam plate member so that the second region engages said ALR lever, and after said winding shaft is rotated from the third state by a predetermined amount in the direction in which the webbing is wound and is further rotated in the same direction, the second driven tooth portion engages with another portion of the second intermediate gear portion to rotate the cam plate member so that the first intermediate gear portion and the first driven gear portion are restored to a meshed state.

7. A webbing retractor according to claim 6, wherein the pinion gear has tooth portions whose number is smaller than that determined by a size of a gear train to which said pinion gear belongs.

8. A webbing retractor according to claim 7, wherein the first driven gear portion and the second driven gear portion are each formed as a partially toothed gear in such a manner as to intermittently mesh with the first intermediate gear portion and the second intermediate gear portion, respectively.

9. A webbing retractor comprising:

a winding shaft onto which a webbing used for restraining a vehicle occupant is wound;

locking means which is actuated to stop rotation of said winding shaft in a direction in which the webbing is pulled out;

an ALR pawl which can be moved at an operating position where said locking means is actuated and at a non-operating position where said locking means is not actuated, and which is usually urged toward the operating position by urging force;

a reduction gear mechanism which reduces a rate of rotation of said winding shaft;

a cam member rotated in such a manner as to interlock with said reduction gear mechanism, said cam member including a first region which allows movement of said ALR pawl at the operating portion by the urging force when said ALR pawl engages said cam member, and a second region which allows said ALR pawl to be held at the non-operating position when said ALR pawl engages said cam member; and a disk control member rotated by said cam member and including a third region which allows movement of said ALR pawl at the operating position by the urging force when the ALR pawl engages said disk control member, and a fourth region which allows said ALR pawl to be held at the non-operating position when said ALR pawl engages said disk control member, wherein when said winding shaft is rotated in the direction in which the webbing is pulled out from a first state in which the webbing is wound onto said winding shaft substantially to its full length to a second state immediately before the webbing is pulled out substantially to its full length, said ALR pawl is held at the non-operating position by the fourth region, when said winding shaft is rotated in the direction in which the webbing is pulled out from the second state to a third state in which the webbing is pulled out from said winding shaft substantially to its full length, said disk control member is rotated by said cam member so that said ALR pawl is changed from a state of being held at the non-operating position by the fourth region to a state of being held at the non-operating position by the second region, and further when said winding shaft is rotated from the third state, by a first predetermined amount, in a direction in which the webbing is wound, which is opposite to the direction in which the webbing is pulled out, the cam member is rotated so that said ALR pawl is thereafter moved at the beginning of the third region to the operating position by the urging force, and subsequently, when said winding shaft is rotated by a second predetermined amount in the direction in which the webbing is wound, said disk control member is rotated by said cam member, and said ALR pawl at the beginning of the fourth region is moved to the non-operating position.

10. A webbing retractor according to claim 9, further comprising:

a sensor pawl for an acceleration sensor, which can be moved to a first position where said locking means is actuated and to a second position where said locking means is not actuated, and is provided to be moved from the second position to the first position when a vehicle on which said webbing retractor is installed suddenly decelerates, wherein said cam member includes a third region for holding said sensor pawl at the second position when said winding shaft is rotated, by a third predetermined amount, from the first sate in the direction in which the webbing is pulled out.

11. A webbing retractor according to claim 9, wherein said cam member includes a first pushing portion which pushes to rotate said disk control member when said winding shaft is rotated in the direction in which the webbing is pulled out, and a second pushing portion which pushes to rotate said disk control member when said winding shaft is rotated in the direction in which the webbing is wound.

12. A webbing retractor according to claim 9, wherein said reduction gear mechanism includes a drive gear rotated with said winding shaft, and a reduction gear engaging with the drive gear and is formed to slow down by intermittent movement of the drive gear and the reduction gear.

13. A webbing retractor according to claim 12, wherein the reduction gear includes an interlock gear portion which engages with a cam rotating gear provided in said cam member to rotate said cam member.

14. A webbing retractor according to claim 12, wherein the drive gear includes a pinion gear having tooth portions whose number is smaller than that determined by a size of a gear train to which said pinion gear belongs.

15. A webbing retractor according to claim 9, wherein the second region of said cam member and the fourth region of said disk control member are formed so that said ALR pawl is maintained at the non-operating position in such a manner that a predetermined region of said ALR pawl abuts against the second region and the fourth region.

* * * * *